United States Patent
Fujimura

(10) Patent No.: US 10,454,567 B2
(45) Date of Patent: Oct. 22, 2019

(54) MULTI-BEAM SATELLITE COMMUNICATION SYSTEM

(71) Applicant: Mitsubishi Electric Corporation, Chiyoda-ku (JP)

(72) Inventor: Akinori Fujimura, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/078,417

(22) PCT Filed: Mar. 1, 2017

(86) PCT No.: PCT/JP2017/008154
§ 371 (c)(1),
(2) Date: Aug. 21, 2018

(87) PCT Pub. No.: WO2017/150624
PCT Pub. Date: Sep. 8, 2017

(65) Prior Publication Data
US 2019/0052351 A1     Feb. 14, 2019

(30) Foreign Application Priority Data
Mar. 2, 2016    (JP) ................ 2016-039595

(51) Int. Cl.
*H04B 7/185* (2006.01)
*H04B 7/204* (2006.01)
*H04B 7/0408* (2017.01)

(52) U.S. Cl.
CPC ....... *H04B 7/18534* (2013.01); *H04B 7/0408* (2013.01); *H04B 7/185* (2013.01);
(Continued)

(58) Field of Classification Search
CPC .............. H04B 7/0408; H04B 7/18515; H04B 7/18528; H04B 7/18534; H04B 7/18558;
(Continued)

(56) References Cited

U.S. PATENT DOCUMENTS 4,288,401 A   9/1981   Keith et al.
5,749,055 A   5/1998   Dahlin
(Continued)

FOREIGN PATENT DOCUMENTS

CA    2 314 257 A1    2/2001
JP    60-62739 A      4/1985
(Continued)

OTHER PUBLICATIONS

International Search Report dated May 23, 2017 in PCT/JP2017/008154 filed Mar. 1, 2017.

*Primary Examiner* — Yuwen Pan
*Assistant Examiner* — Paul P Tran
(74) *Attorney, Agent, or Firm* — Oblon, McClelland, Maier & Neustadt, L.L.P.

(57) ABSTRACT

A relay side receiving unit (931) receives a relay signal (99), an analog relay unit (932) outputs by analog processing the relay signal (99) whose frequency bandwidth is controlled, and a digital relay unit (933) outputs by digital processing the relay signal (99) whose frequency bandwidth is controlled. A relay side transmitting unit (934) transmits the relay signal (99) output by the analog relay unit (932), the digital relay unit (933). A relay side control unit (935) controls the analog relay unit (932), the digital relay unit (933) in accordance with an analog relay unit control signal (941A), a digital relay unit control signal (941D) indicating a frequency band of the relay signal (99).

6 Claims, 29 Drawing Sheets

EXAMPLE OF FREQUENCY ALLOCATION IN FEEDER LINK (UPSTREAM)

(52) U.S. Cl.
CPC ....... *H04B 7/1858* (2013.01); *H04B 7/18515* (2013.01); *H04B 7/18528* (2013.01); *H04B 7/2041* (2013.01)

(58) Field of Classification Search
CPC .. H04B 7/0617; H04B 7/185; H04B 7/18578; H04B 7/1858; H04B 7/2041; H04B 7/2045; H04B 7/2046; H04B 7/2615; H04B 17/40; H03F 1/02; H03F 3/211; H03F 3/24; H03F 3/602; H04J 1/05; H04J 3/1694; H03H 17/0664; H04W 72/0446
USPC ...................................................... 455/12.1
See application file for complete search history.

(56) References Cited

U.S. PATENT DOCUMENTS

| | | | |
|---|---|---|---|
| 6,084,541 A * | 7/2000 | Sayegh | .................... H01Q 3/26 342/354 |
| 6,650,876 B1 | 11/2003 | Östman et al. | |
| 7,030,795 B1 | 4/2006 | Saunders et al. | |
| 2004/0185775 A1 | 9/2004 | Bell et al. | |
| 2008/0090516 A1 | 4/2008 | Thomas et al. | |
| 2009/0247179 A1 | 10/2009 | Bell et al. | |
| 2011/0222467 A1 * | 9/2011 | Fujimura | ........... H03H 17/0664 370/316 |
| 2012/0147812 A1 | 6/2012 | Hudson et al. | |
| 2012/0189084 A1 | 7/2012 | Yu | |
| 2012/0314824 A1 | 12/2012 | Fujimura | |
| 2014/0036765 A1 * | 2/2014 | Fujimura | ........... H04B 7/18515 370/317 |
| 2014/0092804 A1 | 4/2014 | Scott | |
| 2014/0119385 A1 * | 5/2014 | Hoffmeyer | ......... H04B 7/18515 370/474 |
| 2014/0226555 A1 | 8/2014 | Bell et al. | |
| 2014/0328437 A1 | 11/2014 | Yu | |
| 2015/0007158 A1 * | 1/2015 | Marr | ........................ G06F 8/65 717/171 |
| 2015/0131523 A1 * | 5/2015 | Balter | .................... H04B 1/715 370/317 |
| 2015/0180568 A1 | 6/2015 | Motoyoshi | |
| 2015/0295636 A1 | 10/2015 | Fujimura et al. | |
| 2015/0381266 A1 | 12/2015 | Fujimura | |
| 2016/0056883 A1 | 2/2016 | Fujimura | |
| 2016/0094330 A1 | 3/2016 | Yu | |
| 2016/0254855 A1 * | 9/2016 | Tong | .................. H04B 7/18513 370/316 |
| 2017/0026059 A1 | 1/2017 | Yu | |
| 2017/0026961 A1 * | 1/2017 | Hahn, III | ............. H04B 7/2615 |
| 2017/0141840 A1 | 5/2017 | Scott | |

FOREIGN PATENT DOCUMENTS

| | | |
|---|---|---|
| JP | 7-507190 A | 8/1995 |
| JP | 2001-103005 A | 4/2001 |
| JP | 2003-507956 A | 2/2003 |
| JP | 2008-546241 A | 12/2008 |
| JP | 2009-153024 A | 7/2009 |
| JP | 2010-147947 A | 7/2010 |
| JP | 2010-206527 | 9/2010 |
| JP | 4667364 B2 | 4/2011 |
| JP | 2011-199355 A | 10/2011 |
| JP | 2013-98782 A | 5/2013 |
| JP | 2013-219571 A | 10/2013 |
| JP | 2014-507885 A | 3/2014 |
| JP | 5430737 B2 | 3/2014 |
| JP | 2014-75790 A | 4/2014 |
| JP | 2014-96795 A | 5/2014 |
| JP | 2014-131164 A | 7/2014 |
| JP | 2014-187688 A | 10/2014 |
| JP | 2015-195465 A | 11/2015 |
| WO | WO 2006/043115 A1 | 4/2006 |
| WO | WO 2011/105505 A1 | 9/2011 |
| WO | WO 2014/041932 A1 | 3/2014 |
| WO | WO 2014/112442 A1 | 7/2014 |
| WO | WO 2014/125600 A1 | 8/2014 |
| WO | WO 2014/170927 A1 | 10/2014 |

* cited by examiner

MULTI-BEAM SATELLITE COMMUNICATION SYSTEM

TECHNICAL FIELD

The present invention relates to a multi-beam satellite communication system, relay apparatus and control apparatus.

BACKGROUND ART

In recent years, a satellite communication system using a vent pipe type HTS (High Throughput Satellite) has been put to practical use in a multi-beam satellite communication system using broadband Ka band. However, in a vent pipe type relay satellite, since frequency bandwidth to be allocated to each beam area is fixed in advance, even when a request to change the frequency bandwidth allocated to each beam area is generated depending on change in communication demand on a ground side after satellite launch, it cannot be changed. Because of this, in a case of the vent pipe type relay satellite, frequency utilization efficiency and system throughput may be reduced.

In contrast, a relay satellite equipped with a channelizer can change the frequency bandwidth allocated to each beam area even after the satellite launch and has flexibility according to changes in communication demand on the ground side. Therefore, by using the channelizer, it is possible to maintain high throughput of the satellite communication system from immediately after the satellite launch to dozen years later when lifetime of the satellite runs out.

The type of the channelizer is roughly divided into two of an analog type and a digital type.

An analog type channelizer (analog channelizer) is a system which realizes a band tuning to be allocated to each beam area by an analog circuit, and is disclosed in, for example, Patent Literature 1 and Patent Literature 2 below.

On the other hand, a digital type channelizer (digital channelizer) is a system which realizes the band tuning to be allocated to each beam area by a digital circuit, and is disclosed in, for example, Patent Literature 3 below.

CITATION LIST

Patent Literature

Patent Literature 1: WO 2006/043115 A
Patent Literature 2: U.S. Pat. No. 4,228,401
Patent Literature 3: JP-B-4667364

SUMMARY OF INVENTION

Technical Problem

Since the analog channelizers of Patent Literatures 1 and 2 do not need to sample signals unlike a digital channelizer, even when processing bandwidth increases to several GHz, it is possible to cope without increasing power consumption, however, it has the following problems.

(A1) Since the band tuning is realized by an analog band-pass filter (BPF), it is not possible to place a communication carrier in a frequency band corresponding to a transition band of the analog BPF, and it is necessary to keep the transition band empty as a guard band. If the communication carrier is placed in the guard band, the communication carrier suffers influence of frequency response in a BPF transition region, and problems such as reduction in transmission level and communication quality occur. Since the guard band bandwidth corresponds to the transition band of the analog BPF as described above, it takes a constant value without changing depending on the situation. Therefore, as a signal bandwidth allocated to a certain beam area becomes narrower, percentage occupied by the guard band increases and frequency utilization efficiency decreases.

(A2) When changing the signal bandwidth allocated to each beam area according to change of communication demand on the ground side, it is necessary to temporarily interrupt communication of each user using the corresponding signal band. If band changing process is performed during communication, frequency fluctuation of each communication carrier occurs at a time of band change, and communication disconnection caused by this may occur. The band tuning using this analog circuit is performed by simultaneously changing frequencies of a plurality of frequency conversion local signals, however, a time difference may actually occur including a transient response time when the frequency of each local signal is changed. When such a time difference occurs, it leads frequency fluctuation of the carrier.

(A3) It is not possible to amplify or attenuate only a part (specific subband) of the signal bandwidth to be relayed on the satellite unlike the digital channelizer. Therefore, when a received power density of some signals is lower than that of other signals at the time of relaying a plurality of uplink signals, the communication quality of a signal having a low received power density deteriorates under influence of intermodulation distortion interference in a final stage amplifier of the satellite. Further, when an unnecessary interference wave is mixed in the signal bandwidth to be relayed, it is not possible to attenuate only the subband in which the interference wave is mixed so as to prevent only relay of unnecessary signals, and the transmission power resource of the satellite is used for relaying unnecessary signals.

Next, the digital channelizer of the Patent Literature 3 includes a digital demultiplexing circuit for demultiplexing a received signal band into a plurality of subbands, a digital switch matrix circuit, and a digital multiplexing circuit for multiplexing a plurality of subbands routed by the digital switch matrix.

Therefore, when the digital channelizer is applied, since the guard band is determined according to transition region in the subband, the guard band can be realized with a much smaller bandwidth such as less than $1/100$ as compared with the guard band of the analog channelizer, and thus the frequency utilization efficiency increases.

Further, since the digital channelizer processes all the processes of filtering and routing signals to be relayed by digital signal processing, even when changing the frequency bandwidth allocated to each beam, frequency fluctuation of the carrier such as occurs in the analog channelizer does not occur. That is, in the digital channelizer, even when changing the frequency bandwidth allocated to each beam, it is not necessary to interrupt the communication of each user using the corresponding frequency band, and it is possible to dynamically change the frequency bandwidth while the communication of each user is running.

Further, as described in JP-A-2014-187688, when the received power density of some signals is lower than that of other signals at the time of relaying a plurality of uplink signals, the digital channelizer can amplify the signals on a subband basis at the time of relay. Therefore, it is possible to reduce the influence of intermodulation distortion interference applied to the final stage amplifier of the satellite, and to maintain high communication quality. In addition, as described in JP-B-5430737, when the unnecessary interference wave is mixed in the signal bandwidth to be relayed, the digital channelizer can attenuate only the subband in which the interference wave is mixed so as to prevent only relay of unnecessary signals, so that unnecessary power consumption at the time of relay can be suppressed.

On the other hand, problems of the digital channelizer are as follows.

(B1) As the signal bandwidth increases, sampling speed of A/D (Analog to Digital), D/A (Digital to Analog) and clock speed driving the digital circuit also increase, and thus power consumption and an amount of heat generation increase. As the amount of heat generation increases, heat exhaust is severe and feasibility is impaired.

(B2) Since an upper limit of the signal bandwidth that can be processed is determined by the maximum sampling rate of A/D and D/A, expanding of the bandwidth is limited. Especially, the upper limit of the sampling speed is lower for radiation resistant A/D, D/A devices for space than the A/D, D/A devices on the ground, and when the signal bandwidth approaches 1 GHz, sampling with an A/D device or a D/A device is difficult.

An object of the present invention is to realize broadband and low power consumption of a relay satellite using a channelizer, and to realize high frequency utilization efficiency and dynamic frequency change during operation in a satellite communication system using the relay satellite.

Solution to Problem

A multi-beam satellite communication system according to the present invention includes:
a relay apparatus mounted on an artificial satellite and relaying communication of a communication device present in each of a plurality of beam areas; and
a control apparatus to control the relay apparatus, wherein
the relay apparatus comprises:
a relay side receiving unit to receive a relay signal to be relayed;
an analog relay unit having an analog circuit to control a frequency bandwidth of the relay signal, the analog relay unit to output the relay signal whose frequency bandwidth is controlled;
a digital relay unit having a digital circuit to control a frequency bandwidth of the relay signal, the digital relay unit to output the relay signal whose frequency bandwidth is controlled;
a relay side transmitting unit to transmit the relay signal output; and
a relay side control unit to cause the analog relay unit and the digital relay unit to output the relay signal, according to an analog relay unit control signal indicating a frequency band of the relay signal to be relayed by the analog relay unit and a digital relay unit control signal indicating a frequency band of the relay signal to be relayed by the digital relay unit, and
the control apparatus comprises:
a control side communication unit; and
a control side control unit to generate the analog relay unit control signal and the digital relay unit control signal and to transmit the generated signals to the relay apparatus via the control side communication unit.

Advantageous Effects of Invention

A relay satellite, a relay apparatus and a multi-beam satellite communication system according to the present invention have an effect capable of realizing broadband signal relay and dynamic frequency change during operation while maintaining high frequency utilization efficiency and low power consumption of the relay satellite.

DESCRIPTION OF EMBODIMENTS (1) The following first to fifth embodiments are related to a multi-beam satellite communication system 95, and a relay apparatus 93 which is an artificial satellite is a hybrid configuration including two of an analog channelizer and a digital channelizer. The relay apparatus 93 is mounted on a relay satellite 05.

(2) In the multi-beam satellite communication system 95 according to the present invention, a control station 09 determines whether to relay each carrier signal via the analog channelizer or via the digital channelizer in accordance with a traffic demand or a communication request and performs frequency assignment and channelizer control. Thus, broadband signal relay and dynamic frequency change during operation are realized while maintaining "high frequency utilization efficiency" and "low power consumption of a relay satellite".

(3) An operation of the relay satellite may be explained in the following embodiments, but the operation of the relay satellite is actually an operation of a relay apparatus. Similarly, control over the relay satellite is control over the relay apparatus.

(4) An operation of a control station may be explained in the following embodiments, but the operation of the control station is actually an operation of a control side control unit.

The embodiments will be described below with reference to the drawings.

Embodiment 1

Explanation of Configuration

Figure 1:
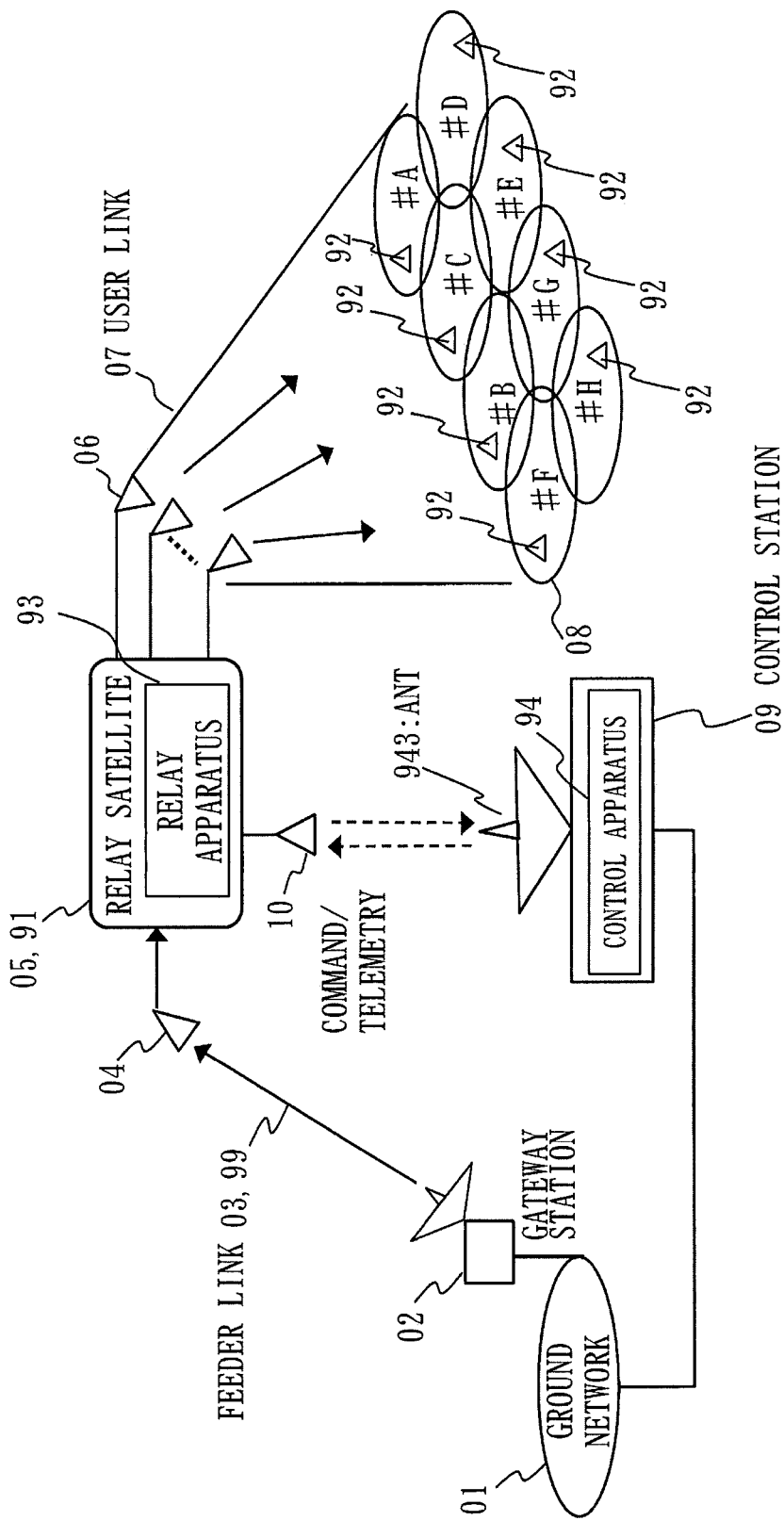
FIG. 1 is a diagram of an embodiment 1 and is a system configuration diagram of a multi-beam satellite communication system 95.

FIG. 1 illustrates a configuration of the multi-beam satellite communication system 95 in the embodiment 1. As illustrated in FIG. 1, network configuration in the embodiment 1 is a star type. The multi-beam satellite communication system 95 of FIG. 1 has a configuration in which a gateway (GW) station 02 connected to a ground network 01 transmits each signal via the relay apparatus 93 to a plurality of user terminals which are communication devices 92 present in eight beam areas 08 (#A to #H) corresponding to service areas.

The relay apparatus 93 is mounted on the relay satellite 05 which is an artificial satellite 91 and relays communication of the communication device 92 present in each beam area of the plurality of beam areas #A to #H. The control station 09 includes a control apparatus 94. A configuration of the control station 09 will be described with reference to FIGS. 2 and 3 below.

In FIG. 1, reference numeral 03 indicates a feeder link (upstream) and reference numeral 07 indicates a user link (downstream). The relay apparatus 93 receives a plurality of uplink signals from the GW station by a feeder link receiving antenna 04, and performs demultiplexing and frequency conversion to the eight beam areas, and then transmits the signals from a user link transmitting antenna 06 to the eight beam areas 08 (#A to #H). Further, the control station 09 in FIG. 1 performs network commands/controls such as each command and monitor (telemetry) to the relay apparatus 93, and frequency assignment of the plurality of user terminals present in the eight beam areas 08 (#A to #H).

The control station 09 constantly keeps track of and manages frequency use situation and communication traffic of each carrier in both a forward link and a return link, and performs frequency assignment and a command to the relay apparatus 93 when a new communication request is generated from a ground network or the beam area.

The control station 09 receives the communication request from the user terminals present in the ground network or from the user terminals present in the beam areas 08 (#A to #H) via the ground network or via {GW station, ground network} from the return link. Then, the control station 09 performs transmission permission and frequency assignment of each carrier signal for each terminal, to establish a communication link. Further, the control station 09 controls the relay apparatus 93 as appropriate by using a command/telemetry line. The relay apparatus 93 determines signal processing inside the relay apparatus 93 based on a command signal received from the control station 09 via a command/telemetry antenna 10. This signal processing is roughly divided into an analog channelizer processing and a digital channelizer processing, and it is determined by the command signal whether each carrier signal is relayed via an analog channelizer 5A or via a digital channelizer 5D.

The control apparatus 94 provided in the control station 09 will be described with reference to FIGS. 2 and 3.

Figure 2:
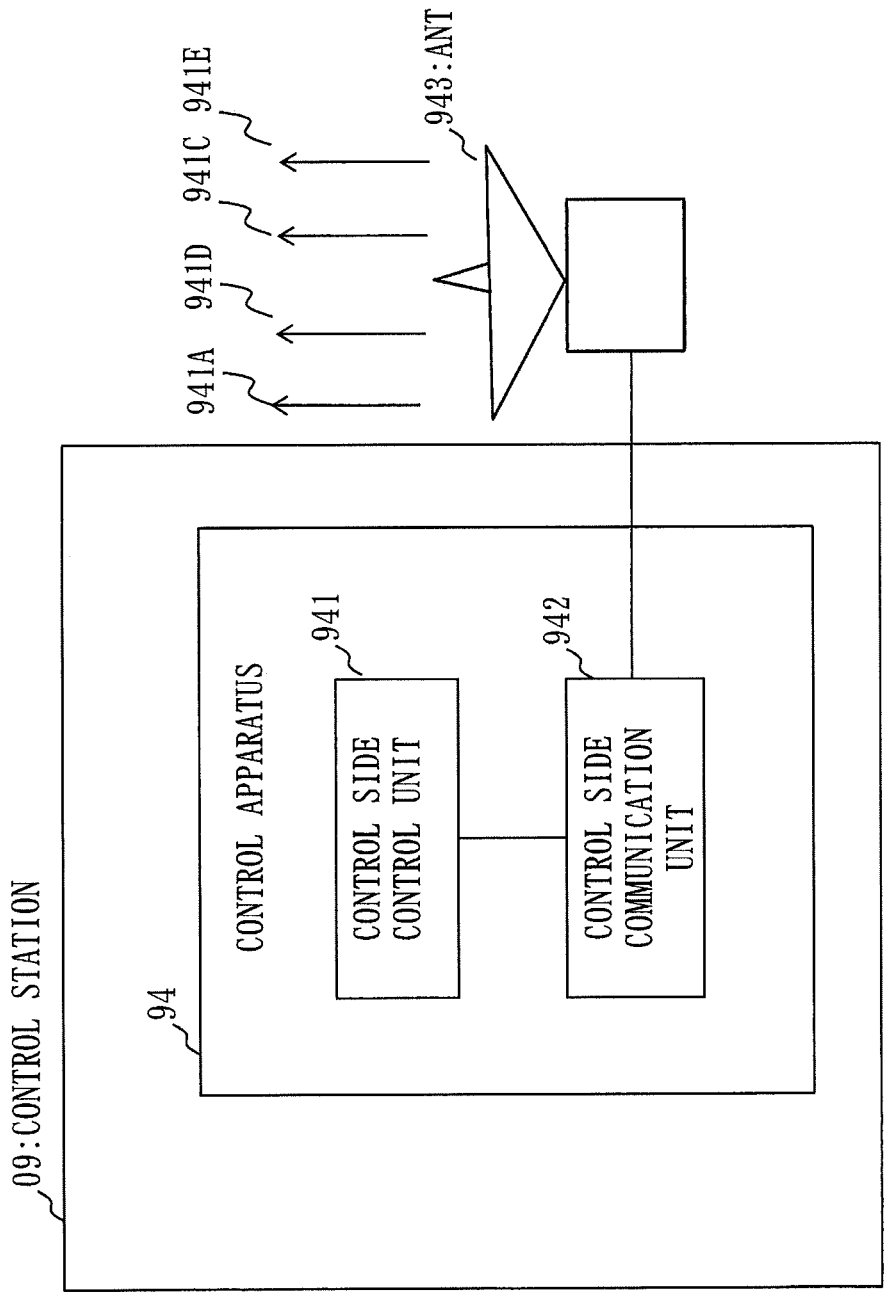
FIG. 2 is a diagram of the embodiment 1 and is a block diagram of a control apparatus 94.

FIG. 2 illustrates a functional block diagram of the control apparatus 94.

Figure 3:
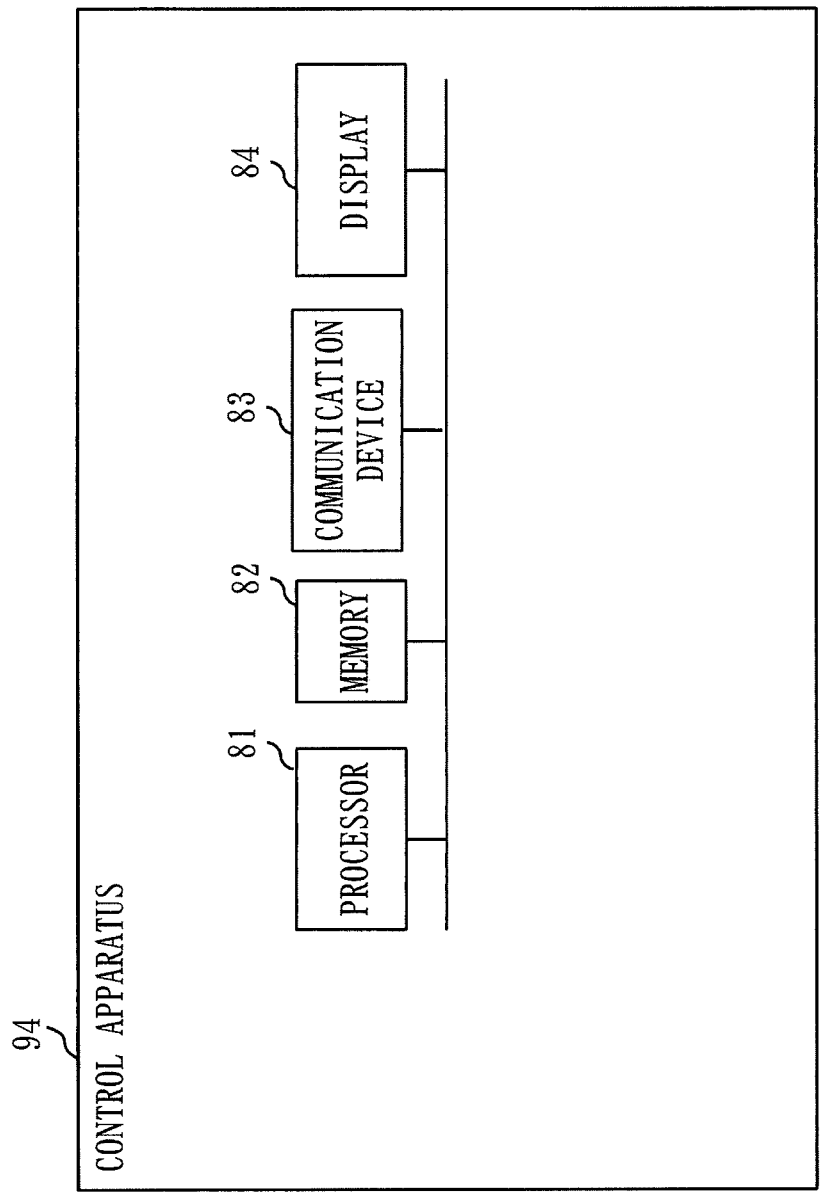
FIG. 3 is a diagram of the embodiment 1 and is a hardware configuration diagram of the control apparatus 94.

FIG. 3 illustrates a hardware configuration of the control apparatus 94. The control apparatus 94 includes a control side control unit 941 and a control side communication unit 942. The control side control unit 941 generates an analog relay unit control signal 941A, a digital relay unit control signal 941D, a change control signal 941C, and the like which will be described below, and transmits these signals to the relay apparatus 93 via the control side communication unit 942. The control side communication unit 942 transmits the analog relay unit control signal 941A, the digital relay unit control signal 941D, the change control signal 941C, and the like from a control antenna 943.

A signal which is the basis of each frequency conversion amount (ΔFDA, ΔFDB, ΔFDC) (Step S01 in FIG. 6) and a signal which is the basis of a frequency conversion amount ΔFDD (Step S011 in FIG. 7) to be described later are transmitted from the control apparatus 94. The signal which is the basis of each frequency conversion amount (ΔFDA, ΔFDB, ΔFDC) is an example of the analog relay unit control signal 941A, and the signal which is the basis of the frequency conversion amount ΔFDD (Step S01) is an example of the digital relay unit control signal 941D. The change control signal 941C is generated by the control side control unit 941 in Step S033 of FIG. 11 which will be described below.

As illustrated in FIG. 3, the control apparatus 94 is a computer, and includes a processor 81, a memory 82, a communication device 83, and a display 84. The processor 81 executes a program. The program for realizing function of the control side control unit 941 illustrated in FIG. 2 is stored in the memory 82. Then, the processor 81 executes the program and executes the operation of the control side control unit 941. The communication device 83 realizes the control side communication unit 942. The processor 81 is an IC (Integrated Circuit) which performs processing. The processor 81 is a CPU (Central Processing Unit), a DSP (Digital Signal Processor), or the like. The memory 82 illustrated in FIG. 3 is a RAM (Random Access Memory), ROM (Read Only Memory), HDD (Hard Disk Drive), or the like. The memory 82 also stores an OS (Operating System) in addition to the program realizing the control side control unit 941. At least a part of the OS is executed by the processor 81. Although one processor is illustrated in FIG. 3, a plurality of processors may be provided. Information, data, signal values, and variable values indicating processing results of the control side control unit 941 are stored in the memory 12 or a register or a cache memory in the processor 11.

The "unit" of the control side control unit 941 may be replaced with "circuit", "process", "procedure" or "processing". In addition, the control side control unit 941 may be realized by electronic circuits such as a logic IC (Integrated Circuit), a GA (Gate Array), an ASIC (Application Specific Integrated Circuit), and a FPGA (Field-Programmable Gate Array). Incidentally, the processor and the above-mentioned electronic circuits are collectively referred to as a processing circuitry.

Figure 4:
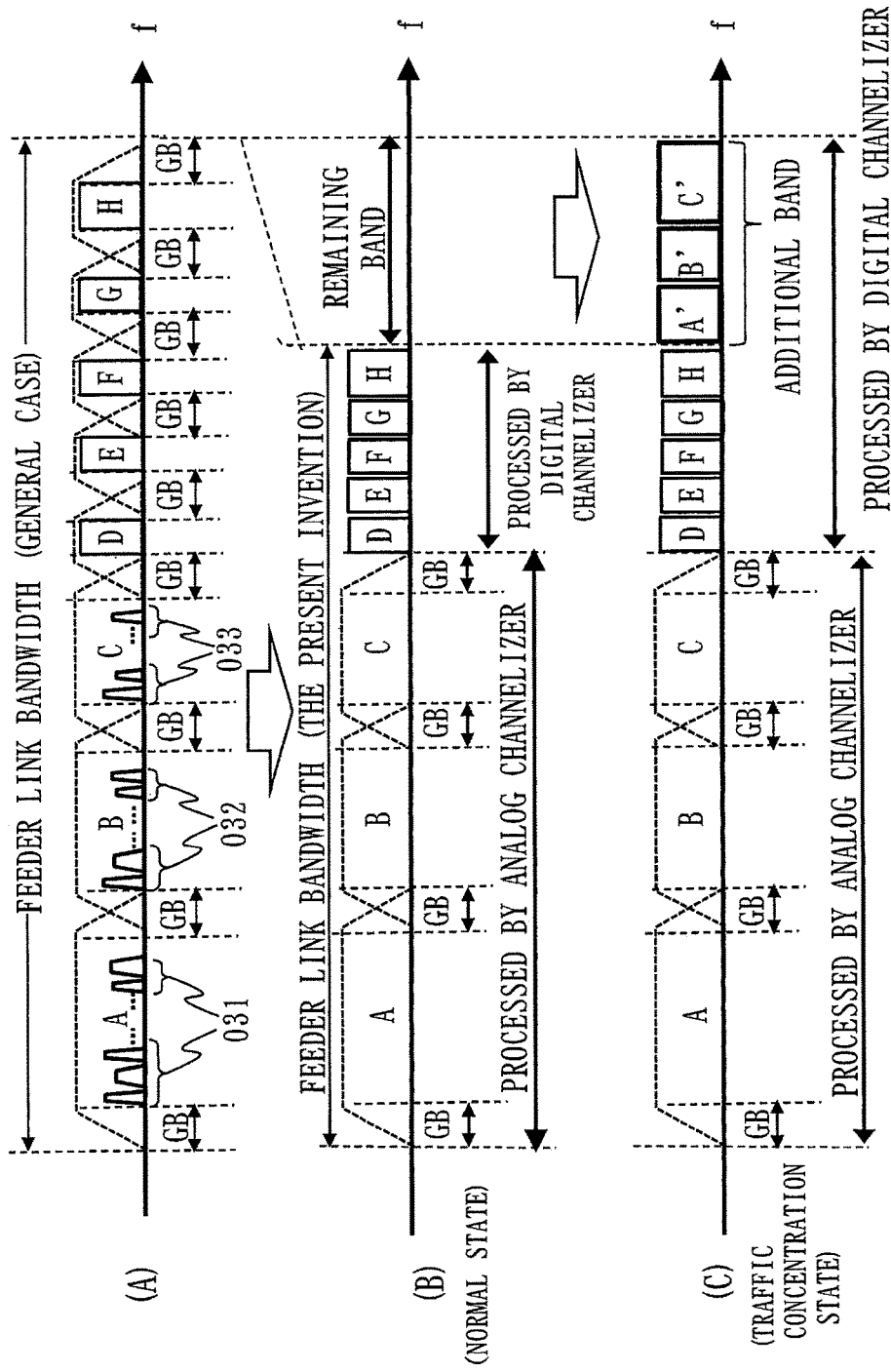
FIG. 4 is a diagram of the embodiment 1 and is a diagram illustrating each frequency allocation in a feeder link (forward upstream) illustrated in FIG. 1.

Among the eight beam areas 08 (#A to #H) illustrated in FIG. 1, {#A, #B, #C} include a metropolitan area, a major city, and the like where population concentrates, and are beam areas in which there are many user terminals and a lot of stationary communication traffic. On the other hand, the other beam areas {#D, #E, #F, #G, #H} are beam areas such as rural areas and small islands with few user terminals and small stationary communication traffic. (A) of FIG. 4 illustrates an example in the case of arranging frequencies using only the analog channelizer 5A under such conditions, and (B), (C) of FIG. 4 illustrate examples in the case of arranging frequencies in the embodiment 1. (B) of FIG. 4 illustrates a normal state, and (C) of FIG. 4 illustrates a traffic concentration state.

FIG. 4 illustrates each frequency allocation in the feeder link (forward upstream) illustrated in FIG. 1, wherein (A) of FIG. 4 illustrates an example in a case where a general technology is applied, and (B), (C) of FIG. 4 illustrate an example in the case of frequency allocation according to the embodiment 1 of the present invention. In FIG. 4, a signal bandwidth allocated to each area is indicated by each square, and alphabets (A to H) described in the squares correspond to signal bandwidths allocated to the corresponding beam areas (#A to #H). Further, alphabets {A', B', C'} described in squares in (C) of FIG. 4 correspond to signal bandwidths additionally allocated to each of the beam areas {#A, #B, #C}.

A plurality of carriers are transmitted in the allocated bandwidths from the GW station 02 to each beam area. For example, in (A) of FIG. 4, reference numeral 031 indicated in the allocated band of A indicates a plurality of carriers transmitted from the GW station 02 to the beam area #A, reference numeral 032 indicated in the allocated band of B indicates a plurality of carriers transmitted from the GW station 02 to the beam area #B, and reference numeral 033 indicated in the allocated band of C indicates a plurality of carriers transmitted from the GW station 02 to the beam area #C. Similarly, such carriers may exist in other allocated bands (D to H). Further, also in (B), (C) of FIG. 4, a plurality of carriers may exist in each allocated band (D to H), but they are not shown in this figure.

As described in the problem (A1), the analog channelizer 5A needs to provide a frequency band corresponding to a transition band of an analog BPF as a guard band, and a guard band width required for the analog channelizer 5A is indicated as "GB" in FIG. 4.

Here, by using channelizer function, the allocated bandwidth is widely given to the beam areas (#A, #B, #C) in which there are many user terminals and large stationary communication traffic. On the other hand, it is possible to narrowly allocate the allocated bandwidth to the beam areas (#D, #E, #F, #G, #H) with few user terminals and small stationary communication traffic. Both (A) of FIG. 4 and (B) of FIG. 4 illustrate band allocation according to such communication traffic.

Differences between (A) of FIG. 4 and (B) of FIG. 4 will be described below. As illustrated in (A) of FIG. 4, when frequency allocation is performed using only the analog channelizer 5A, it is necessary to arrange an interval corresponding to the guard band 1 GB) even for the beam areas {#D, #E, #F, #G, #H} with a small allocated bandwidth. In this case, as illustrated in (A) of FIG. 4, a ratio of the guard band (GB) to the beam areas #A, #B, #C ensuring a wide allocated bandwidth is small. However, a ratio of the guard band (GB) to the beam areas #D, #E, #F, #G, #H setting a narrow allocated bandwidth is large. Therefore, in the case of frequency allocation using "only the analog channelizer 5A", an overall frequency utilization efficiency decreases in the case of the embodiment 1.

On the other hand, as illustrated in (B) of FIG. 4, in the multi-beam satellite communication system 95 according to the embodiment 1, the analog channelizer 5A is in charge of signal relay to the beam areas #A, #B, #C in which there are many users and large stationary communication traffic. Further, the digital channelizer 5D is in charge of signal relay to the beam areas #D, #E, #F, #G, #H with few users and small stationary communication traffic. As described above, the digital channelizer can set the guard band to a smaller value such as less than ¹⁄₁₀₀ as compared with the analog channelizer 5A. Therefore, the digital channelizer performs signal relay to the beam areas #D, 14E, #F, #G, #H having small communication traffic and a narrow allocated bandwidth, and thus as illustrated in (B) of FIG. 4, it is possible to narrow the interval between the allocated bands of the beam areas #D, #E, #F, #G, #H while holding the same relay amount as in (A) of FIG. 4. Consequently, as a result, the frequency bandwidth required for the feeder link can be reduced as compared with (A) of FIG. 4.

Relay control for selectively using two kinds of analog and digital channelizers according to the stationary communication traffic is performed by the control station 09 in FIG. 1.

Incidentally, if the digital channelizer performs relay processing including the signal relay to the beam areas #A, #B, #C, the interval between the allocated bands of the beam areas # A, #B, #C can also be narrowed, and thus it is possible to further reduce the frequency bandwidth required for the feeder link. Meanwhile, since the power consumption increases in proportion to the bandwidth processed by the digital channelizer, it is difficult in terms of feasibility.

Therefore, the control station 09 in the embodiment 1 controls the signal relay to the beam areas #A, #B, #C, in which the stationary communication traffic is large and the allocated bandwidth is widened, so as to use the analog channelizer 5A which does not cause an increase in power consumption even if the band is broadened.

That is, the communication traffic in a predetermined measurement period T1 of the beam area in which a relay signal 99 is relayed via the digital channelizer 5D is smaller than the communication traffic in the same measurement period T2 as the period T1 of the beam area in which the relay signal 99 is relayed via the analog channelizer 5A. More specifically, the predetermined measurement period T1 of the beam areas #D to #H in which the relay signal 99 is relayed via the digital channelizer 5D is set to 9:00 to 17:00. The measurement period T2 of the beam areas #A to #C in which the relay signal 99 is relayed via the analog channelizer 5A is the same as the measurement period T1 of 9:00 to 17:00. In this case, any communication traffic in the beam areas #D to #H in the measurement period T1 is smaller than any communication traffic in the beam areas #A to #C in the measurement period T2.

Figure 5:
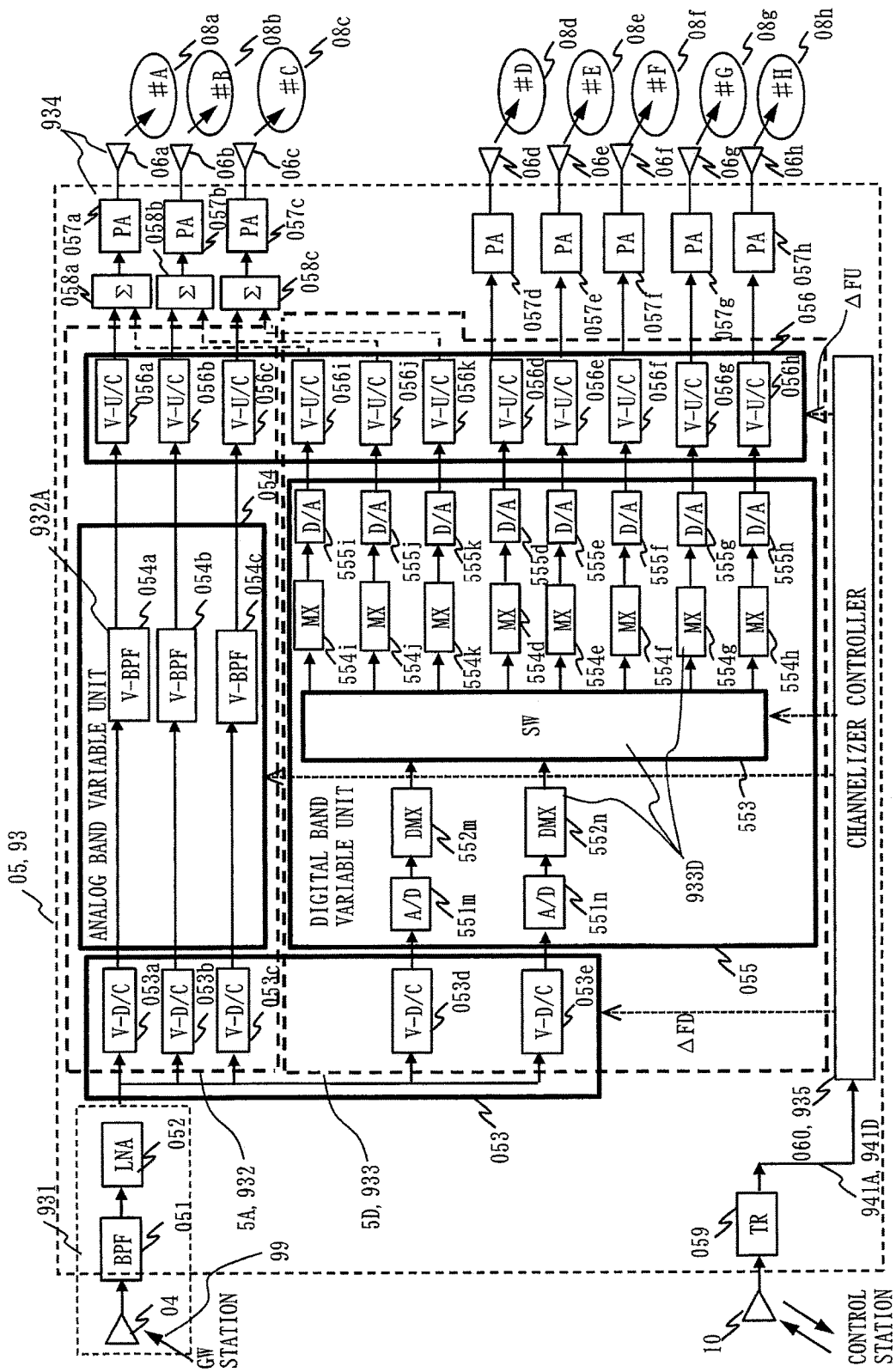
FIG. 5 is a diagram of the embodiment 1 and is a diagram illustrating a configuration on a forward link side of a relay apparatus.

FIG. 5 illustrates a configuration example on the forward link side of the relay apparatus 93 in the embodiment 1. As in an embodiment 3 (FIG. 17) described below, the configuration of the return link side is also the same as the configuration on the forward link side in FIG. 5.

Figure 13:
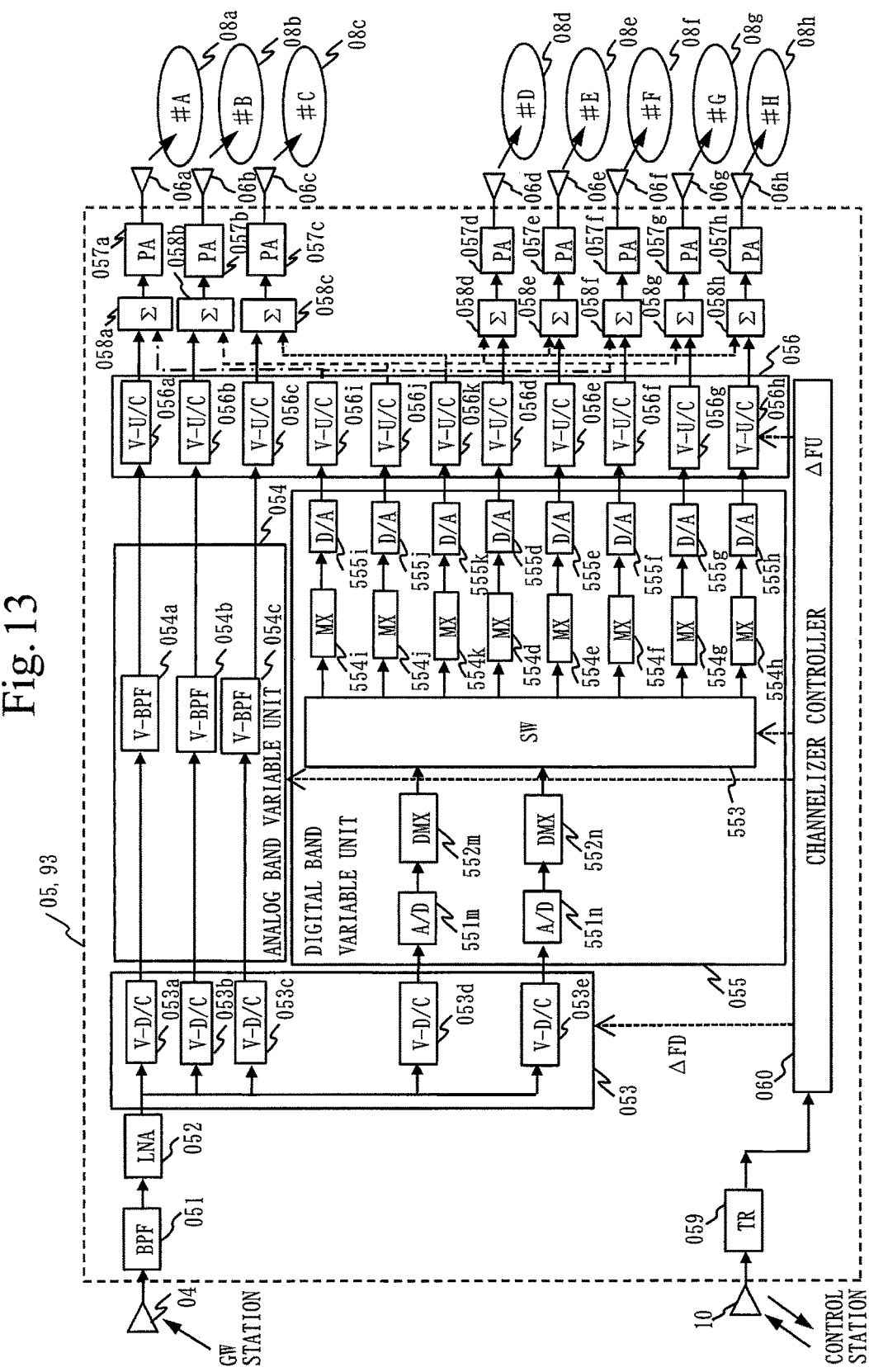
FIG. 13 is a diagram of the embodiment 2 and is a diagram illustrating a configuration of the relay apparatus.
Figure 17:
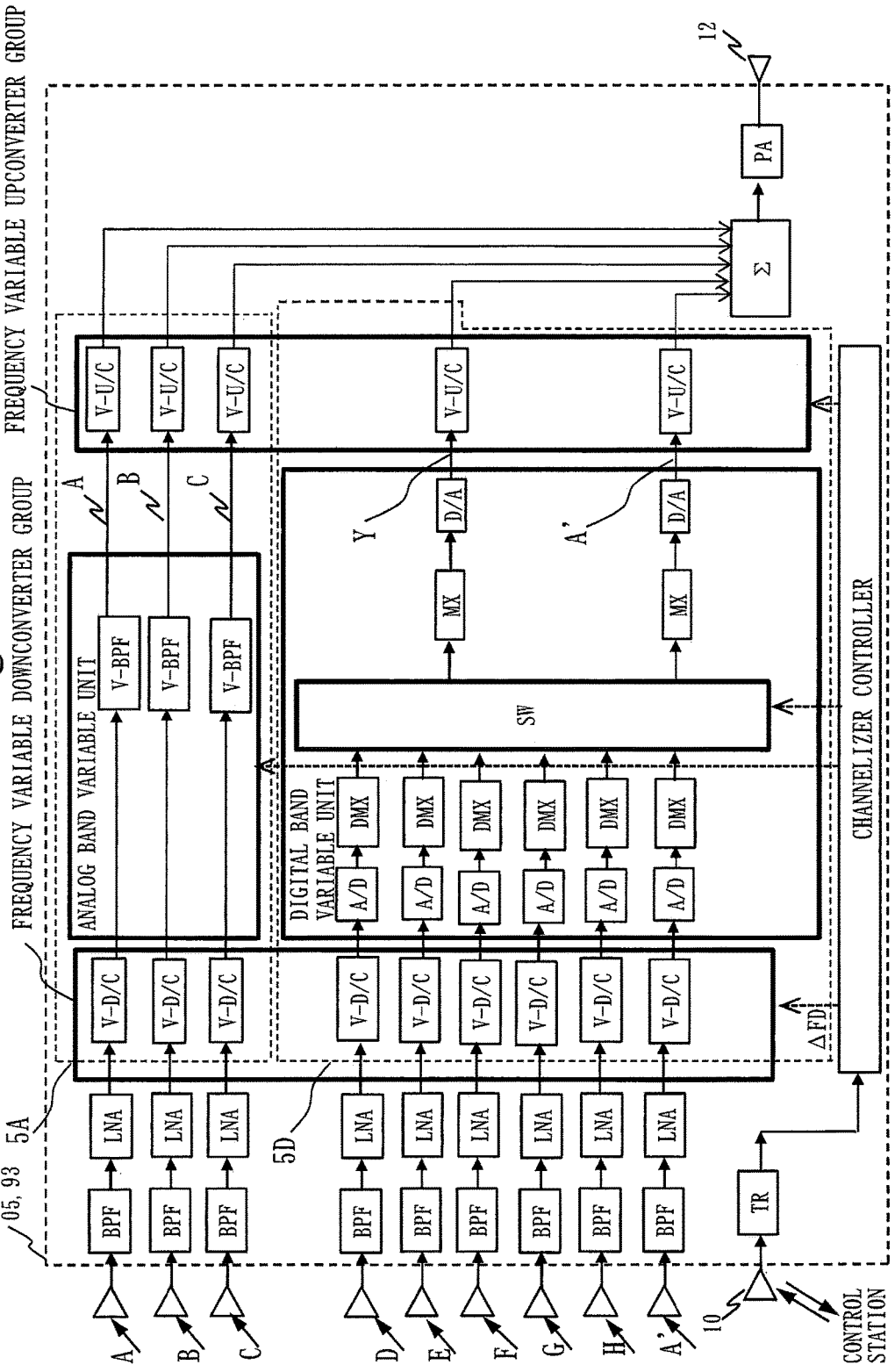
FIG. 17 is a diagram of the embodiment 3 and is a diagram illustrating a configuration of the relay apparatus on the return link side.
Figure 20:
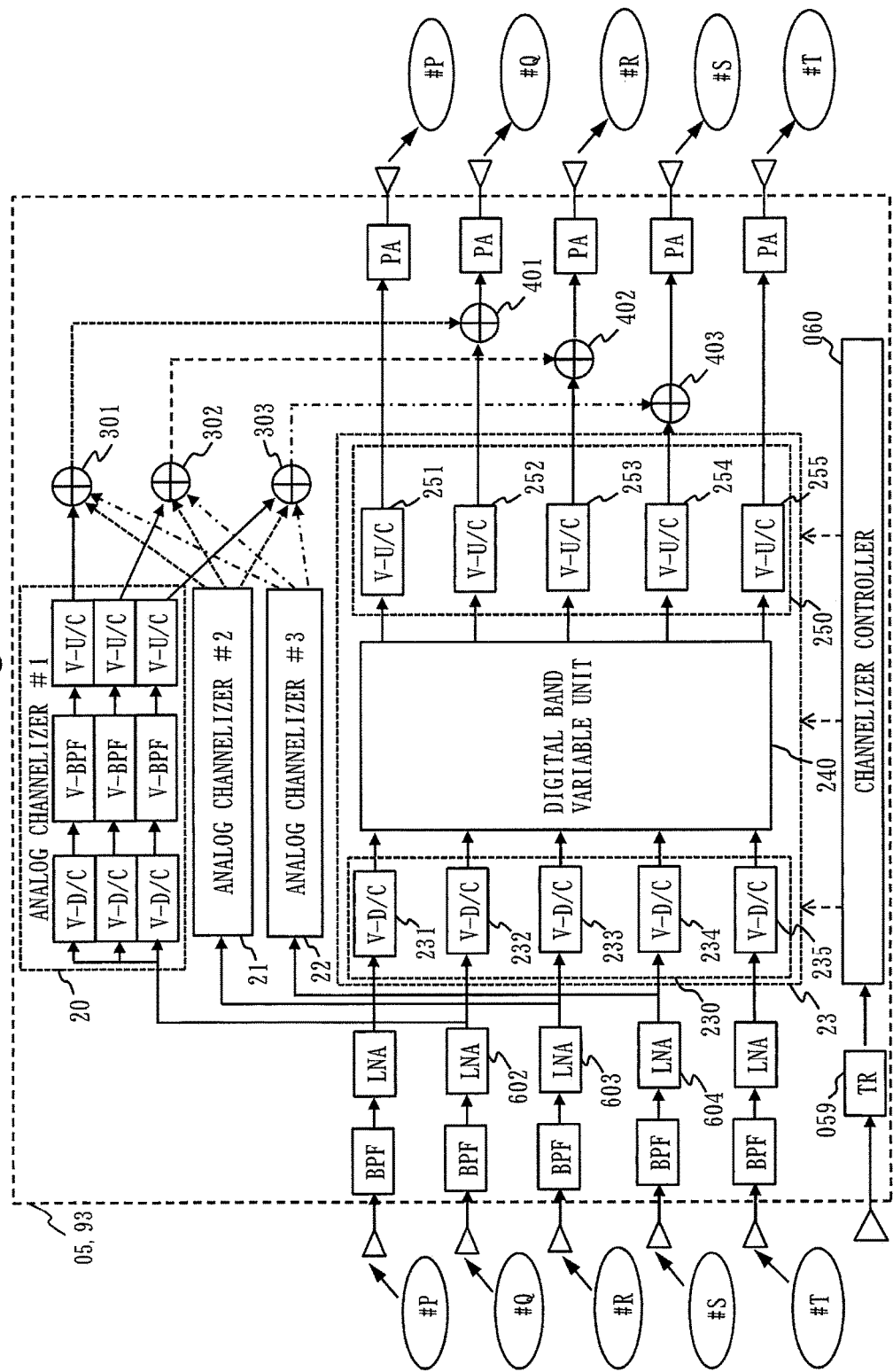
FIG. 20 is a diagram of the embodiment 4 and is a diagram illustrating a configuration of the relay apparatus.

The relay apparatus 93 includes a relay side receiving unit 931, an analog relay unit 932, a digital relay unit 933, a relay side transmitting unit 934, and a relay side control unit 935. FIG. 5 of the configuration of the forward link side is as follows. FIG. 13, FIG. 17, and FIG. 20, which will be described below, have the same configuration as FIG. 5.

(1) The relay side receiving unit 931 is configured with the feeder link receiving antenna 04, a BPF (an analog band-pass filter) 051, and an LNA 052 (a low noise amplifier). The relay side receiving unit 931 receives the relay signal 99 to be relayed. In FIG. 5, the relay signal 99 is transmitted on the forward link by the GW station 02.

(2) The analog relay unit 932 is the analog channelizer 5A to be described below. The analog channelizer 5A has an analog circuit 932A for controlling the frequency bandwidth of the relay signal 99 and outputs the relay signal 99 whose frequency bandwidth is controlled. The analog circuit 932A includes V-BPFs (analog band variable filters) 054a to 054c.

(3) The digital relay unit 933 is the digital channelizer 5D to be described below. The digital channelizer 5D has a digital circuit 933D for controlling the frequency bandwidth of the relay signal 99, and outputs the relay signal 99 whose frequency bandwidth is controlled. The digital circuit 933D includes a plurality of digital demultiplexing units 552 (DMX), a switch matrix 553 (SW), a plurality of multiplexing units 554 (MX), and the like.

(4) The relay side transmitting unit 934 is configured with a plurality of power amplifiers 057 (PA) and a plurality of user link transmitting antennas 06. The relay side transmitting unit 934 transmits the relay signal 99 output from the analog channelizer 5A or the digital channelizer 5D.

(5) The relay side control unit 935 is a channelizer controller 060 to be described below.

The channelizer controller 060 causes the analog channelizer 5A and the digital channelizer 5D to output the relay signal 99, according to the analog relay unit control signal 941A and the digital relay unit control signal 941D. Here, the analog relay unit control signal 941A is a signal indicating the frequency band of the relay signal 99 to be relayed by the analog channelizer The digital relay unit control signal 941D is a signal indicating the frequency band of the relay signal 99 to be relayed by the digital channelizer 5D. The analog relay unit control signal 941A and the digital relay unit control signal 941D are generated by the control side control unit 941 of the control apparatus 94 which will be described below and are transmitted from the control side communication unit 942 to the relay apparatus 93 mounted on the relay satellite 05.

In FIG. 5 with the same reference numerals as in FIG. 1, (1) The BPF 051 (analog band-pass filter) extracts the frequency band used in the multi-beam satellite communication system 95 from the uplink signal (relay signal 99) received via the feeder link receiving antenna 04, and removes unnecessary frequency components outside the system band.

(2) The LNA 052 (low noise amplifier) low-noise amplifies the signal extracted by the BPF 051, and then inputs the amplified signal to a frequency variable downconverter group 053 (V-D/C053a to V-D/C053e) in the subsequent stage.

Here, in FIG. 5, the analog channelizer 5A in the embodiment 1 is realized by three functional blocks of a frequency variable downconverter group 053 (V-D/C053a to 053c), an analog band variable unit 054, and a frequency variable upconverter group 056 (V-U/C056a to 056c) as surrounded by a dotted line.

Similarly, the digital channelizer 5D in the embodiment 1 is realized by three functional blocks of a frequency variable downconverter group 053 (V-D/C053d, 053e), a digital band variable unit 055, and a frequency variable upconverter group 056 (V-U/C056d to 056h, 056i-056k) as surrounded by a dotted line.

As described above, both the analog channelizer 5A and the digital channelizer 5D according to the embodiment 1 have the frequency variable downconverter group 053 and the frequency variable upconverter group 056 as the common function. However, in fact, as the connection illustrated in FIG. 5, (1) In the analog channelizer processing, three frequency variable downconverters 053a, 053b, 053c in the frequency variable downconverter group 053 are used.

(2) In the digital channelizer processing, two frequency variable downconverters 053d, 053e are used.

(3) Similarly, in the analog channelizer processing, three frequency variable upconverters 056a, 056b, 056c in the frequency variable upconverter group 056 are used.

(4) In the digital channelizer processing, eight frequency variable upconverters 056d, 056e, 056f, 056g, 056h, 056i, 056j, 056k are used.

(5) In FIG. 5, a command/telemetry transponder 059 demodulates and decodes the command signal received from the control station 09 via the command/telemetry antenna 10.

(6) The channelizer controller 060 performs the following setting based on command data (the command from the control station 09) demodulated and decoded by the transponder 059. That is, the channelizer controller 060 sets a frequency conversion amount of each of the frequency variable downconverters 053a to 053e, a pass-band width of each of the analog band variable filters 054a to 054c of the analog band variable unit 054, a switch routing of the digital band variable unit 055, and a frequency conversion amount of each of the frequency variable upconverters 056a to 056k.

By performing such setting, the relay apparatus 93 realizes reduction of the frequency bandwidth of the feeder link by simultaneous use of the analog channelizer 5A and the digital channelizer 5D, for example as illustrated in (B) of FIG. 4.

<*Explanation of Operation*>

Details of the operation of the relay apparatus 93 realizing (B) of FIG. 4 will be described with reference to FIGS. 5, 6, 7.

Figure 6:
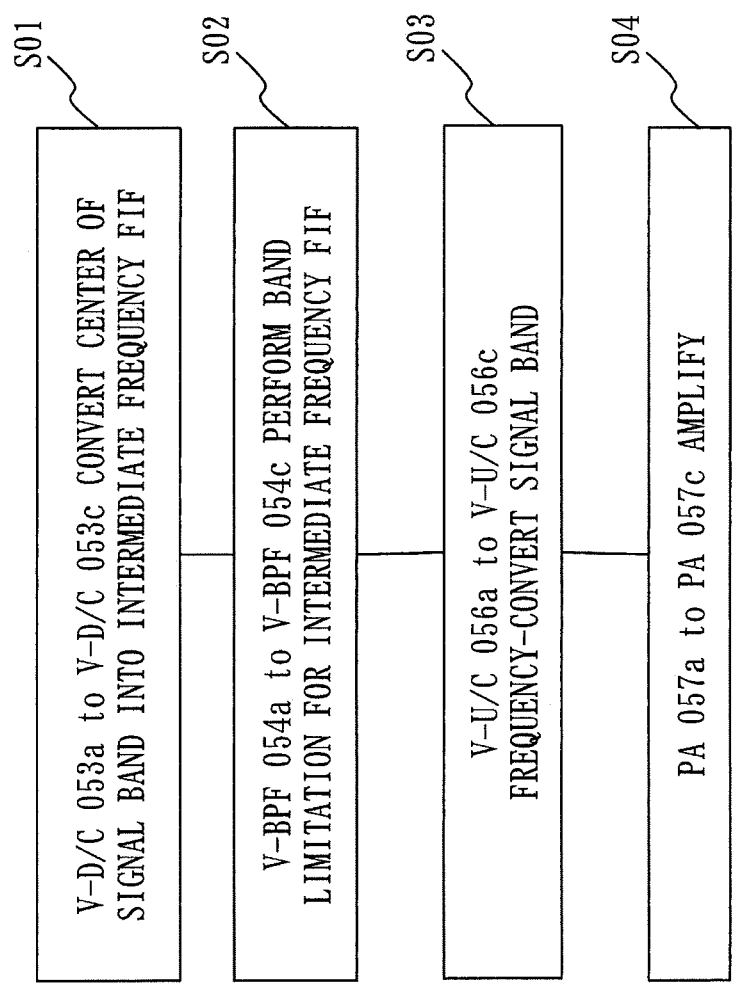
FIG. 6 is a diagram of the embodiment 1 and is a flowchart of a process of an analog channelizer 5A.

FIG. 6 is a flowchart illustrating the operation of the analog channelizer 5A.

Figure 7:
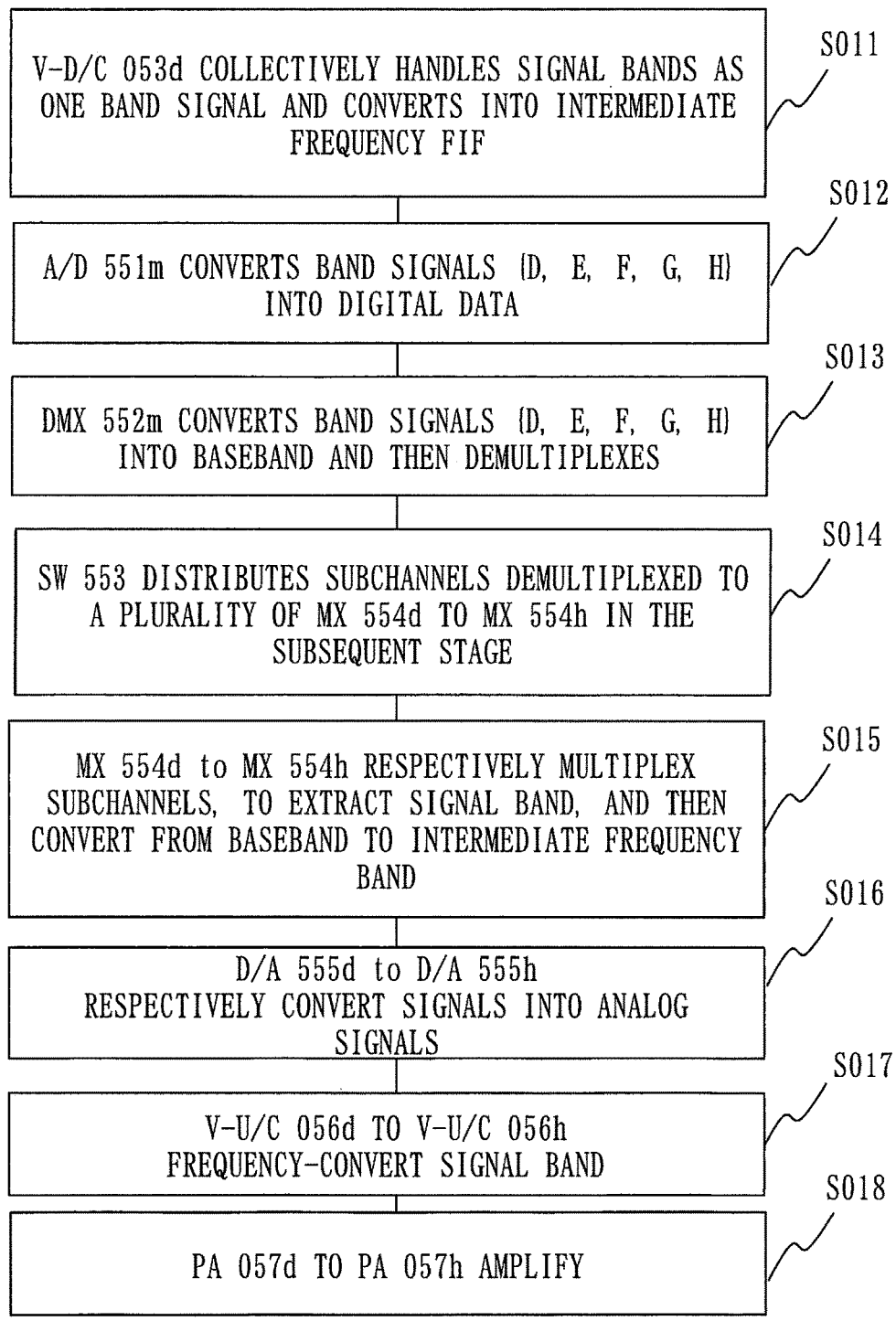
FIG. 7 is a diagram of the embodiment 1 and is a flowchart of a process of a digital channelizer 5D.

FIG. 7 is a flowchart illustrating the operation of the digital channelizer 5D.

In Step SOL the frequency variable downconverter 053a converts a center (radio frequency FA) of a signal band of A in the feeder link illustrated in (B) of FIG. 4 into an intermediate frequency FIF, based on the frequency conversion amount ΔFDA from the channelizer controller 060.

Similarly, the frequency variable downconverter 053b converts a center (radio frequency FB) of a signal band of B illustrated in (B) FIG. 4 into the intermediate frequency FIF, based on the frequency conversion amount ΔFDB from the channelizer controller 060. In addition, the frequency variable down converter 053c converts a center (radio frequency FC) of a signal band of C into the intermediate frequency FIF based on the frequency conversion amount ΔFDC.

Here, each frequency conversion amount (ΔFDA, ΔFDB, ΔFDC) from the channelizer controller 060 is set to a difference between the center frequency (FA, FB, FC) and the intermediate frequency (FIF) of each signal band. Therefore, even when the signal band allocated to each beam area is located anywhere in a feeder link bandwidth illustrated in (B) of FIG. 4, its center frequency can be converted into the intermediate frequency (FIF).

In Step S02, since the bandwidth of each signal converted into the intermediate frequency band in this way is still wide, the analog band variable unit 054 in the subsequent stage performs band limitation with an arbitrary bandwidth constituted by an analog circuit for each signal. A band tuning by this analog circuit may be realized by, for example, a method based on Patent Literature 2.

Specifically, the band variable filter 054a band-limits the signal from the frequency variable downconverter 053a with a bandwidth corresponding to a width A shown in (B) of FIG. 4. A command concerning the bandwidth setting corresponding to the width A is sent from the channelizer controller 060. Thus, by a combination of the band variable filter 054a controlled by the channelizer controller 060 and the frequency variable downconverter 053a in the preceding stage, the relay apparatus 93 according to the embodiment 1 can extract the signal band of A in the feeder link shown in (B) of FIG. 4 while converting it to the intermediate frequency band. Similarly, the relay apparatus 93 can extract the signal band of B shown in (B) of FIG. 4 while converting it to the intermediate frequency hand by a combination of the band variable filter 054b controlled by the channelizer controller 060 and the frequency variable downconverter 053b in the preceding stage. Further, the relay apparatus 93 can extract the signal band of C shown in (B) of FIG. 4 while converting it to the intermediate frequency band by a combination of the band variable filter 054c controlled by the channelizer controller 060 and the frequency variable downconverter 053c in the preceding stage. Note that the frequency allocation illustrated in (B) of FIG. 4 is an example. Each signal bandwidth of A, B, C and its frequency position can be freely changed in a given feeder link bandwidth by the combination of the frequency variable downconverter group 053 and the analog band variable unit 054 even after the relay satellite 05 is launched.

In Step S03, the frequency variable upconverter group 056 converts each signal band {A, B, C} in the intermediate frequency band extracted by the analog band variable unit 054 into an arbitrary downstream (user link) radio frequency based on each frequency conversion amount (ΔFUA, ΔFUB, ΔFUC) from the channelizer controller 060. Specifically, the frequency variable upconverter 056a shown in FIG. 5 converts the signal band of A extracted by the band variable filter 054a in the preceding stage into an arbitrary downstream radio frequency, and in Step S04, a power amplifier (PA) 057a high-power amplifies the signal band of A converted to the downstream radio frequency and transmits it to the beam area #A (08a).

Similarly, the frequency variable upconverter 056b converts the signal band of B into an arbitrary downstream radio frequency, and a power amplifier (PA) 057bhigh-power amplifies the signal band of B, and transmits it to the beam area #B (08b). In addition, the frequency variable upconverter 056c converts the signal band of C into an arbitrary downstream radio frequency, and a power amplifier (PA) 057c high-power amplifies the signal band of C, and transmits it to the beam area #C (08c).

Note that adders 058a, 058b, 058c shown in FIG. 5 add additional allocated signal bands output via the digital band variable unit 055 described below when the traffic temporarily increases, and the outputs of the frequency variable upconverters are the outputs of the adders as it is, when the traffic does not temporarily increase. The operation control in the case where the traffic temporarily increases will be described below.

Figure 8:
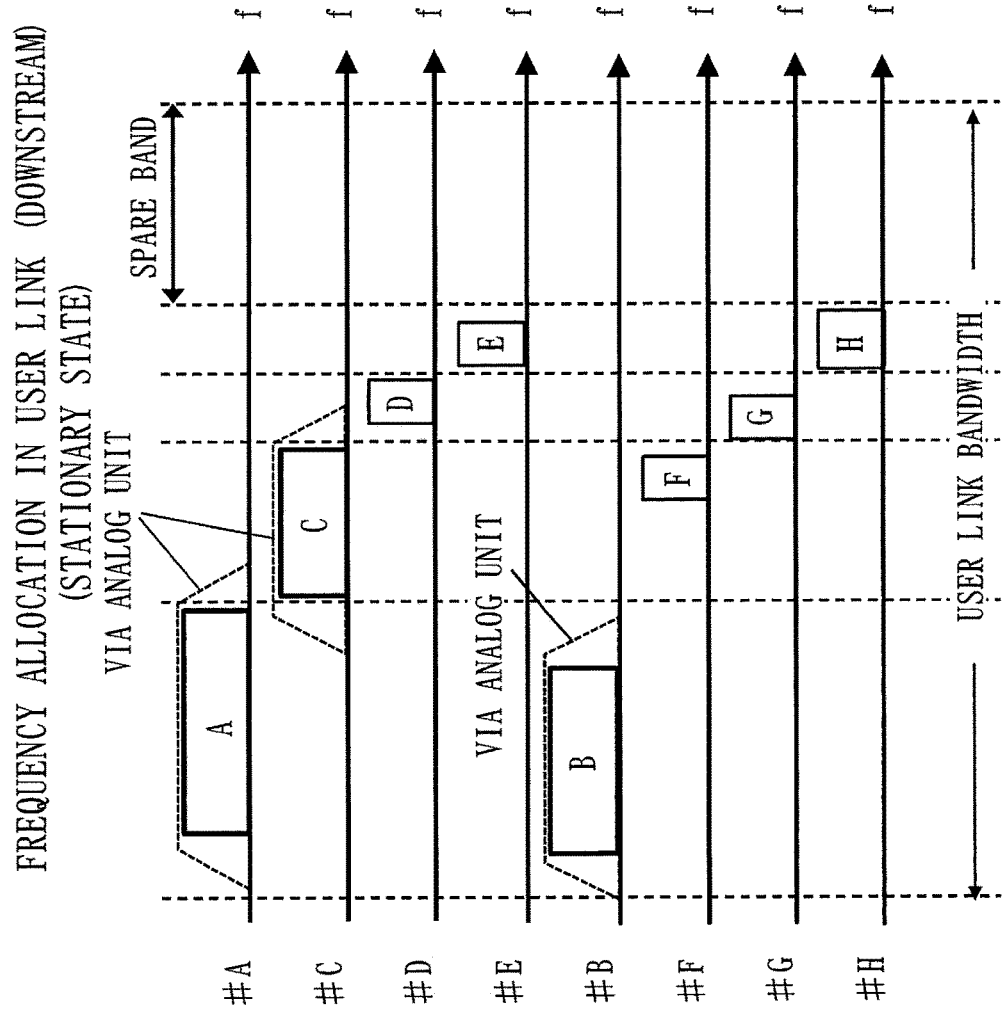
FIG. 8 is a diagram of the embodiment 1 and is a diagram illustrating a frequency allocation of signal bands in a stationary state on a user link side with respect to eight beam areas from #A to #H.

FIG. 8 illustrates a frequency allocation example of signal bands in a stationary state on the user link side with respect to the eight beam areas from # A to H. Among them, the signal bands extracted for the beam areas #A, #B, #C by a series of analog channelizer processing are indicated by {A, B, C} in the figure. The other signal bands are signal bands relayed by the digital channelizer processing described below.

Next, the processing of the digital channelizer 5D in the embodiment 1 will be described with reference to FIG. 7.

In Step S 011, the frequency variable downconverter 053d collectively handles the signal bands of {D, E, F, G, H} shown in (B) of FIG. 4 as one band signal and converts its center frequency into the intermediate frequency FIF, based on the frequency conversion amount ΔFDD from the channelizer controller 060. Next, the frequency downconverter 053d band-limits the signal converted into the intermediate frequency FIF by the band-pass filter or the like so that an aliasing component generated at the time of sampling by the subsequent AD converter does not affect a main signal band. This also applies to the frequency downconverter 053e described below.

In Step S012, an AD converter 551m in the digital band variable unit 055 samples the band signal {D, E, F, G, H} and converts it into digital data.

In Step S013, a digital demultiplexing unit 552m converts the band signal {D, E, F, G, H} converted to the digital data into the baseband, and then demultiplexes it into a plurality of subbands. Since the number of demultiplexing is set to, for example, 100 or more, the band signal of {D, E, F, G, H} is decomposed into several tens of subbands.

In FIG. 5, the frequency variable downconverter 053e, an AD converter 551n, and a digital demultiplexing unit 552n which exist in another system are circuits which operate when the traffic temporarily increases, and the operation is stopped in the stationary state. Details of this operation control will be described below.

In Step S014, the switch matrix 553 distributes subchannels demultiplexed by the digital demultiplexing unit 552m to a plurality of multiplexing units 554d to 554h in the subsequent stage based on routing command information from the channelizer controller 060.

Specifically, among the subchannels demultiplexed by the digital demultiplexing unit 552*m*, the switch matrix 553 distributes the subchannel having a part of the band signal D to the digital multiplexing unit 554*d*, and distributes the subchannel having a part of the band signal E to the digital multiplexing unit 554*e*. Further, the subchannel having a part of the band signal F is distributed to the digital multiplexing unit 554*f*, the subchannel having a part of the band signal G is distributed to the digital multiplexing unit 554*g*, and the subchannel having a part of the band signal H is distributed to the digital multiplexing unit 554*h*.

In Step S015, the digital multiplexing units 554*d* to 554*h* respectively multiplex the subchannels transmitted from the switch matrix 553, to extract a desired signal band, and then convert the signal band from the baseband to the intermediate frequency band. For example, the digital multiplexer 554*d* multiplexes the subchannels transmitted from the switch matrix 553, to reproduce the band signal D, and outputs the band signal of D in the intermediate frequency band. Similarly, the digital multiplexing unit 554*e* reproduces the band signal of E, the digital multiplexing unit 554*f* reproduces the band signal of F, the digital multiplexing unit 554*g* reproduces the band signal of G, the digital multiplexing unit 554*h* reproduces the band signal of H, and the digital multiplexing units output them in the intermediate frequency band.

In Step S016, subsequent D/A converters 555*d* to 555*h* respectively convert the signals D to H into analog signals, and output them from the digital band variable unit 055. By such a series of processing, the digital band variable unit 055 can demultiplex the one band signal {D, E, F, G, H} shown in (B) of FIG. 4 into five of D to H, to extract them.

In Step S017, the frequency variable upconverters 056*d* to 056*h* respectively convert the signals output as the intermediate frequencies from the DA converters 555*d* to 555*h* into an arbitrary downstream (user link) radio frequency based on frequency conversion amounts (ΔFUD, ΔFUE, ΔFUF, ΔFUG, ΔFUH) from the channelizer controller 060.

Finally, in Step S018, power amplifiers 057*d* to 057*h* respectively high-power amplify the signals D to H converted into the radio frequencies, and then respectively transmit the signals D to H to the beam areas #D to #H via transmitting antennas 06*d* to 06*h*.

FIG. 8 illustrates a frequency allocation example of the signals D to H converted to the downstream radio frequency. As described above, in the multi-beam satellite communication system 95 according to the embodiment 1, the control station 09 controls to perform signal relay using the analog channelizer 5A for communication to the three areas where the communication traffic is large, and to perform signal relay using the digital channelizer 5D for communication to the five areas where the communication traffic is small. By this control, as illustrated in (B) of FIG. 4, it is possible to narrow the necessary feeder link bandwidth (increase the frequency utilization efficiency) and to reduce power consumption of the channelizer as compared with a case where the signal relay is performed using only the digital channelizer 5D, while maintaining the same total relay bandwidth as in (A) of FIG. 4.

Next, while operating the frequency allocation of the feeder link (upstream) as shown in (B) of FIG. 4 and the frequency allocation of the user link (downstream) as shown in FIG. 8, an example of the operation when communication traffic demand for the beam areas #A, #B, #C increases and all communication carriers cannot be arranged in the bandwidths A, B, and C as shown in (B) of FIG. 4 will be described. Such an increase of the communication traffic can occur, for example, when a disaster occurs in the beam areas #A, #B, #C, and calling request abruptly increases, or even in the normal state, when the number of users in the beam areas #A, #B, #C increases year by year, or when the number of users increases due to work only during the day.

Although the frequency of outgoing calls is not different from that in the stationary state, when it rains in the beam areas #A, #B and #C, QPSK, BPSK modulation or the like, which is strong against rain attenuation but requires a large bandwidth is selected from multilevel modulation such as APSK, QAM. As a result, since an average bandwidth per one carrier expands, situations where all communication carriers cannot be arranged in the bandwidths A, B, C shown in (B) of FIG. 4 may also occur.

In response to such a situation, as shown in (A) of FIG. 4, it is possible to widen the bandwidth for beam areas #A, #B, #C even with only the analog channelizer 5A. However, as described in the above problem (A2), since it is necessary to temporarily interrupt all communication from the gateway station to each user in the beam areas #A, #B and #C, and then increase the bandwidth, this is not desirable in terms of communication service, and causes inconvenience to the user.

On the other hand, in the multi-beam satellite communication system 95 according to the embodiment 1, it is possible to increase the bandwidth for the areas {#A, #B, #C} by using not only the analog channelizer 5A but also the digital channelizer 5D without causing such communication interruption.

When such communication traffic increase demand or bandwidth increase demand occurs, the control station 09 activates a circuit of another system not used in the stationary state inside the digital channelizer 5D. That is, the control station 09 activates the frequency variable downconverter 053*e*, the AD converter 551*n*, the digital demultiplexing unit 552*n*, digital multiplexing units 554*i* to 554*k*, DA converters 555*i* to 555*k*, and the frequency variable upconverters 056*i* to 056*k*. Then, additional bandwidth allocation is performed using them. When the communication traffic returns to the stationary state, the control station 09 controls to stop these circuits again.

Hereinafter, such communication traffic increase demand or bandwidth increase demand is collectively referred to as "communication traffic increase". The details will be described below.

First, a method of dealing with situations where the communication traffic for the areas #A, #B, #C temporarily increases for several hours or several days will be described. In this case, the digital channelizer 5D performs additional bandwidth allocation required. (C) of FIG. 4 illustrates an example of bandwidth allocation at the time of traffic concentration. In (C) of FIG. 4, A' is an additional allocated band for the beam area #A, B' is an additional allocated band for the beam area #B, and C' is an additional allocated band for the beam area #C, and the allocations are performed by the digital channelizer 5D in the relay apparatus 93. Such an additional band allocation may be performed by narrowing the necessary feeder link band by using both the analog channelizer 5A and the digital channelizer 5D ((B) of FIG. 4) and by additionally allocating the bands for the areas {#A, #B, #C} in a remaining band made by narrowing the feeder link band ((C) of FIG. 4). This additional band allocation by the digital channelizer 5D is also realized by control of the relay apparatus 93 by the control station 09.

Hereinafter, details will be described with reference to a configuration diagram of the relay apparatus 93 illustrated in FIG. 5 and a flowchart in FIG. 9.

Figure 9:
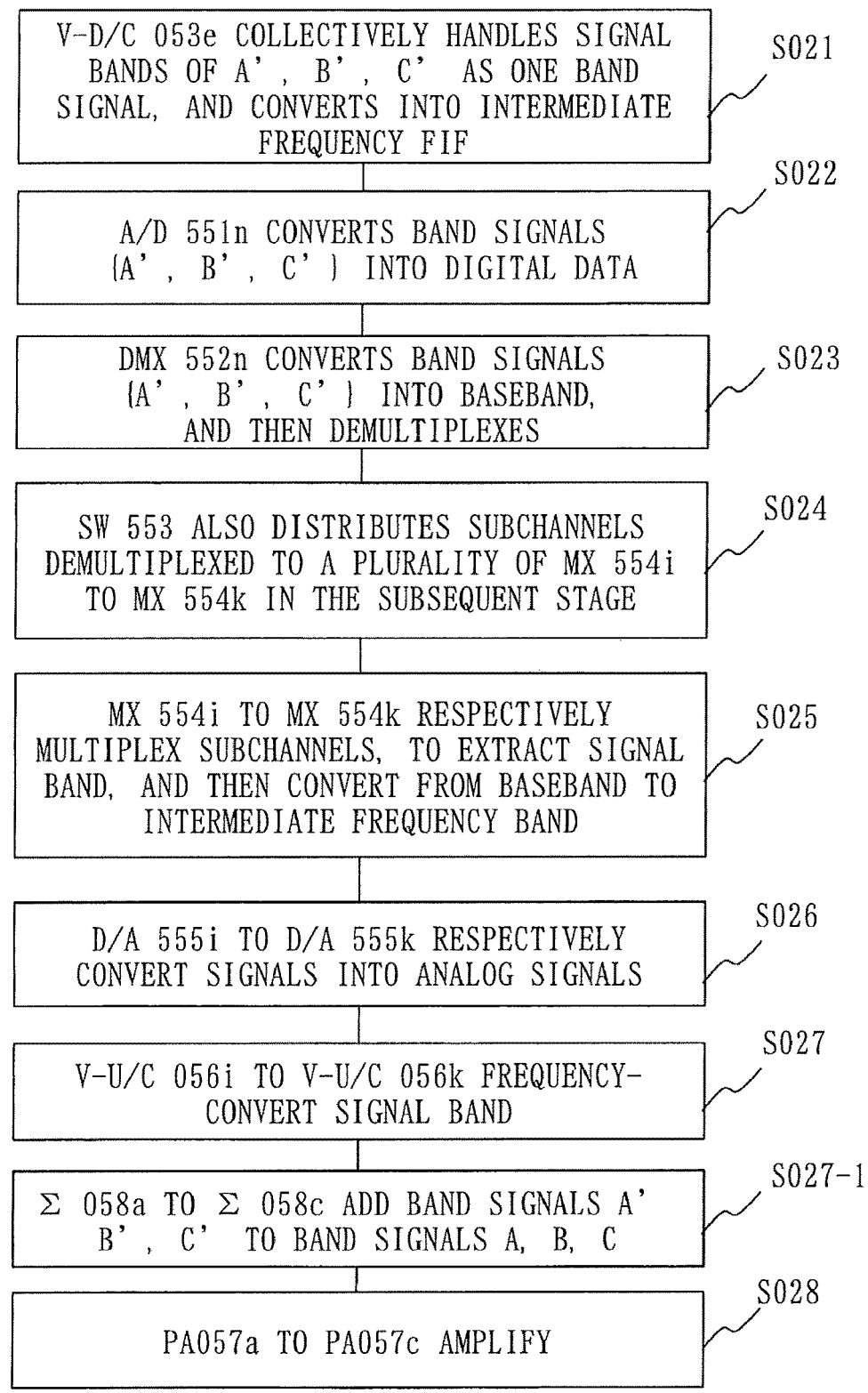
FIG. 9 is a diagram of the embodiment 1 and is a flowchart when the digital channelizer 5D processes a signal band A'B'C'.

FIG. 9 is the flowchart of operation of adding the band signals A', B', C'.

When the above temporary traffic demand occurs, the frequency variable downconverter 053e, the AD converter 551n, and the digital demultiplexing unit 552n start operation.

First, in Step S021, the frequency variable downconverter 053e collectively handles the signal bands of {A', B', C'} shown in (C) of FIG. 4 as one band signal and converts its center frequency into the intermediate frequency FIF, based on the frequency conversion amount ΔFDE from the channelizer controller 060.

A signal which is the basis of a frequency conversion amount ΔFDE is the digital relay unit control signal 941D generated by the control side control unit 941 and transmitted via the control side communication unit 942. In the case of increasing communicable bands of the beam areas #A, #B, #C, the control side control unit 941 generates a signal indicating a new frequency band to be relayed by the digital channelizer 5D as the digital relay unit control signal 941D (corresponding to the frequency conversion amount ΔFDE), and transmits it to the relay apparatus 93 via the control side communication unit 942.

Next, in Step S022, the AD converter 551n in the digital band variable unit 055 samples the band signal {A', B', C' } and converts it into digital data.

In Step S023, the digital demultiplexing unit 552n converts the band signal {A', B', C' } converted to the digital data into the baseband, and then demultiplexes it into a plurality of subbands. The band signal of {A', B', C' } are decomposed into several tens of subbands as with {D, E, F, G, H}.

As described above, before such traffic addition demand occurs, the switch matrix 553 performs processing of distributing the subchannels demultiplexed by the digital demultiplexing unit 552m to the multiplexing units 554d to 554h in the subsequent stage. However, in this case, the subchannels demultiplexed by the digital demultiplexing unit 552n are also distributed to the plurality of subsequent multiplexing units 554i, 554j, 554k at the same time based on the routing command information from the channelizer controller 060 (Step S024).

Specifically, among the subchannels demultiplexed by the digital demultiplexing unit 552n, the switch matrix 553 distributes the subchannel having a part of the band signal A' to the digital multiplexing unit 554i, distributes the subchannel having a part of the band signal B' to the digital multiplexing unit 554j, and distributes the subchannel having a part of the band signal C' to the digital multiplexing unit 554k.

In Step S025, the digital multiplexing units 554i, 554j, and 554k respectively multiplex the subchannels transmitted from the switch matrix 553, to extract a desired signal band, and then convert the signal band from the baseband to the intermediate frequency band. The digital multiplexing unit 554i multiplexes the subchannels transmitted from the switch matrix 553, to reproduce the band signal of A', and outputs the band signal in the intermediate frequency band. Similarly, the digital multiplexing unit 554j reproduces the band signal of B', the digital multiplexing unit 554k reproduces the band signal of C', and the digital multiplexing units output them in the intermediate frequency band.

In step S 026, the subsequent D/A converters 555i, 555j, 555k respectively convert the signals A', B', C' into analog signals, and output them from the digital band variable unit 055. By such a series of processing, the digital band variable unit 055 can demultiplex one band signal {A', B', C'} shown in (B) of FIG. 4 into three of A' to C', to extract them.

In Step S027, the frequency variable upconverters 056i to 056k respectively convert the signals output as intermediate frequencies from the DA converters 555i to 555k into arbitrary downstream (user link) radio frequencies based on frequency conversion amounts (ΔFUI, ΔFUJ, ΔFUK) from the channelizer controller 060.

In Step S 027-1, the adders 058a, 058b, 058c add the band signals A', B', C' converted into the radio frequencies to the band signals A, B, C relayed by the analog channelizer 5A. The adder 058a adds the band signals A' and A, and the high-power amplifier 057a collectively amplifies the added band signals A, A' (Step S028). The amplified signal {A, A'} is transmitted to the beam area #A via a transmitting antenna 06a.

Similarly, the adder 058b adds the band signals B' and B, the adder 058c adds the band signals C' and C, the amplified signal {B, B'} is transmitted to the beam area #B via a transmitting antenna 06b, and the amplified signal {C, C'} is transmitted to the beam area #C via a transmitting antenna 06c.

Figure 10:
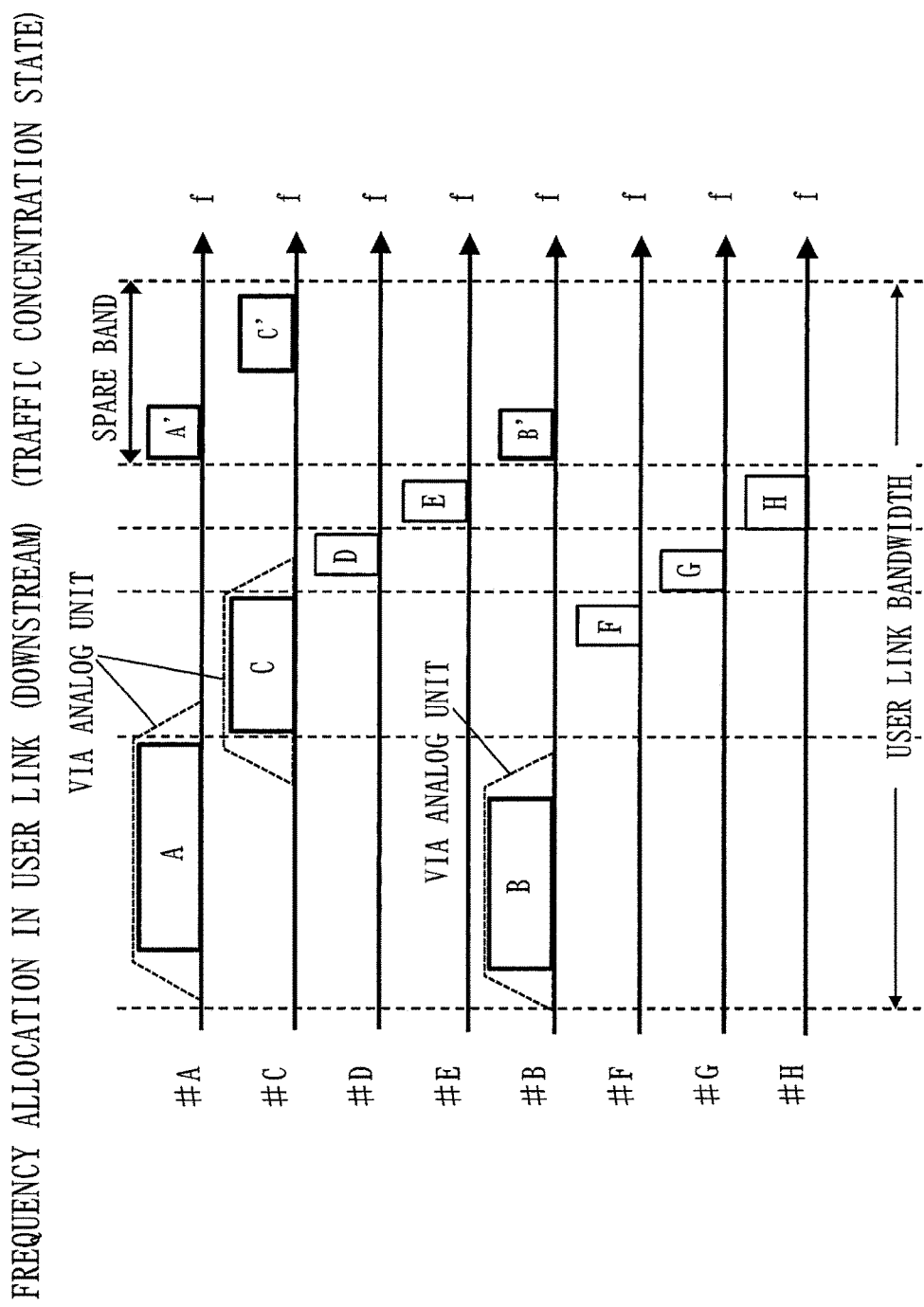
FIG. 10 is a diagram of the embodiment 1 and is a diagram illustrating a frequency allocation in a user link (downstream) when band signals A', B', C' are additionally allocated.

FIG. 10 illustrates an example of frequency allocation in the user link (downstream) when such band signals A', B', C' are additionally allocated. In this example, a spare band is provided within the user link band in preparation for a temporary increase in traffic in advance, and when the temporary increase in traffic occurs, it is controlled such that the band signals A', B', C' are additionally allocated to the spare band.

The positions (center frequencies) of the band signals A', B', C' shown in FIG. 10 are an example, and it is possible to freely change the positions by changing the frequency conversion amounts (ΔFUI, ΔFUJ, ΔFUK) from the channelizer controller 060 to the frequency variable upconverters 056i to 056k.

As described above, in the multi-beam satellite communication system 95 according to the embodiment 1, when the communication traffic temporarily increases such that the bandwidth is insufficient in the signal relay using the analog channelizer 5A, the control station 09 controls the signal relay so that the digital channelizer 5D compensates for the insufficient bandwidth while maintaining the setting of the signal bandwidth of the analog channelizer 5A. By this control, it is possible to deal with a temporary increase in communication traffic without interrupting communication for each user in the beam areas #A, #B, #C.

Next, a method of dealing with situations where an average value of the communication traffic for the areas {#A, #B, # C} gradually increases on a monthly basis or yearly basis will be described with reference to FIG. 11.

Figure 11:
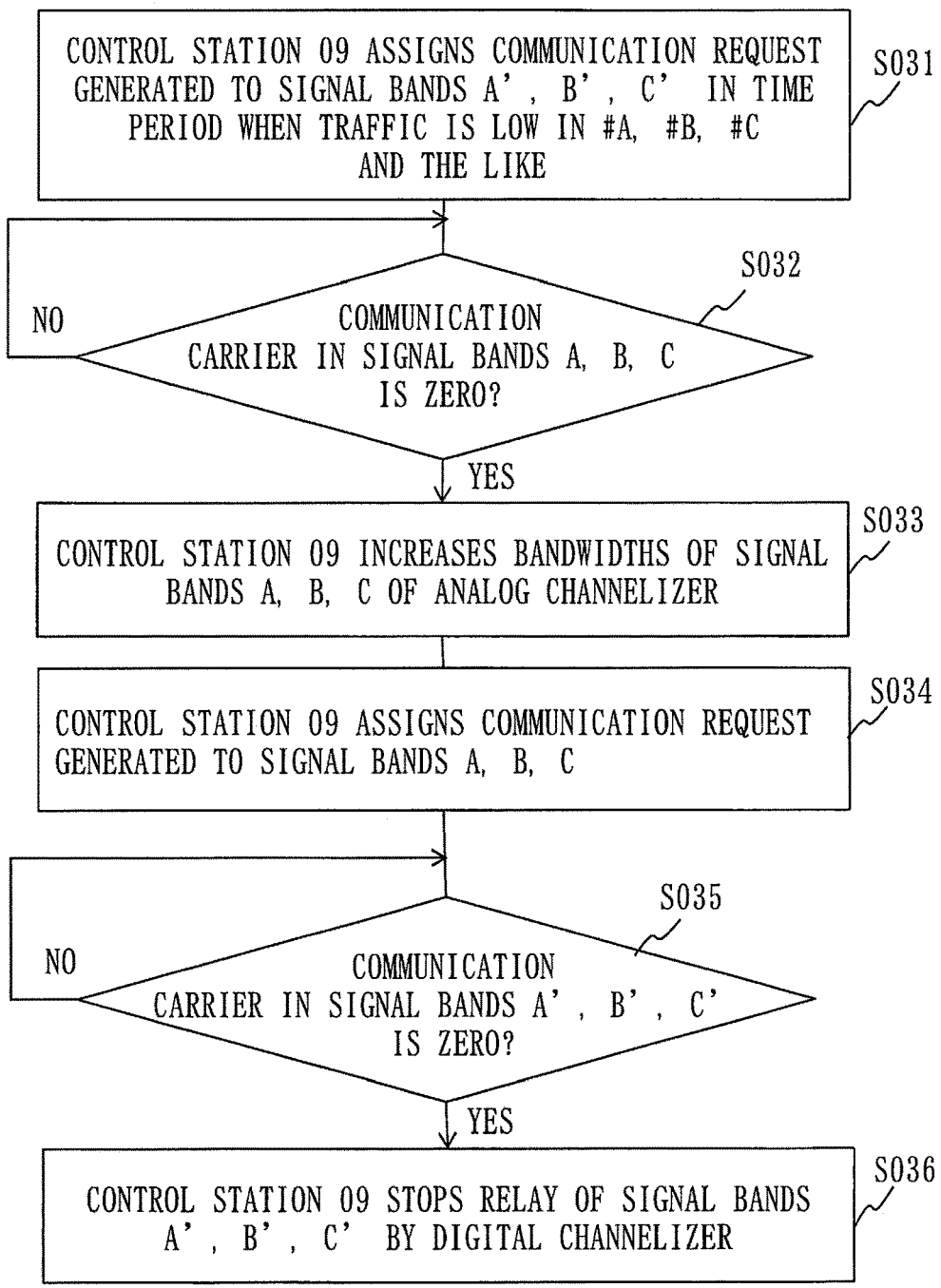
FIG. 11 is a diagram of the embodiment 1 and is a flowchart of a process when a signal band of the analog channelizer 5A is expanded.

FIG. 11 is a flowchart of a process for expanding the signal band of the analog channelizer 5A.

Specifically, while operating the frequency allocation of the feeder link (upstream) as shown in (B) of FIG. 4 and the frequency allocation of the user link (downstream) as shown in FIG. 8, situations where the communication traffic demand for the beam areas #A, #B, #C increases on average and all communication carriers cannot be arranged in the bandwidths A, B, C shown in (B) of FIG. 4 occur almost every day. A method of dealing with situations where the signal relay in which the digital channelizer 5D compensates for the insufficient bandwidth accordingly occurs frequently, for example, during the day will be described. Even when a chronic bandwidth shortage during the day occurs as described above, there is a time zone in which required communication traffic is greatly reduced, such as late night when most users are sleeping.

Therefore, in the embodiment 1, when the communication request to the beam area #A occurs in such a time period when such communication traffic is greatly reduced, the control station 09 controls to assign the frequency of the communication carrier not to the signal band A processed by the analog channelizer 5A shown in (C) of FIG. 4 but to the signal band A' processed by the digital channelizer 5D (Step S031).

Similarly, when the communication request to the beam area #B or #C occurs, the control station 09 controls to assign the frequency of the communication carrier not to the signal band B or the signal band C processed by the analog channelizer 5A shown in (C) of FIG. 4 but to the signal band B' or the signal band C' processed by the digital channelizer 5D. Since the control station 09 controls to arrange the communication carriers in the signal bands A', B', C' in a time zone in which the communication traffic is greatly reduced, it is possible to accommodate all the communication carriers even in the signal bands A', B', C' having a narrow bandwidth as compared with the signal bands A, B, C. At the same time, since the carriers which existed in the signal bands A, B, C before a start of this control gradually disappear by call ending, the carriers existing in the signal bands A, B, C decrease with a lapse of time, and there is no carrier at all, for example, after 1 hour.

In this manner, when the newly originated communication carriers are accommodated in the signal bands A', B', C', and the carriers decrease in the signal bands A, B, C accordingly and no longer exist (YES in Step S032), the control station 09 controls the analog channelizer 5A in the relay apparatus 93 to widen the bandwidths of the signal bands A, B, C (Step S033).

In detail, the control station 09 generates the change control signal 941C instructing setting changes to the frequency variable downconverter group 053, the analog band variable unit 054, and the frequency variable upconverter group 056, and transmits it to the relay apparatus 93. More specifically, the analog band variable unit 054 includes three band-pass filters (V-BPFs 054*a* to 054*c*) whose pass-band widths are changed by control. In this case, since the analog channelizer 5A changes the bandwidth while the communication carrier is not relayed, inconvenience such as interruption of user communication does not occur. Since the control side control unit 941 monitors the relay apparatus 93, the control side control unit 941 can detect that the carriers do not exist in the signal bands A, B, C.

When the communication request to the beam area #A is generated after a bandwidth expansion process by the analog channelizer 5A is completed, the control station 09 controls to assign the frequency of the communication carrier not to the signal band A' processed by the digital channelizer 5D shown in (C) of FIG. 4 but to the signal band A processed by the analog channelizer 5A (Step S034). Similarly, when the communication request to the beam area #B or #C occurs, the control station 09 controls to assign the frequency of the communication carrier not to the signal band B' or the signal band C' processed by the digital channelizer 5D shown in (C) of FIG. 4 but to the signal band B or the signal band C processed by the analog channelizer 5A. By such control, the communication carriers start to be arranged in the signal bands A, B and C shown in (C) of FIG. 4, while the communication carriers existing in the communication bands A', B', C' shown in (C) of FIG. 4 disappear by call ending.

When the communication carrier does not exist in the signal bands A', B', C' (YES in Step S035), the control station 09 instructs the relay apparatus 93 to stop the relay by the digital channelizer 5D (Step S036). Upon receipt of this command, operations of the frequency variable downconverter 053*e*, the AD converter 551*n*, and the digital demultiplexing unit 552*n* in FIG. 5 are stopped.

In the above description, a method of dealing with situations where the communication traffic demands to the beam areas #A, #B, #C increase on average and all communication carriers cannot be arranged in the bandwidths A, B, C chronically has been described. Even when communication traffic demands to the beam areas #A, #B, #C are low on average and an unused empty band chronically occurs in the bandwidths A, B, C even with all the communication carriers arranged, it is also possible to narrow the bandwidths of A, B, C by the same procedure. That is, in a time period when the communication traffic is greatly reduced, the control station 09 controls so that the digital channelizer 5D relays the communication carriers. When there is no communication carrier relayed by the analog channelizer 5A, the control station 09 controls to narrow the bandwidths A, B, C processed by the analog channelizer 5A, and the communication carrier can be returned to be relayed again by the analog channelizer 5A after completion of the control.

As described above, in FIG. 11, when there are the beam areas #A, #B, #C where the relay signal 99 is relayed via the analog channelizer 5A, the control side control unit 941 generates the signal indicating the new frequency bands A', B', C' to be relayed by the digital channelizer 5D as the digital relay unit control signal 941D. By this generation, the communicable band of the beam areas #A, #B, #C is increased. At the same time, when there the relay signal 99 via the analog channelizer 5A ceases to exist in the beam areas #A, #B, #C in which the communicable band has increased, the control side control unit 941 generates the change control signal 941C for changing the pass-band of the analog channelizer 5A, and transmits the change control signal 941C to the relay apparatus 93 via the control side communication unit 942.

FIG. 5 illustrates a flow in which the output of the adder (058*a*, 058*b*, 058*c*) is amplified by the high-power amplifier (057*a*, 057*b*, 057*c*), however, the two signals before addition may be amplified by the high-power amplifier and then be added. For example, the process may be modified such that the high-power amplifier for amplifying the output of the frequency variable upconverter 056*a* and the high-power amplifier for amplifying the output of the frequency variable upconverter 056*i* are provided, the adder 058*a* adds the high-power amplified outputs of the frequency variable upconverters 056*a*, 056*i*, and the added result is transmitted from the transmitting antenna 06*a* to the beam area #A. In this case, although the high-power amplifier is required twice, the maximum power which can be transmitted to the beam areas #A, #B, #C also doubles, and thus it is possible to maintain bit rate of each communication carrier at a high state without decreasing a power density of the transmitted signal even when the communication traffic is concentrated.

Furthermore, the high-power amplifiers 057*a*, 057*b*, 057*c* for amplifying the signal relayed by the analog channelizer 5A require a high saturation output power in order to transmit the signal to the beam area where the stationary communication traffic is high. However, since the high-power amplifiers 057*d*, 057*e*, 057*f*, 057*g*, 057*h* for amplifying the signal relayed by the digital channelizer 5D transmit the signal to the beam area where the stationary communication traffic is small, they do not necessarily need to have the same specification as the high-power amplifiers 057a, 057b, 057c and may have a lower saturated output power. In this case, it is possible to reduce the size and power consumption of the high-power amplifiers 057a, 057b, 057c, and as a result, it is possible to obtain an effect of reducing the size and weight of the relay apparatus 93 and reducing the power consumption. Similarly, when the high-power amplifier amplifies the two signals before addition by the adders (058a, 058b, 058c), it is possible to reduce the size and power consumption by the three high-power amplifiers for amplifying the outputs of the frequency variable upconverters 056i, 056j, 056k having specifications of low saturation output power.

In FIG. 5, the operation of adding the band signal A and the band signal A' by the adder 058a, amplifying it by the high-power amplifier 057a, and transmitting the amplified signal by the transmitting antenna 06a has been described. However, a movable antenna 06a' whose antenna directivity is variable may be separately provided, the band signal A and the band signal A' may be transmitted by two independent transmitting antennas {06a, 06a' }, and the band signal A and the band signal A' may be added (synthesized) spatially by directing the movable antenna 06a' to the beam area #A.

In this case, since the band signal A' output from the frequency variable upconverter (V-U/C) 056i in FIG. 5 is amplified by the newly provided high-power amplifier and then transmitted by the movable antenna 06a', the adder 058a is not necessary, while the hardware scale is not reduced because the movable antenna 06a' is required.

However, since antenna directivity of the movable antenna 06a' is variable, for example, the band signal A' can be directed not only to the beam area #A but also to any of the beam areas #B to #H, or any other place other than the beam areas #A to #H, and thus even when the traffic demand temporarily increases in any area, it is possible to direct the movable antenna 06a' to the area and additionally allocate the band signal A' to the area. That is, it is possible to obtain an effect of increasing a spatial degree of freedom of additional bandwidth allocation.

Furthermore, the band signal B' output from the frequency variable upconverter (V-U/C) 056j of FIG. 5 may be amplified by a newly provided high-power amplifier, and then may be transmitted by a newly provided movable antenna 06b', and further, the band signal C' output from the frequency variable upconverter (V-U/C) 056k of FIG. 5 may be amplified by a newly provided high-power amplifier, and then may be transmitted by a newly provided movable antenna 06c'. In this case, since the adders 058a, 058b, 058c are not necessary and the number of movable beams increases from one to three, these movable antennas can be directed not only to the beam areas #A, #B, #C but also to the other beam areas, and thus it is further possible to obtain the effect of increasing the spatial degree of freedom of additional bandwidth allocation.

In the embodiment 1, it has been described that the number of beam areas is eight, and among them, the number of beams relayed by the analog channelizer 5A is three, and the number of beams relayed by the digital channelizer 5D is five. However, the number of beam areas may be any number as long as they are 2 or more, and the number of beams relayed by the analog channelizer 5A and the number of beams relayed by the digital channelizer 5D may be any number as long as both are one or more.

Further, in the relay apparatus 93 of the embodiment 1, the number of separate systems not used in the stationary state inside the digital channelizer 5D is set to one system on the input side (frequency variable downconverter 053c or succeeding) and three systems on the output side (frequency variable upconverters 056i, 056j, 056k or prior), however, the number of separate systems may be any number as long as it is one or more.

Embodiment 2

In the example described in the embodiment 1, when the communication traffic to the beam areas #A, #B, #C relayed by the analog channelizer 5A increases and the communication band is insufficient only by the analog channelizer 5A, the digital channelizer 5D compensates for the insufficient band, and increases each bandwidth for the beam areas #A, #B, #C. Similarly, when communication traffic for the beam area relayed by the digital channelizer 5D increases and there is communication band demand exceeding the bandwidth processable by one D/A converter, the communication bandwidth can be increased by the same method.

Figure 12:
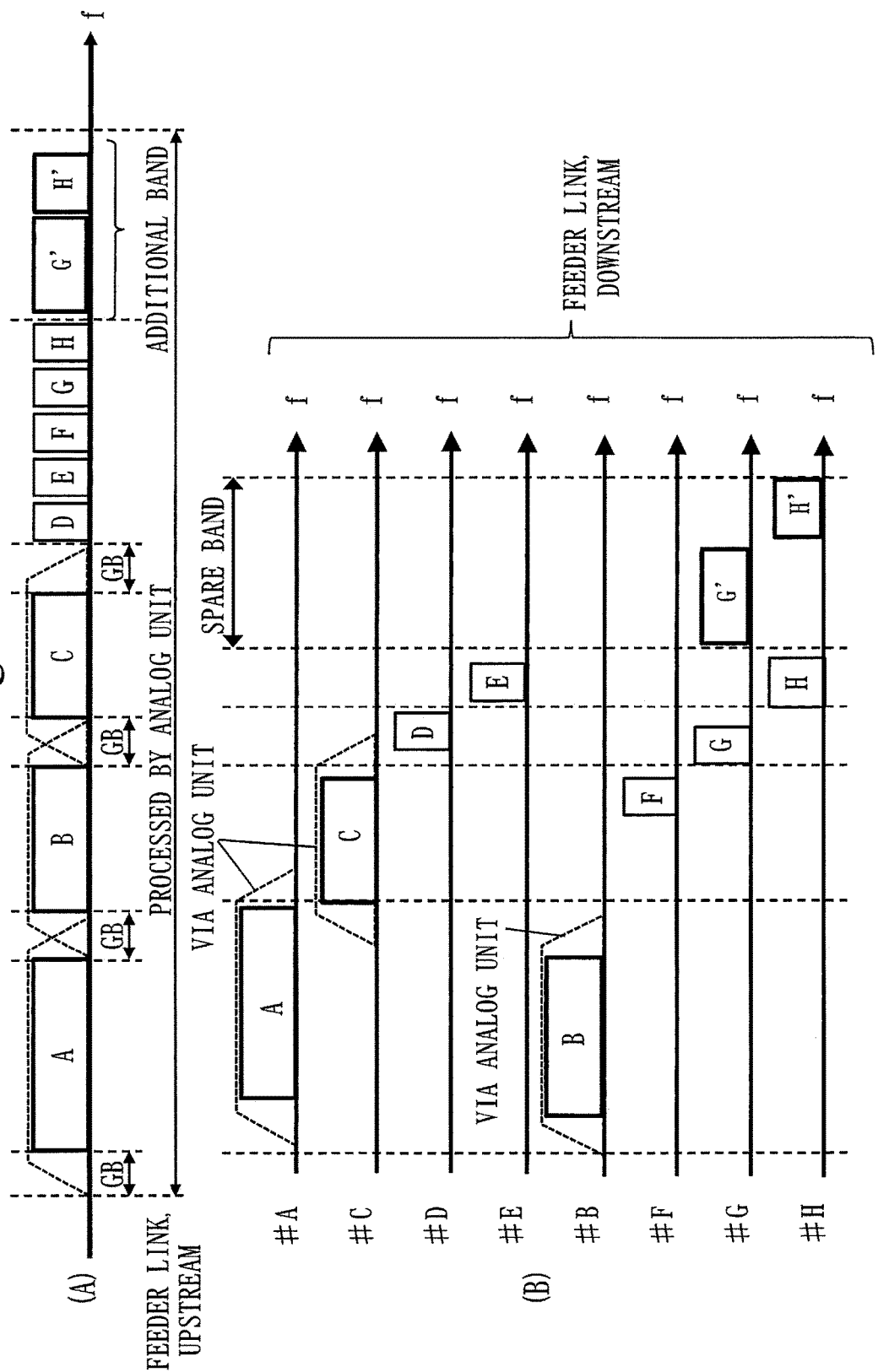
FIG. 12 is a diagram of an embodiment 2 and is a diagram illustrating a frequency allocation when new signal bands G', H' are additionally allocated.

FIG. 12 illustrates a frequency allocation example when new signal bands G', H' are additionally allocated in addition to the signal bands G, H already allocated, as a disaster or the like occurs in the beam areas #G, #H and accordingly as the communication traffic to the beam areas #G, #H abruptly increases. (A) of FIG. 12 illustrating the feeder link (upstream) and (B) of FIG. 12 illustrating the user link (downstream) are the frequency allocation example, and it can be seen that the new signal bands G' and H' are additionally allocated when compared with the frequency allocation example in the stationary state illustrated in (B) of FIG. 4, FIG. 8. In FIG. 12, G' is an additionally allocated band for the beam area #G, and H' is an additionally allocated band for the beam area #H, and in either case, the digital channelizer 5D in the relay apparatus 93 allocates the additional bands.

FIG. 13 illustrates a configuration of the relay apparatus 93 in the embodiment 2. The same reference numerals as in FIG. 5 are given to those in FIG. 13, which illustrates the configuration of the relay apparatus 93 in the embodiment 2.

As illustrated in FIG. 13, as a point different from the configuration of FIG. 5, adders 058d to 058h are newly provided in front of the high-power amplifiers 057d to 057h for the beam areas #D to #H, and the output of the frequency variable upconverter 056i is connected to either the adder 058a or the adder 058f. In addition, the output of the frequency variable upconverter 056j is connected to any of the adder 058b, the adder 058d and the adder 058g, and the output of the frequency variable upconverter 056k is connected to any of the adder 058c, the adder 058e and the adder 058h.

In FIG. 13, for convenience of space, although the output of the frequency variable upconverters 056i, 056j, 056k is branched into two or three and connected to each adder, one signal is not actually input to the plurality of adders, but is connected to one of the adders based on the command of the channelizer controller 060.

Figure 14:
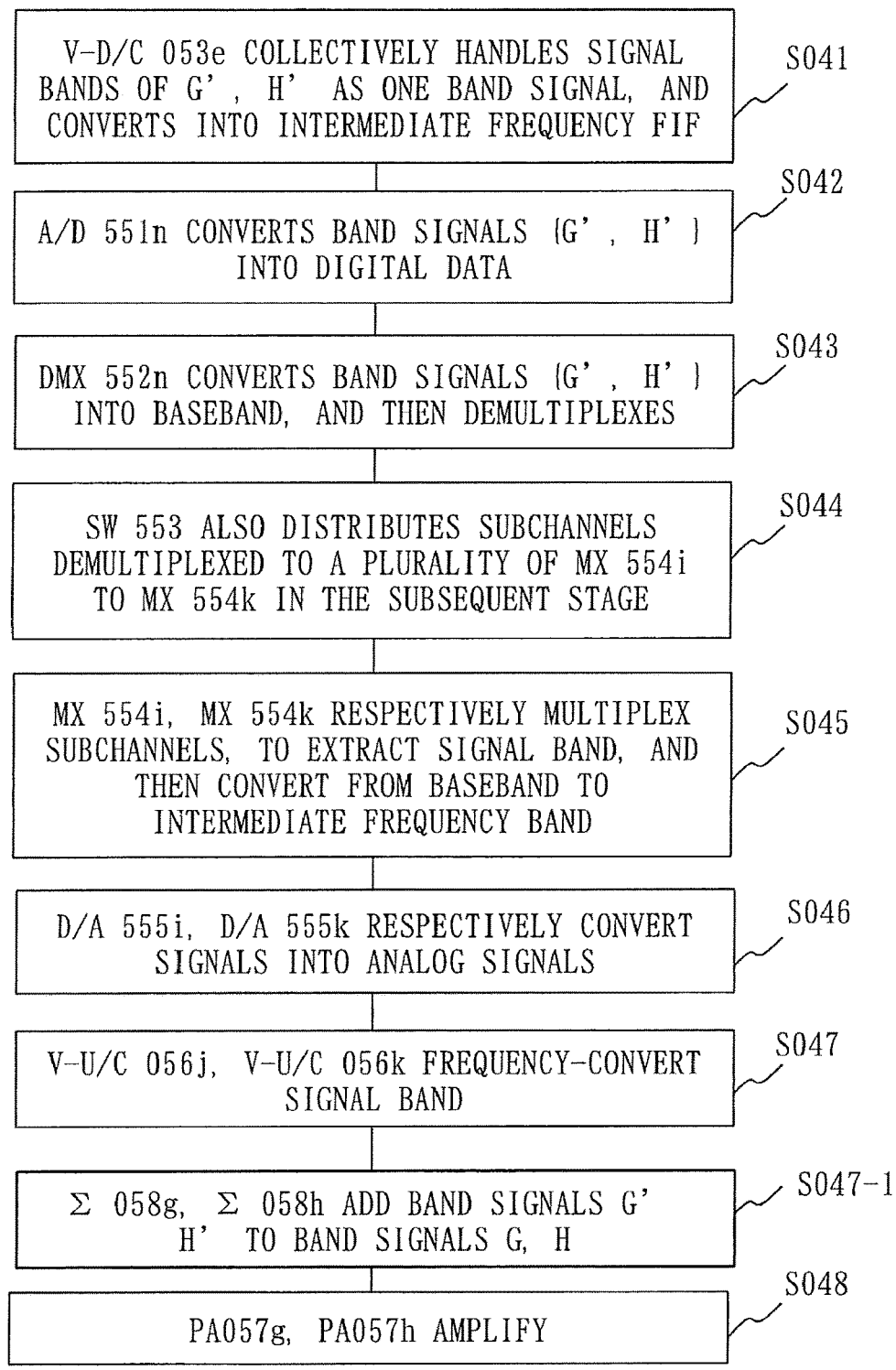
FIG. 14 is a diagram of the embodiment 2 and is a flowchart when the digital channelizer 5D processes a signal band G'H'.

Hereinafter, an operation of the embodiment 2 will be described with reference to FIGS. 13 and 14. FIG. 14 is a flowchart when the signal bands G', H' to be relayed by the digital channelizer 5D are added. FIG. 14 is similar to FIG. 9, and the signal bands A', B', C' of FIG. 9 may be read as the signal bands G', H'.

When such an increase in communication traffic occurs, as in the embodiment 1, the control station 09 controls to use a circuit of another system not used in the stationary state inside the digital channelizer 5D. That is, the control station 09 activates the frequency variable downconverter 053e, the AD converter 551n, the digital demultiplexing unit 552n, the digital multiplexing units 554i to 554k, the DA converters 555i to 555k, and the frequency variable upconverters 056i to 056k. The control station 09 performs additional bandwidth allocation by using them. When the communication traffic returns to the stationary state, the control station 09 controls to stop these circuits again.

Similarly to {A', B', C'} shown in (C) of FIG. 4 described above, the band signal {G', H'} of the feeder link (upstream) arranged in (A) of FIG. 12 is processed by the frequency variable downconverter 053e, the AD converter 551n, and the digital demultiplexing unit 552n of FIG. 13 (Steps S041 to S043).

Among the subchannels demultiplexed by the digital demultiplexing unit 552n, the switch matrix 553 of FIG. 13 distributes the subchannel having a part of the band signal G' to the digital multiplexing unit 554j, and distributes the subchannel having a part of the band signal H' to the digital multiplexing unit 554k (Step S044).

The digital multiplexing units 554j, 554k respectively multiplex the subchannels sent from the switch matrix 553, to reproduce and extract desired signal bands G', H', and then convert the signal bands from the baseband to the intermediate frequency band (Step S045). The subsequent D/A converters 555j, 555k respectively convert the signals G', H' into analog signals (Step S046) and output them from the digital band variable unit 055. The frequency variable upconverters 056j, 056k respectively convert the signals G', H' output as the intermediate frequencies from the DA converters 555j, 555k to an arbitrary downstream (user link) radio frequency based on the frequency conversion amounts (ΔFUJ, ΔFUK) from the channelizer controller 060 (Step S047).

Further, the band signals (A, B, C, D, E, F) of the feeder link (upstream) arranged in (A) of FIG. 12 are processed in the same manner as the process in the stationary state of (B) of FIG. 4 described in the embodiment 1, and are respectively transmitted to the beam areas with the frequency allocation illustrated in (B) of FIG. 12.

Next, the channelizer controller 060 commands the frequency variable upconverter 056j, 056k to connect the output signal G' of the frequency variable upconverter 056j to the adder 058g, and to connect the output signal H' of the frequency variable upconverter 056k to the adder 058h.

The adder 058g adds the band signal G' output from the frequency variable upconverter 056j and the band signal G output from the frequency variable upconverter 056g by signal processing as in the embodiment 1 (Step S047-1). The high-power amplifier 057g amplifies the output signal of the adder 058g and then transmits it to the beam area #G via the transmitting antenna 06g (Step S048).

Similarly, the adder 058h adds the band signal H' output from the frequency variable upconverter 056k and the band signal H output from the frequency variable upconverter 056h by signal processing as in the embodiment 1, and the high-power amplifier 057h amplifies the output signal of the adder 058h and then transmits the amplified signal to the beam area #H via the transmitting antenna 06h. The frequency allocation on the user link side to the beam area #G and frequency allocation on the user link side to the beam area #H are as illustrated in (B) of FIG. 12, and by also using the spare band, the band signals G and G' are frequency multiplexed and transmitted to the beam area #G, and the band signals H and H' are frequency multiplexed and transmitted to the beam area # H. The positions (center frequencies) of the band signals G', H' shown in (B) of FIG. 12 are an example, and it is possible to freely change the positions by changing the frequency conversion amounts (ΔFUJ, ΔFUK) from the channelizer controller 060.

In this way, even when the communication traffic for the beam areas #G, #H relayed by the digital channelizer 5D increases and there is communication band demand exceeding the bandwidth processable by one D/A converter, a circuit of another system not used in the stationary state inside the digital channelizer 5D is activated and used. By using this, a flow for increasing the signal band for the beam areas #G, #H is described.

Although the above example describes the operation of additional bandwidth allocation when the communication traffic suddenly increases in the beam areas #G, #H, such a sudden increase in communication traffic can occur in any of the beam areas # A to #H due to occurrence of a disaster or the like.

Therefore, as shown in FIG. 13, the relay apparatus 93 according to the embodiment 2 is configured such that the adders 058a to 058h are provided in front of all the high-power amplifiers 057a to 057h, and is configured such that the output of the circuit of another system not used in the stationary state inside the digital channelizer 5D can be added not only to the beam areas #G, #H but also to any beam area.

Each of the adders 058a to 058h has 2 inputs and 1 output. However, assuming that the number of frequency variable upconverters of another system not used in the stationary state is M, the number of inputs may be any number as long as it is 2 or more and M+1 or less. It may be configured such that the outputs of the frequency variable upconverters (056i, 056j, 056k in FIG. 13) of another system are connected to any of the adders 058a to 058h as well, and may be configured such that the adders add a total of four including an input signal in the stationary state. In this case, although a circuit scale increases, it is possible to further increase bandwidth allocation for a specific beam area.

Although it is configured such that the adders 058a to 058h are provided to add two bands in FIG. 13, it may be changed to a configuration in which the adders 058a to 058h are removed, and the band signal output from the frequency variable upconverter (V-U/C) 056i in FIG. 13 is amplified by a newly provided high-power amplifier, and then transmitted by the newly provided movable antenna (antenna with variable directivity) 06a', the band signal output from the frequency variable upconverter (V-U/C) 056j is amplified by a newly provided high-power amplifier, and then transmitted by the newly provided movable antenna 06b', the band signal output from the frequency variable upconverter (V-U/C) 056k is amplified by a newly provided high-power amplifier, and then transmitted by the newly provided movable antenna 06c'. In this case, it is possible to realize the additional band allocation illustrated in FIG. 12 in the same manner, for example, by directing the movable antenna 06b' to the beam area #G and transmitting the band signal G' and by directing the movable antenna 06c' to the beam area #H and transmitting the band signal H'. In this way, it is possible to obtain the same effect as in the case where the adders 058a to 058h are provided, even it is configured such that the adders 058a to 058h are removed and the three movable antennas 06a', 06b', 06c' are provided.

Furthermore, since the movable antenna can be directed not only to a specific beam area but also to an arbitrary beam area or to a place other than the beam areas #A to #H, even when the traffic demand temporary increases in any area, one or more of the movable antennas 06a', 06b', 06c' can be directed to that area, and thus it is also possible to obtain the effect of increasing the spatial degree of freedom of additional bandwidth allocation.

Further, in the relay apparatus 93 of the embodiment 2, the number of separate systems not used in the stationary state inside the digital channelizer 5D is set to one system on the input side (frequency variable downconverter 053e or succeeding) and three systems on the output side (frequency variable upconverters 056i, 056j, 056k or prior) as in the embodiment 1, however, the number of separate systems may be any number as long as it is one or more.

In the embodiment 2, it has been described that the number of beam areas is eight, and among them, the number of beams relayed by the analog channelizer 5A is three, and the number of beams relayed by the digital channelizer 5D is five, however, the number of beam areas may be any number as long as they are 2 or more, and the number of beams relayed by the analog channelizer 5A and the number of beams relayed by the digital channelizer 5D may be any number as long as both are one or more.

In FIG. 13, it is configured such that the outputs of the adders 058a to 058h are high-power amplified, however, it may be changed to a configuration in which the maximum power which can be transmitted to each beam area is increased by high-power amplifying each signal in an input stage of the adder although the number of high-power amplifiers is doubled as in the embodiment 1.

Further, as in the embodiment 1, it may be configured to reduce the size, weight and power consumption of the relay apparatus 93 by setting low saturation output power to amplifiers other than the high-power amplifiers 057a, 057b, 057c which amplify the signal relayed by the analog channelizer 5A among the high-power amplifiers.

Embodiment 3

In the embodiment 1 and the embodiment 2, embodiments of the present invention in the forward link from the gateway station to the user terminals existing in the beam areas has been described, however, in the embodiment 3, an embodiment in the return link from the user terminals to the gateway station will be described.

Figure 15:
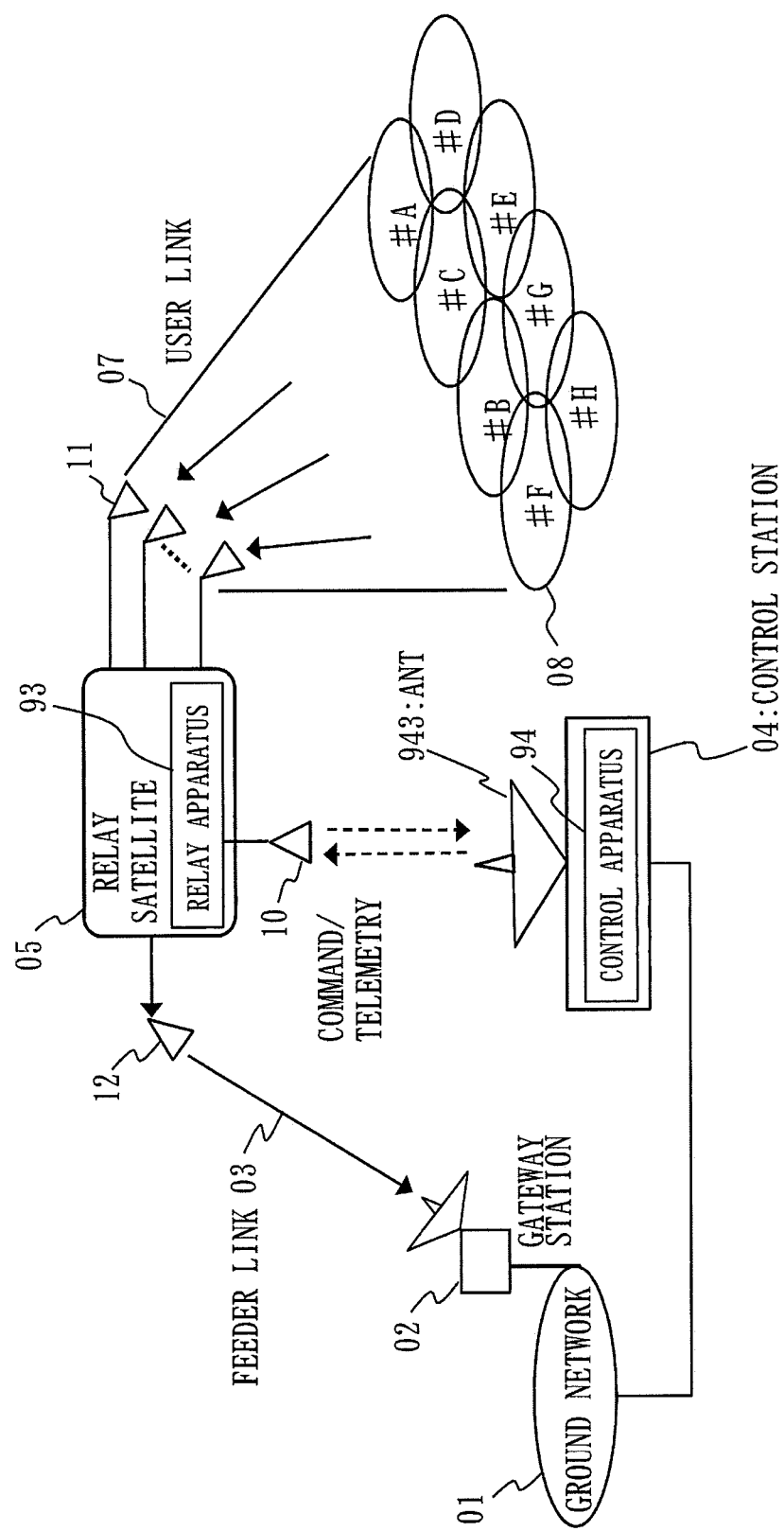
FIG. 15 is a diagram of an embodiment 3 and is a diagram illustrating a flow on a return link side of the multi-beam satellite communication system 95.

FIG. 15 illustrates a flow on the return link side of the multi-beam satellite communication system 95. The same reference numerals as in FIG. 1 are given to those in FIG. 15, and a receiving antenna 11 of the relay apparatus 93 receives communication carriers of a plurality of users existing in the beam areas #A to #H, and the relay apparatus 93 performs signal extraction and frequency conversion of the uplink signals, and then transmits the signals from a transmitting antenna 12 of the relay apparatus 93 to the gateway station 02.

Even in such a return link, an effect of reducing the feeder link band according to the present invention will be described below.

Figure 16:
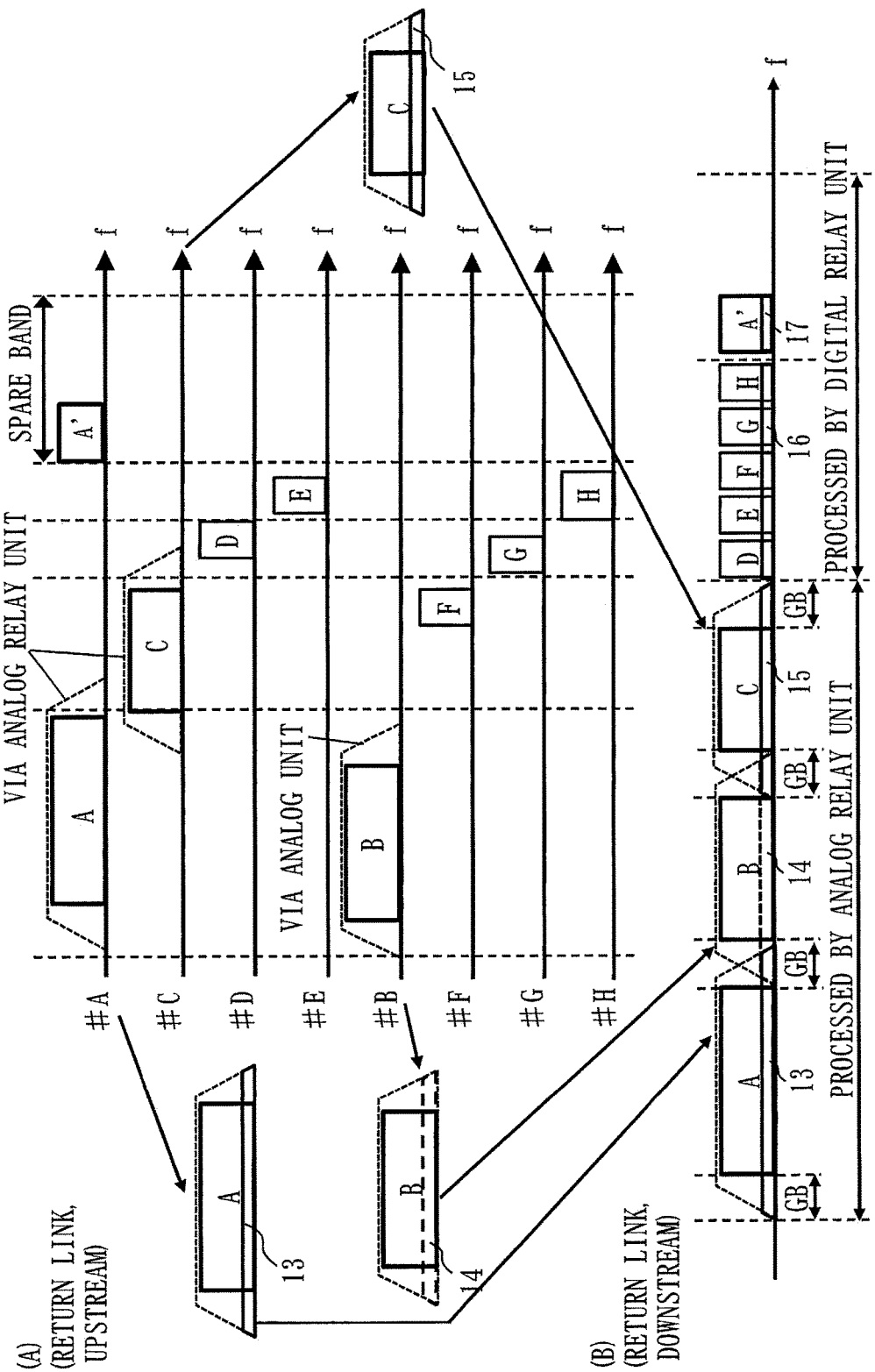
FIG. 16 is a diagram of the embodiment 3 and is a diagram illustrating a frequency allocation on the return link side.

FIG. 16 illustrates an example of frequency allocation on the return link side.

In FIG. 16, the analog channelizer 5A relays the signal bands (A, B, C) from the beam areas #A, #B, #C where communication traffic is high on average, and the digital channelizer 5D relays the signal bands (D to H) of the beam areas #D to #H where communication traffic is low on average. FIG. 16 illustrates an example in which the signal band A' is additionally arranged in addition to the signal band A due to temporary increase in communication traffic from the beam area #A to the gateway station.

Further, (A) of FIG. 16 illustrates noise components omitted in the embodiments 1, 2, and in FIGS. 16, 13 to 17 denote noise components added to each signal by low noise amplification or the like.

As described above, the analog channelizer 5A has the problem shown in (A1), a transition region of the filter is wider than that of the digital channelizer 5D, and the band corresponding to the transition region of the analog BPF needs to be secured as a guard band. This also applies to a downstream feeder link.

As shown in (B) of FIG. 16, when extracting the band signal A by the analog channelizer 5A, the noise component 13 shown in FIG. 16 is also extracted in addition to a main signal component A. Similarly, when extracting the band signal A' by the digital channelizer 5D, the noise component 17 shown in FIG. 16 is also extracted in addition to a main signal component A'. Here, as can be seen by comparing both, a band of the extracted main signal A' and a band of the noise component 17 are substantially the same because the digital channelizer 5D realizes a sharp filter characteristic, however, a bandwidth of the noise component 13 is wider than a band of the extracted main signal A because the analog channelizer 5A has a gentle filter characteristic depending on the transition region of the analog BPF.

Similarly, as shown in FIG. 16, a bandwidth of the noise component 14 or the noise component 15 is wider than a band of a main signal B or C extracted by the analog channelizer 5A. Therefore, as illustrated in (B) of FIG. 16, a frequency arrangement in which its own noise component does not overlap the other main signal component is required when these signals are arranged in the feeder link downstream frequency band. In this case, it is necessary to have an interval between the main signals by the guard band (GB) shown in (B) of FIG. 16. If frequencies of A, B, C are allocated at intervals less than the guard band, an adjacent noise component overlaps a part of the main signal band, resulting in degradation of communication quality of the multi-beam satellite communication system 95.

For this reason, when relaying all the band signals (A to H) by the analog channelizer 5A on the return link (feeder link) downstream, the bandwidth of the GB is dominant particularly in relaying D to H with narrow bandwidth, and the frequency utilization efficiency decreases similarly to the forward link (feeder link) upstream illustrated in (A) of FIG. 4.

Therefore, in the embodiment 3, as shown in (B) of FIG. 16, the analog channelizer 5A is used for only the signal relay from the beam areas #A, #B, #C where the communication traffic is large and the wide bandwidth is required, and the digital channelizer 5D is used for the signal relay from the beam areas #D to #H where the communication traffic is small and the narrow bandwidth is enough. As a result, it is possible to reduce the bandwidth required for the feeder link downstream and to improve the frequency utilization efficiency.

Note that the relay satellite 05 (relay apparatus 93) on the return link side in the embodiment 3 is configured to mainly include the following five, (1) a frequency variable downconverter group,
(2) an analog band variable unit,
(3) a digital band variable unit,
(4) a frequency variable upconverter group, and
(5) a channelizer controller, similarly to the relay apparatus 93 on the forward link side illustrated in FIG. 13.

FIG. 17 illustrates the configuration of the relay apparatus 93 on the return link side. As in FIG. 5, ranges surrounded by broken lines respectively constitute the analog channelizer 5A and the digital channelizer 5D.

In this case, the frequency variable downconverter group converts the band signals (A to H, A') shown in (A) of FIG. 16 into the intermediate frequencies, and the analog band variable unit extracts the band signals A, B, C. Further, the digital band variable unit samples a total of six signals of the band signals D to H, A' respectively with six A/D converters, and after digital processing, outputs two of a band signal Y in which {D, E, F, G, H} are multiplexed and the band signal A'. The frequency variable upconverter group converts a total of five of the band signals A, B, C, Y ($\varepsilon${D, E, F, G, H}), A' to the radio frequencies respectively from the intermediate frequencies so that the frequency allocation shown in (B) of FIG. 16 is achieved. Finally, a repeater on the return link side in the embodiment 3 combines the five signals, amplifies the signals, and transmits them to the gateway station 02 via the transmitting antenna 12. As in the relay apparatus 93 on the forward link side, the channelizer controller controls the operations of the frequency variable downconverter group, the analog band variable unit, the digital band variable unit, and the frequency variable upconverter group based on the commands from the control station 09. In this example, even when the communication traffic from the beam area #A temporarily increases, it is possible to realize the additional band allocation to a specific beam area as in the processing on the forward link side described in the embodiments 1, 2.

Note that the receiving antenna of the relay satellite 05 for receiving the band signal A' from the beam area #A among the receiving antennas 11 of the relay satellite 05 may be a "movable antenna" whose antenna directivity is variable. In this case, for example, even when a temporary traffic demand occurs in the beam area #C instead of the beam area #A, it is possible to realize additional allocation of the band signal C' from the beam area #C similarly to additional allocation of the band signal A' from the beam area #A by directing the movable antenna to the beam area #C.

In this manner, by using the movable antenna as one of the antennas connected to the digital channelizer 5D among the receiving antennas 11 of the relay satellite 05, even when a temporary increase in traffic demand occurs not only in a specific beam area but also in an arbitrary beam area or in a place other than the beam areas 4A to #H, it is possible to realize additional band allocation in that area, thereby obtaining the effect of increasing the spatial degree of freedom of additional bandwidth allocation.

Furthermore, such a "movable antenna" may not be one but may be provided in plural as the antennas connected to the digital channelizer 5D among the receiving antennas 11 of the relay satellite 05. In this case, even when a temporary increase in traffic demand occurs not only in one area but also in a plurality of areas at the same time, it is possible to direct the movable antenna to each area, thereby obtaining an effect of further increasing the spatial degree of freedom of additional bandwidth allocation.

It should be noted that other advantages can be obtained by using not only the analog channelizer 5A but also the digital channelizer 5D even in a stationary state in which band expansion demand from a specific beam area does not occur.

For example, an uplink received power density of a certain communication carrier is affected by rainfall or the like and is lower than a received power density of other adjacent carriers, and as a result, a line may not be established in some cases in a relay by the analog channelizer 5A. Specifically, it is a case in which the line is not established when an influence of intermodulation distortion interference applied at the time of high-power amplification is large due to low received power density, and in this case, the relay is performed by using the digital channelizer 5D instead of the analog channelizer 5A. In that case, as described in JP-A-2014-187688, it is possible to reduce the influence of intermodulation distortion interference applied to a final stage amplifier of the satellite and to increase the line establishability by amplifying only the subband including a target communication carrier by the digital channelizer 5D.

This operation is as follows. When the received power density of the relay signal 99 received by the relay apparatus 93 is expected to be low, the control side control unit 941 generates the digital relay unit control signal 941D as a signal instructing to relay the relay signal 99 via the digital channelizer 5D, and transmits the digital relay unit control signal 941D to the relay apparatus 93 via the control side communication unit 942. The digital channelizer 5D amplifies power of the relay signal 99 instructed by the digital relay unit control signal 941D in response to the digital relay unit control signal 941D under control of the channelizer controller 060.

Also, when there is a plurality of unnecessary interference waves in the signal band of the uplink, the relay is controlled not to use the analog channelizer 5A but to use the digital channelizer 5D. In this case, since the analog channelizer 5A high-power amplifies the signals including unnecessary interference waves, transmission power resource of the satellite is used for relaying unnecessary signals. In that case, as described in Japanese Patent No. 5430737, the digital channelizer 5D can prevent relaying unnecessary signals by controlling to attenuate only the subbands in which interference waves are mixed and can prevent wasteful power consumption during relaying.

This operation is as follows. When the interference waves are mixed in the frequency bandwidth of the relay signal 99 received by the relay apparatus 93, the control side control unit 941 generates the digital relay unit control signal 941D as a signal instructing to relay the relay signal 99 via the digital channelizer 5D, and transmits the digital relay unit control signal 941D to the relay apparatus 93 via the control side communication unit 942. The digital channelizer 5D attenuates the subband, in which the interference wave is mixed, in the relay signal 99 instructed by the digital relay unit control signal 941D in response to the digital relay unit control signal 941D under control of the channelizer controller 060. Since the control side control unit 941 monitors the relay apparatus 93, it is possible to detect the received power density and the interference wave.

Embodiment 4

In the embodiments 1, 2, 3, the contents and effects of the present invention have been described by taking, as an example, a satellite communication network called star type between the gateway station and the user terminals existing in the plurality of beam areas. In the embodiment 4, a satellite communication network called a mesh type between the plurality of beam areas will be described as an example, and the contents and effects of the present invention will be described.

In the embodiment 4, the analog channelizer is analog channelizers 20, 21, 22 shown in FIG. 20, and the digital channelizer is a digital channelizer 23.

Figure 18:
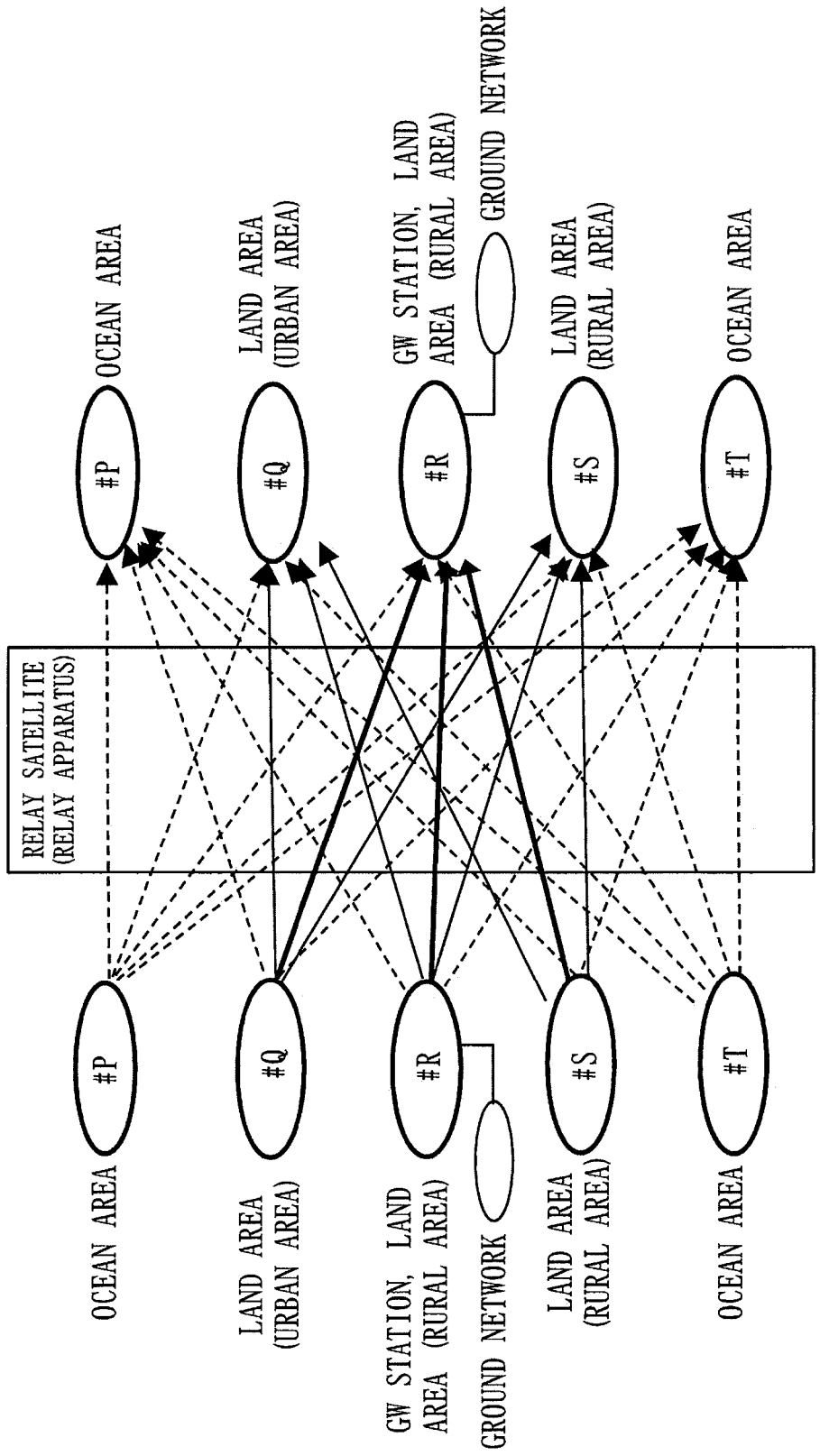
FIG. 18 is a diagram of an embodiment 4 and is a diagram illustrating connections between five beam areas (#P to #T) of satellite communication.

FIG. 18 illustrates connections between five beam areas (#P to #T) of the satellite communication in the embodiment 4. Arrows in the drawing indicate directions of the communication, and the communication between the beam areas is performed via the relay satellite. As illustrated in FIG. 18, since there is the connection of 5 to 5, the number of relay lines is 25 in total. Here, the beam area #R is a local area in a land area, but there is the gateway (GW) station connected to the ground network, the beam area #Q includes an urban area with a large population in the land area, the beam area #S is a local area in the land area, and the beam areas #P, #T are sea areas. When the communication is performed under such conditions, it is assumed that a bias occurs in communication traffic in the communication between the areas of 5 to 5. For example, it is assumed before start of the operation that the communication traffic between ocean areas (#P, #T) is small on average, while the communication traffic between the urban areas with a large number of users, the land areas, and areas where the GW stations exist (#Q, #R, #S) is large on average.

Focusing on a property such communication traffic is biased, in the multi-beam satellite communication system 95 according to the embodiment 4, the analog channelizer is in charge of relaying the signals indicated by nine "solid arrows" which have large communication traffic and require a wide signal bandwidth, among the 25 relays in total. Then, it is controlled such that the digital channelizer is in charge of relaying the remaining signals indicated by a total of 16 "dotted arrows" which have less communication traffic and do not require a wide signal bandwidth.

Figure 19:
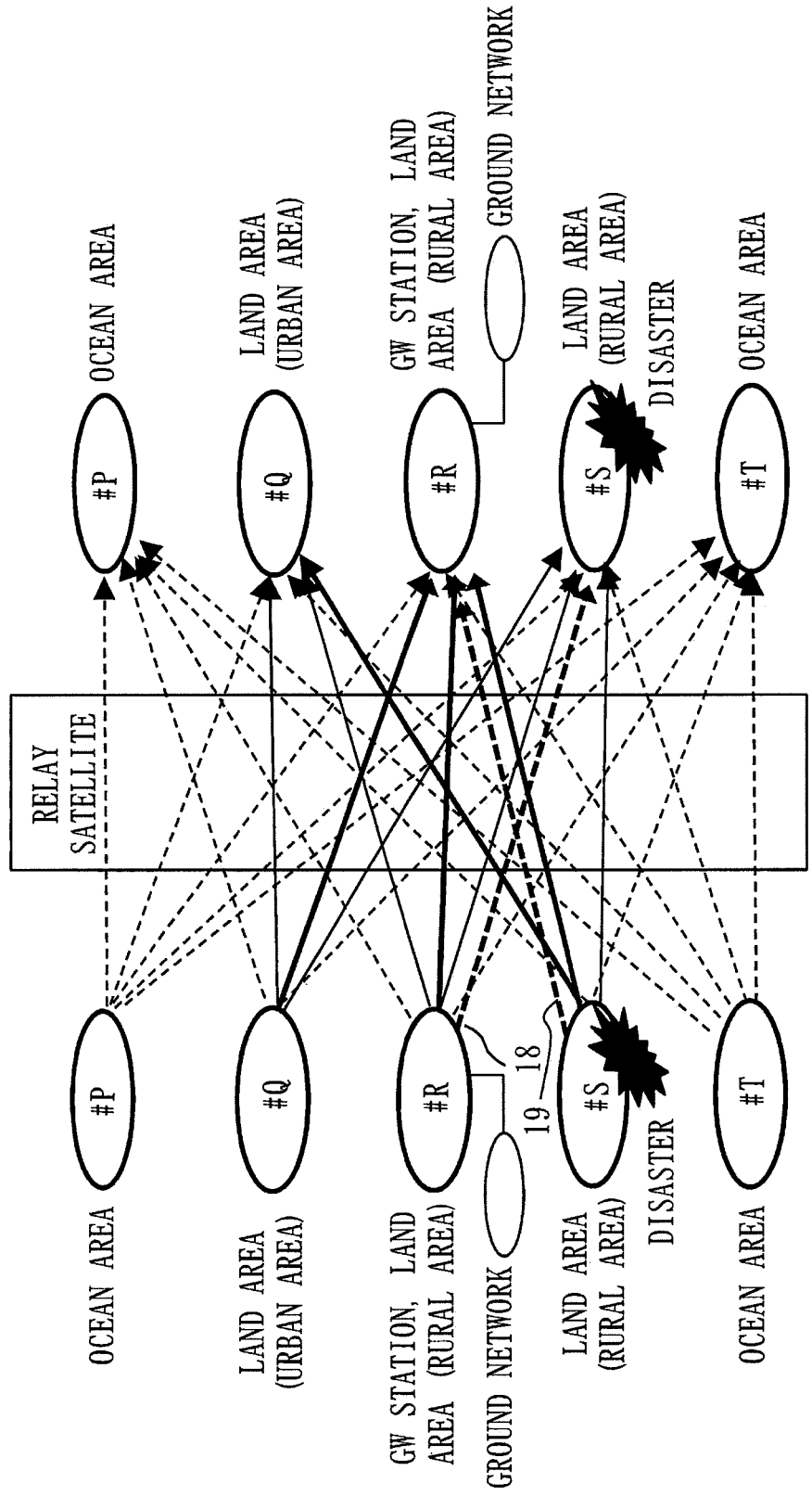
FIG. 19 is a diagram of the embodiment 4 and is a diagram illustrating a state in which communication traffic between a beam area #S and a beam area #R temporarily rapidly increases.

FIG. 19 illustrates a case where the communication traffic increases in FIG. 18. As illustrated in FIG. 19, when the communication traffic between the beam area #S and the beam area #R where the GW station exists is temporarily abruptly increased due to occurrence of a disaster or the like, and the bandwidth is insufficient in the signal relay by the analog channelizer connected by the "solid arrows", the following process is performed. That is, similarly to the repeater of the embodiment 1, the control station 09 activates a circuit of another system not used in the stationary state inside the digital channelizer, and performs the additional band allocation using these circuits. For example, in the embodiment 4, the control station 09 controls to additionally add two thick dotted lines (18, 19) shown in FIG. 19 by the digital channelizer, and to increase the bandwidth used for the relay between the beam area #S and the beam area #R.

FIG. 20 illustrates the configuration of the relay apparatus 93 in the embodiment 4. As illustrated in FIG. 20, "BPFs" (band-pass filters) shown in FIG. 20 respectively band limit the uplink signals from the beam areas #P to #T, and "LNAs" (Low Noise Amplifiers) shown in FIG. 20 respectively amplify the outputs of the "BPFs". Here, in FIG. 20, the output of a LNA 602 which amplifies the uplink signal from the beam area #Q is branched into two, one is input to an analog channelizer #1 (20), and the other is input to the digital channelizer 23. Similarly, the output of a LNA 603 which amplifies the uplink signal from the beam area #R is input to an analog channelizer #2 (21) and the digital channelizer 23. Similarly, the output of the LNA 603 which amplifies the uplink signal from the beam area #S is input to an analog channelizer #3 (22) and the digital channelizer 23. In addition, the uplink signals from the beam areas #P and #T with less communication traffic are not branched as shown in FIG. 20, and are directly input to the digital channelizer 23. The analog channelizers #1 (20), #2 (21), #3 (22) have the same configuration with each other, and as shown in the analog channelizer #1 (20), its internal configuration is constituted by three frequency variable downconverters (V-D/C), three analog band variable filters (V-BPF), and three frequency variable upconverters (V-U/C).

As shown in FIG. 20, the analog channelizer #1 performs three processes in parallel based on the flow of {"V-D/C"→"V-BPF"→"V-U/C"}. The analog channelizer #1 concurrently extracts three of the band signal for the beam area #Q relayed by the analog channelizer, the band signal for the beam area #R, and the band signal for the beam area #S among the uplink signals from the beam area #Q, and converts them into downlink radio frequencies to output them.

Similarly, the analog channelizer #2 concurrently extracts three of the band signal for the beam area #Q, the band signal for the beam area #R, and the band signal for the beam area #S among the uplink signals from the beam area #R, and converts them into downlink radio frequencies to output them. Further, similarly, the analog channelizer #3 concurrently extracts three of the band signal for the beam area #Q, the band signal for the beam area #R, and the band signal for the beam area #S among the uplink signals from the beam area #S, and converts them into downlink radio frequencies to output them.

Setting of the frequency conversion amounts in these "V-D/C", "V-U/C" and setting of the pass-band width of "V-BPF" are performed by the channelizer controller 060.

An adder 301 in the subsequent stage combines and outputs the band signals (three in total) for the beam area #Q among the output signals of the analog channelizers #1 to #3. Similarly, an adder 302 in the subsequent stage combines and outputs the band signals (three in total) for the beam area #R among the output signals of the analog channelizers #1 to #3. Further, similarly, an adder 303 in the subsequent stage combines and outputs the band signals (three in total) for the beam area #S among the output signals of the analog channelizers #1 to #3. These combined signals are amplified by the PA (high power amplifier) shown in FIG. 20 and then respectively transmitted to the beam areas.

By such a series of processing, the signal relays (relays indicated by the solid lines in FIG. 18) between the beam areas #Q, #R, #S which have large communication traffic on average and require a wide bandwidth can be realized by the analog channelizer.

Next, the digital channelizer 23 converts the uplink signal from the beam area #P into the intermediate frequency by a frequency variable downconverter (V-D/C) 231, and then demultiplexes the signal on a subband basis by the same processing as in the embodiment 1 in a digital band variable unit 240.

Similarly, the digital channelizer 23 converts the uplink signals of the beam areas #Q to #T into the intermediate frequencies by frequency variable downconverters (V-D/C) 232 to 235, and then demultiplexes the signals on a subband basis in the digital band variable unit 240.

As in the digital band variable unit of the embodiment 1, each uplink signal demultiplexed on a subband basis is collected for each beam area of each destination by the switch matrix inside the digital channelizer 23, and then is digital multiplexed. Frequency variable upconverters (V-U/C) 251 to 255 respectively convert the multiplexed signals output from the digital band variable unit 240 into desired radio frequencies. Setting of the amount of frequency conversion in the "V-D/C", "V-U/C" in the digital channelizer 23 and setting of switching of the switch matrix are performed by the channelizer controller 060. The signals relayed by the digital channelizer 23 in this way are amplified by the PA (high-power amplifier) shown in FIG. 20, and then respectively transmitted to the beam areas.

In the stationary state, the digital channelizer 23 relays only the band signals addressed to the beam area #P and the beam area #T among the uplink signals from the beam areas #Q, #R, #S, and entrusts the band signals addressed to the beam areas #Q, #R, #S having large communication traffic to the analog channelizers #1 to #3, resulting in not relaying them by the digital channelizer 23.

Therefore, in the stationary state, in FIG. 20, the frequency variable upconverters 252, 253, 254 operating at the time of allocating additional bands to the beam areas #Q, #R, #S, and the D/A converters and the digital multiplexing unit in the digital band variable unit 240 are stopped to operate by the channelizer controller 060.

By the series of operations of the digital channelizers described above, the signal relays between the beam areas (relays indicated by the dotted lines in FIG. 18) which have small communication traffic on average and do not require a wide bandwidth can be realized by the digital channelizer.

On the other hand, for example, as described above, it is assumed that the communication traffic between the beam area #S and the beam area #R temporarily rapidly increases due to the occurrence of a disaster or the like and the bandwidth is insufficient in the signal relay only by the analog channelizer.

In this case, upon receiving the command from the control station 09, the digital channelizer 23 processes as follows not only the band signals for the beam areas #P, #T among the uplink signals from the beam area #R but also an additionally allocated band signal RS' for the beam area #S. The digital channelizer 23 uses the frequency variable upconverter 254 not used in the stationary state after the digital demultiplexing on a subband basis, and the D/A converters and the digital multiplexing unit in the digital band variable unit 240 in the preceding stage, to perform an operation of relaying the additionally allocated band signal RS' to the beam area #S.

Similarly, the digital channelizer 23 processes as follows not only the band signals for the beam areas #P, #T among the uplink signals from the beam area #S but also an additionally allocated band signal SR' for the beam area #R. The digital channelizer 23 uses the frequency variable upconverter 253 not used in the stationary state after the digital demultiplexing on a subband basis, and the D/A converters and the digital multiplexing unit in the digital band variable unit 240 in the preceding stage, to perform an operation of relaying the additionally allocated band signal SR' to the beam area #R.

In this way, the band signals SR', RS' relayed by the digital channelizer are combined with the band signals relayed by the analog channelizer and transmitted to the beam areas #R, #S. Specifically, an adder 402 combines each band signal from the analog channelizer (output from the adder 302) and the additionally allocated band signal SR' from the digital channelizer, and the signal combined by the adder 402 is amplified by the PA (high-power amplifier) shown in FIG. 20, and then transmitted to the beam area #R.

Similarly, an adder 403 combines each band signal from the analog channelizer (output from the adder 303) and the additionally allocated band signal RS' from the digital channelizer, and the signal combined by the adder 403 is amplified by the PA (high-power amplifier) shown in FIG. 20, and then transmitted to the beam area #S.

In the relay apparatus 93 of FIG. 20, an adder 401 is provided for dealing with not only the beam areas #R, S but also a temporary increase in communication traffic to the beam area #Q. It is configured such that the adder 401 combines each band signal from the analog channelizer (output from the adder 301) and an additionally allocated band signal Q' output from the digital channelizer, and the signal combined by the adder 401 is amplified by the PA (high-power amplifier) shown in FIG. 20, and transmitted to the beam area #Q.

Further, the uplink signal from the beam area #R is broadened, due to addition of the band signal RS' for the beam area #S to the band signal for the beam areas #P, #T. In this case, it may be difficult to sample the signal of the broadened beam area #R by one A/D converter inside the digital channelizer 23 due to the upper limit constraint on the sampling rate.

In this case, another frequency variable downconverter 233 is provided for converting the signal received from the beam area #R to the intermediate frequency. Then, it may be configured to include the V-D/C for frequency-converting the band signal for the beam areas #P, #T, the V-D/C for frequency-converting the band signal RS', the A/D converters (two in total) for sampling the signals converted into the intermediate frequencies, and the demultiplexing unit (two in total) for digital demultiplexing the sampled signals, to process the signals.

Similarly, the uplink signal from the beam area #S is also broadened due to addition of the band signal SR' for the beam area #R to the band signal for the beam areas #P, #T. Also in this case, when it is difficult to sample the signal of the broadened beam area #S by one A/D converter, another frequency variable downconverter 234 is provided for converting the signal received from the beam area #S to the intermediate frequency. Then, it may be configured to include the V-D/C for frequency-converting the band signal for the beam areas #P, #T, the V-D/C for frequency-converting the band signal SR', the A/D converters (two in total) for sampling the signals converted into the intermediate frequencies, and the demultiplexing unit (two in total) for digital demultiplexing the sampled signals, to process the signals.

In this case, the digital channelizer is configured to be extended from the configuration of 5 inputs and 5 outputs illustrated in FIG. 20 to the configuration of 7 inputs and 5 outputs.

Through the series of processes described above, it is possible to realize low power consumption of the relay apparatus 93 by a system in which the multi-beam satellite communication system 95 of the embodiment 4 performs the signal relay between the beam areas #Q, #R, #S, which have large communication traffic on average and require a wide bandwidth, by the analog channelizer as compared with a system in which all traffic is relayed by the digital channelizer. In addition, it is possible to realize high frequency utilization efficiency by low guard band as in the embodiment 1, by relaying the signals between the beam areas, which have small communication traffic on average and do not require a wide bandwidth, by the digital channelizer as compared with the system in which all traffic is relayed by the analog channelizer.

Furthermore, when additional bandwidth allocation due to temporary increase in communication traffic occurs, the control station 09 controls not to interrupt the communication of the users at the time of additional band allocation by not performing band change control for the analog channelizer but relaying the additional band by the digital channelizer.

In the embodiment 4, an example of additional bandwidth allocation when a disaster or the like occurs in the beam area #S and communication traffic increases has been described.

Even when such temporary increase in communication traffic occurs in one or more areas such as the beam area #R, the beam area #Q and the like in addition to the beam area #S, the operation the same as a case where the digital channelizer 23 additionally allocate the band signals to the beam area # S, # R is performed. As a result, it is possible to relay the insufficient bandwidth which is not enough only by the analog channelizer.

Also in the case of the embodiment 4, as in the embodiment 1, the digital channelizer once performs the signal relay between all the beam areas at midnight or the like when the communication traffic is greatly reduced, while the pass-band width of the analog channelizer is changed. With this change, it is also possible to realize band tuning of the analog channelizer without interrupting each communication relayed by the channelizer.

In the embodiment 4, a mesh network performing a total of 25 signal relays of 5 to 5 has been described as an example, however, the number of these may be any as long as they are integers of 2 or more, and it is possible to deal with the multi-beam satellite communication system 95 which performs the signal relays of N to M (N≥2, M≥2) by adopting the configuration of the relay apparatus 93 according to the number of beam areas.

In the embodiment 4, the signals relayed by the analog channelizer among the total of 25 signal relays of 5 to 5 has been described as a total of nine of 3 to 3, however, the number of these is not limited thereto, and it is possible to deal with the multi-beam satellite communication system 95 which realizes the signal relays of N' to M' (N≥N'≥2, M≥M'≥2) by the analog channelizer among the signal relays of N to M, by changing the configuration of the relay apparatus 93.

In FIG. 20, it is configured such that the outputs of the adders 401 to 403 are respectively high-power amplified by the PAs, however, it may be changed to a configuration in which each signal is high-power amplified at the input stage of the adders 401 to 403 and then added although the number of high power amplifiers is doubled as in the embodiment 1. In this case, it is possible to increase the maximum power which can be transmitted to the beam areas #Q, #R, #S.

Further, as in the embodiment 1, it may be configured to reduce the size, weight and power consumption of the relay apparatus 93 by reducing the saturated output power of the PAs for amplifying the band signals from the digital channelizer among the high-power amplifiers (PAs) in FIG. 20 as compared with that of the PAs for amplifying the band signals from the analog channelizer.

Even in the embodiment 4, as in the embodiment 3, it is possible to obtain various effects by using not only the analog channelizer but also the digital channelizer even in the stationary state where the bandwidth expansion demand from a specific beam area does not occur.

For example, as in the embodiment 3, when the uplink received power density of a certain communication carrier is lower than the received power density of other adjacent carriers, the line establishability may be increased by relaying the signals by the digital channelizer instead of the analog channelizer and by amplifying only the subband including the target communication carrier, to reduce the influence of intermodulation distortion interference applied to the amplifier of the final stage of the satellite.

Alternatively, when there are a plurality of unnecessary interference waves in the signal band of the uplink, as in the embodiment 3, the wasteful power consumption during relaying may be prevented by relaying the signals by the digital channelizer instead of the analog channelizer and by the digital channelizer preventing relaying the unnecessary signals by controlling to attenuate only the subbands in which interference waves are mixed.

Further, for example, as broadcasting, when one signal transmitted from a certain beam area (for example, #R) is relayed to a plurality of beam areas (for example, #P to #T) at the same time via the relay apparatus 93 of the embodiment 4, it may be controlled such that the signal is relayed using the digital channelizer as long as the signal bandwidth can be sufficiently relayed by the digital channelizer.

Assuming that the number of beam areas to be delivered at the same time is U, when relaying such broadcast communication using the analog channelizer, a distribution loss in which the signal level decreases 1/U times occurs in distribution of the signal received on the uplink to U pieces. Therefore, when the number of U increases, for example, the analog channelizer is designed to increase the number of amplifiers appropriately so as not to be affected by the distribution loss, and the scale of the analog circuit is increased to complicate analog circuit design.

On the other hand, when such a broadcast communication is relayed by the digital channelizer, since the switch matrix copies one signal digitally demultiplexed in subbands to U pieces and distributes them to the beam areas, such a distribution loss does not occur.

Therefore, since the control station 09 controls to relay such broadcast communication by the digital channelizer, it is possible to prevent an increase in size of the analog circuit of the relay apparatus 93 and complication of the analog circuit design. More specifically, it is as follows. A control side control unit 941 generates a broadcast communication control signal 941E for instructing that relaying of the broadcast communication should be performed using the digital channelizer, and transmits it to the relay apparatus 93 via a control side communication unit 942. The channelizer controller 060 controls the digital channelizer in accordance with the broadcast communication control signal 941E.

Embodiment 5

In the above embodiments, a combination of the analog channelizer and the digital channelizer has been described, however, the analog channelizer may not have a band tuning function. This corresponds to a vent pipe including the analog circuit having no band tuning function, and a combination of the vent pipe and the digital channelizer may be used.

In this case, communication for the beam areas which have a large communication traffic on average is relayed by the vent pipe including the analog circuit, and other communication for the beam areas which have a small communication traffic on average and communication for temporary traffic increase to a specific beam area are relayed by the digital channelizer.

In the relay apparatus 93 of the embodiment 5, the analog band variable unit (054 in FIG. 13) of the relay apparatus 93 shown in the other embodiments is replaced with an analog band limiting unit, and the analog band variable filters "V-BPF" (054a to 054c in FIG. 13) are merely replaced with the hand pass filters (BPFs). With this configuration, the relay apparatus 93 of the embodiment 5 cannot change the band by the analog circuit after launch. For example, when the average value of the communication traffic for a specific beam area gradually increases on a monthly basis or on a yearly basis, and the communication traffic increases on average, as described in the embodiment 1, the analog channelizer cannot increase the bandwidth and the signal relay in which the digital channelizer compensates for the insufficient bandwidth is performed.

On the other hand, since the relay apparatus 93 according to the embodiment 5 does not require an analog band tuning function, it is possible to obtain an effect of reducing the size and weight of the circuits as compared with the relay apparatus 93 shown in the other embodiments.

Although the embodiments 1 to 5 of the present invention have been described above, two or more of these embodiments may be combined and implemented. Or, one of these embodiments may be partially implemented. Or, two or more of these embodiments may be partially combined and implemented. It should be noted that the present invention is not limited to these embodiments, and various modifications are possible as necessary.

Embodiment 6

In the embodiments 1 to 3, the system called star type has been described. The star type relates to the satellite communication network between the gateway station and user terminal devices existing in the plurality of beam areas. In the embodiment 4, the system called mesh type has been described. The mesh type is a system related to the satellite communication network between the plurality of beam areas.

An embodiment 6 relates to the satellite communication network in which both the star type and the mesh type are mixed. The embodiment 6 will be described below.

Figure 27:
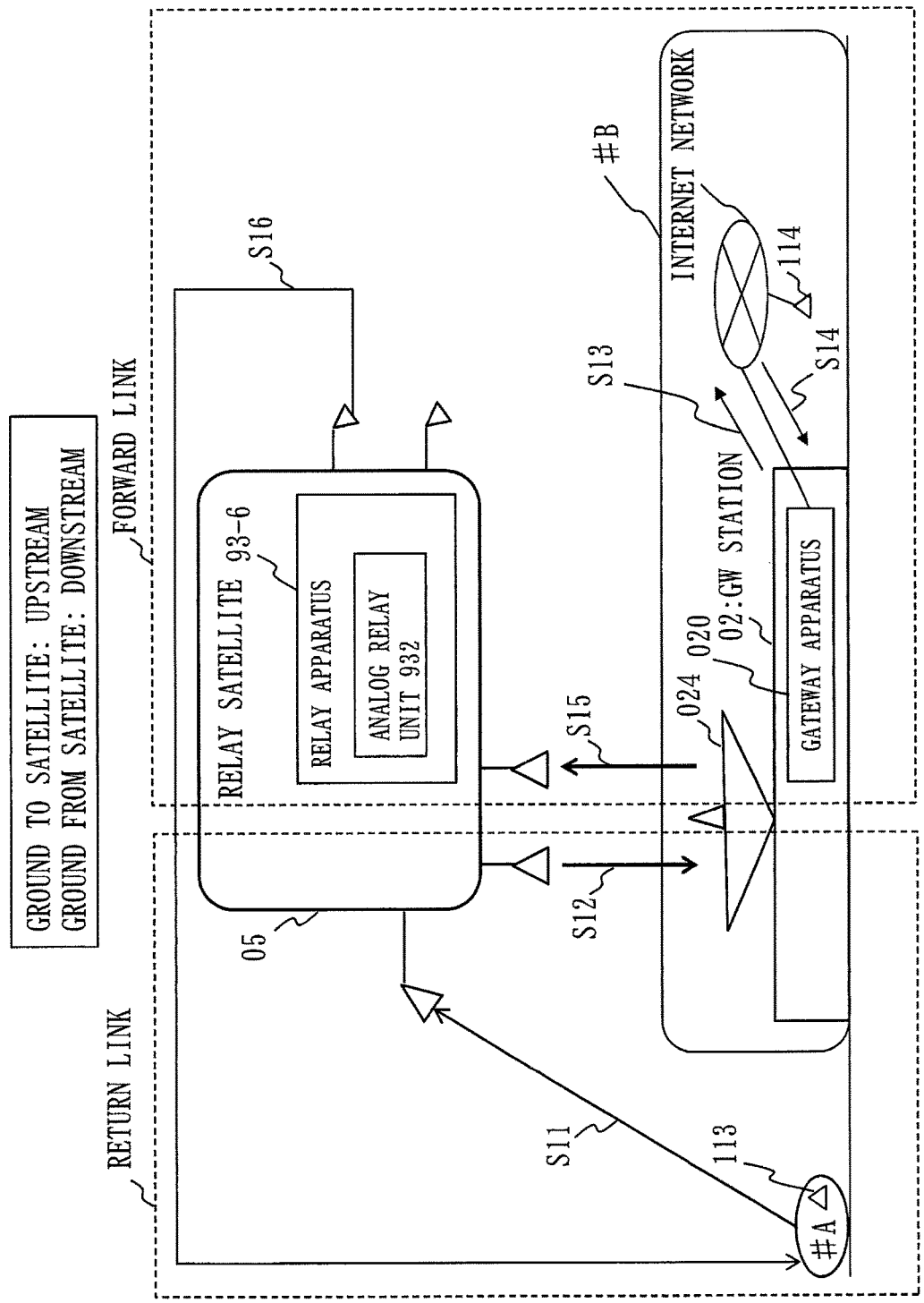
FIG. 27 is a diagram of the embodiment 6 and is a diagram illustrating a forward link and a return link in a star type.

FIG. 27 illustrates the star type using the GW station. For the sake of simplicity, FIG. 27 illustrates a case of two beam areas #A, #B. When communication between users existing in each beam area of the plurality of beam areas is performed in the star type as will be described later, the radio signal is propagated from the user #A to the satellite, the GW station and the Internet network in this order. In this case, as illustrated in FIG. 27, the radio signal is propagated from the user #A to the satellite (S11), from the satellite to the GW station (S12). In the case illustrated in FIG. 27, the GW station and a fourth communication device 114 exist in the beam area #B.

Figure 28:
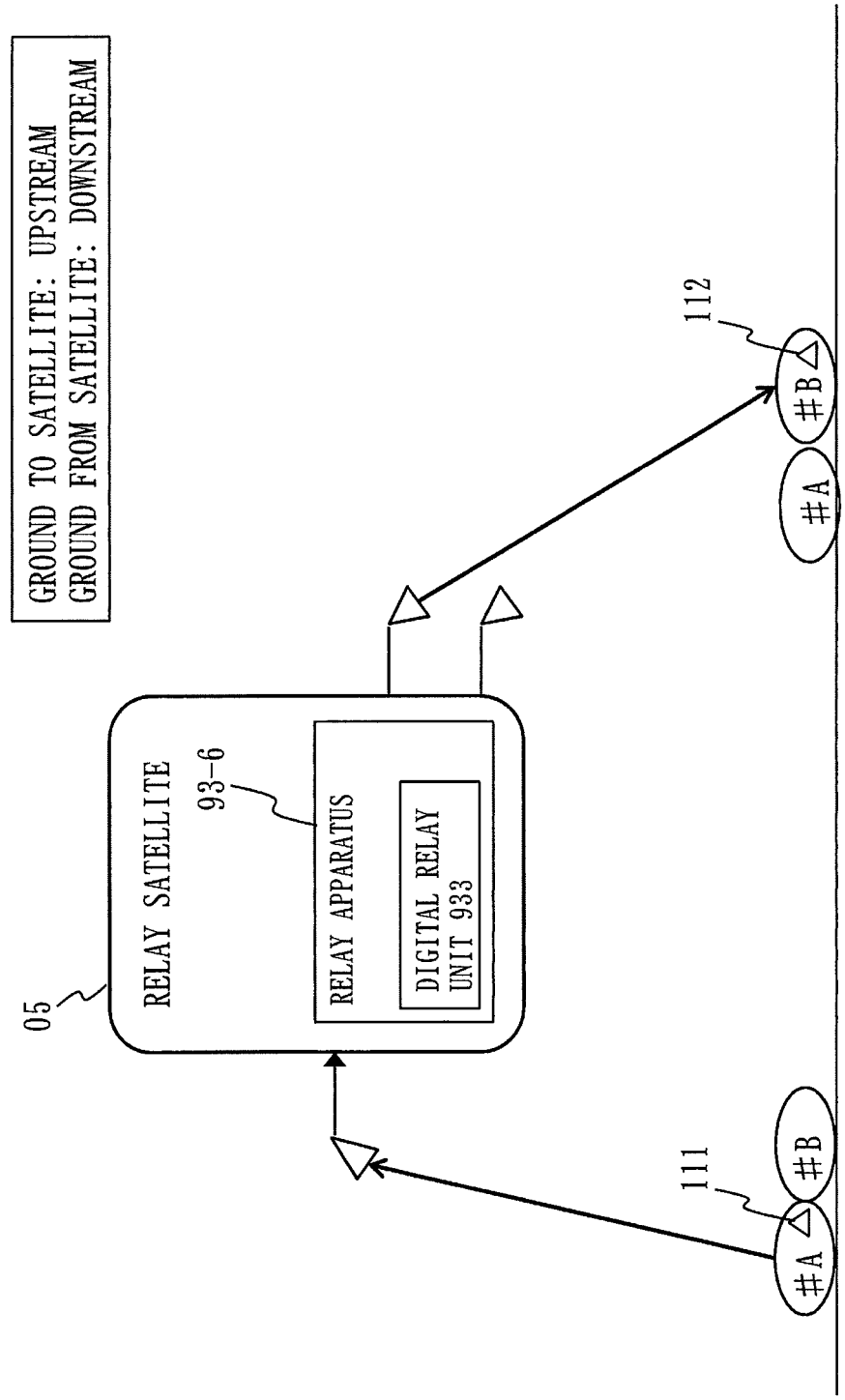
FIG. 28 is a diagram of the embodiment 6 and is a diagram illustrating a mesh type communication.

FIG. 28 illustrates the mesh type. FIG. 28 illustrates the case of two beam areas #A, #B for simplicity. When communication between the users existing in the beam areas is performed with the mesh type, the radio signals are propagated from the user #A to the satellite, and then to the user #B only twice between the ground and the satellite without going through the GW station.

In the case of referring to FIG. 27, if communication between two beam areas is performed via the gateway station, since the signals are propagated as follows, the communication between the beams is preferably the mesh type.

That is, the communication data is propagated from the user #A (a third communication device 113) to the satellite, the GW station, the Internet network, the fourth communication device 114, the Internet network, the GW station, the satellite, the user #A (third communication device 113) in this order. In FIG. 27, a route from the GW station to the fourth communication device 114 via the Internet network is Step S13, and a route from the fourth communication device 114 to the GW station via the Internet network is Step S14. The route from the GW station to the satellite is Step S15, and the route from the satellite to the user #A (third communication device 113) is Step S16.

Therefore, communication services such as browsing or uploading movies by accessing the Internet network are preferably performed in a star type communication network via the gateway (GW) station, and communication services between beams are preferably performed in a mesh type communication network in which low delay or real time is also realized. The communication services requiring low delay or real time are television conference, voice communication between users, communication between the user and a drone, or the like.

The satellite communication network in which both the star type and the mesh type are mixed as described in the embodiment 6 is effective when the communication service between beams, and the communication service via the gateway station are realized in one satellite communication system.

Here, as described in the background art, the digital channelizer has advantages of improving frequency utilization efficiency, dynamic bandwidth allocation, reducing influence of intermodulation distortion, and preventing relay of unnecessary signals.

In addition to these advantages, the digital channelizer also has the advantage of easily realizing relay between mesh type multiple beams.

For example, a total of 25 signal relays of 5 to 5 described in the embodiment 4 is within a range that can be realized even by using the analog channelizer. However, it is difficult to realize 100 beam class mesh type signal relay, that is, a total of 10000 signal relays of 100 to 100 using the analog channelizer because it is an enormous scale in terms of weight, volume, and the number of wires.

On the other hand, in the digital channelizer, the above-described 100 to 100 connection such as reading and writing of the memory may be performed within the digital circuit. Therefore, the digital channelizer has feasibility of inter-beam connection to the 100 beam class mesh type.

Therefore, in the embodiment 6, focusing on the advantages of the digital channelizer related to the inter-beam connection, (a) the mesh type connection is handled by the digital channelizer, and (b) the star type connection is handled by the analog channelizer.

With such a role sharing, it is possible to obtain an effect that the embodiment 6 can deal with the multi-beam, for example, 100 beam class mesh connection in addition to the effects described in the embodiments 1 to 5. Specifically, when the communication request between the gateway station and the beam area is generated, the control station on the ground assigns the communication request to the star type connection handled by the analog channelizer, and when the communication request between the two beams is generated, the control station on the ground assigns the communication request to the mesh type connection handled by the digital channelizer.

Figure 21:
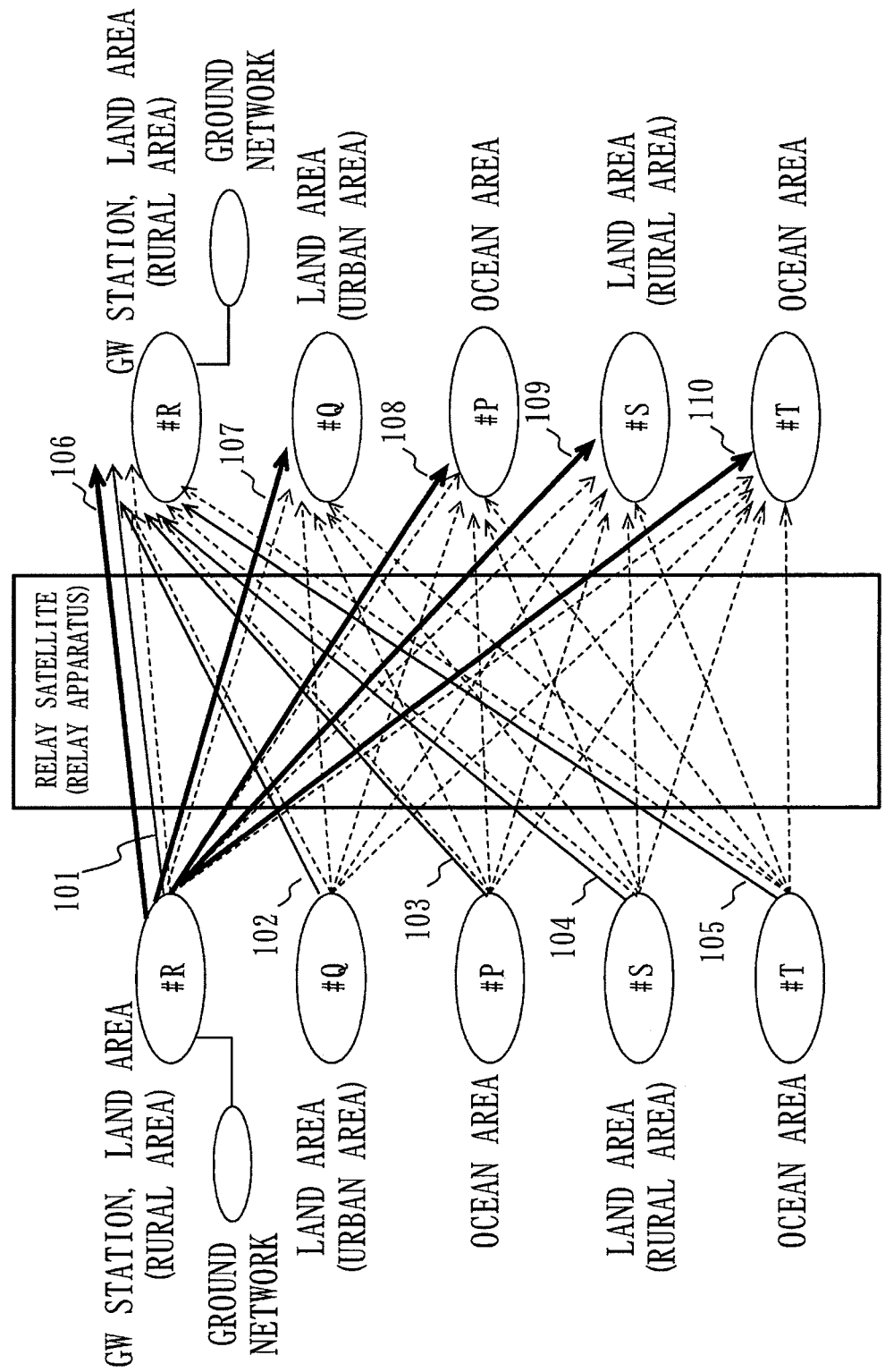
FIG. 21 is a diagram of an embodiment 6 and is a diagram illustrating use distinction between an analog channelizer and a digital channelizer.

FIG. 21 illustrates the connections in the embodiment 6. FIG. 27 shows the forward link and the return link, and the uplink and the downlink in the communication. The forward link is the communication from the GW station to the beams. The return link is the communication from the beams to the GW station. Further, the uplink is a direction from the ground to the satellite, and the downlink is a direction from the satellite to the ground. In FIG. 21, solid arrows indicate the star type network handled by the analog channelizer, and dotted arrows indicate the mesh type network handled by the digital channelizer. A system of FIG. 21 is different from the system of the embodiment 4 in that a distinctive star type network exists independently apart from the mesh type network. In the star type network in FIG. 21, the gateway (GW) station exists in the beam area #R, and the GW station and a plurality of satellite communication terminal devices (hereinafter referred to as satellite communication terminals) existing in the beam areas (#{R, Q, P, S, T}) bi-directionally communicate using the star type network. The plurality of satellite communication terminals are VSAT (Very Small Aperture Terminal) stations or the like.

On the other hand, the communication between the satellite communication terminal devices existing in the beam area #{R, Q, P, S, T} is performed using the mesh type network. In FIG. 21, since the number of beams is set to five (R, Q, P, S, T) for convenience of space, the connections on the mesh side are 5 beams to 5 beams (5 to 5 connections), however, in a 100 beam class system, the connection on the mesh side is 100 beams to 100 beams (100 to 100 connections).

Figure 22:
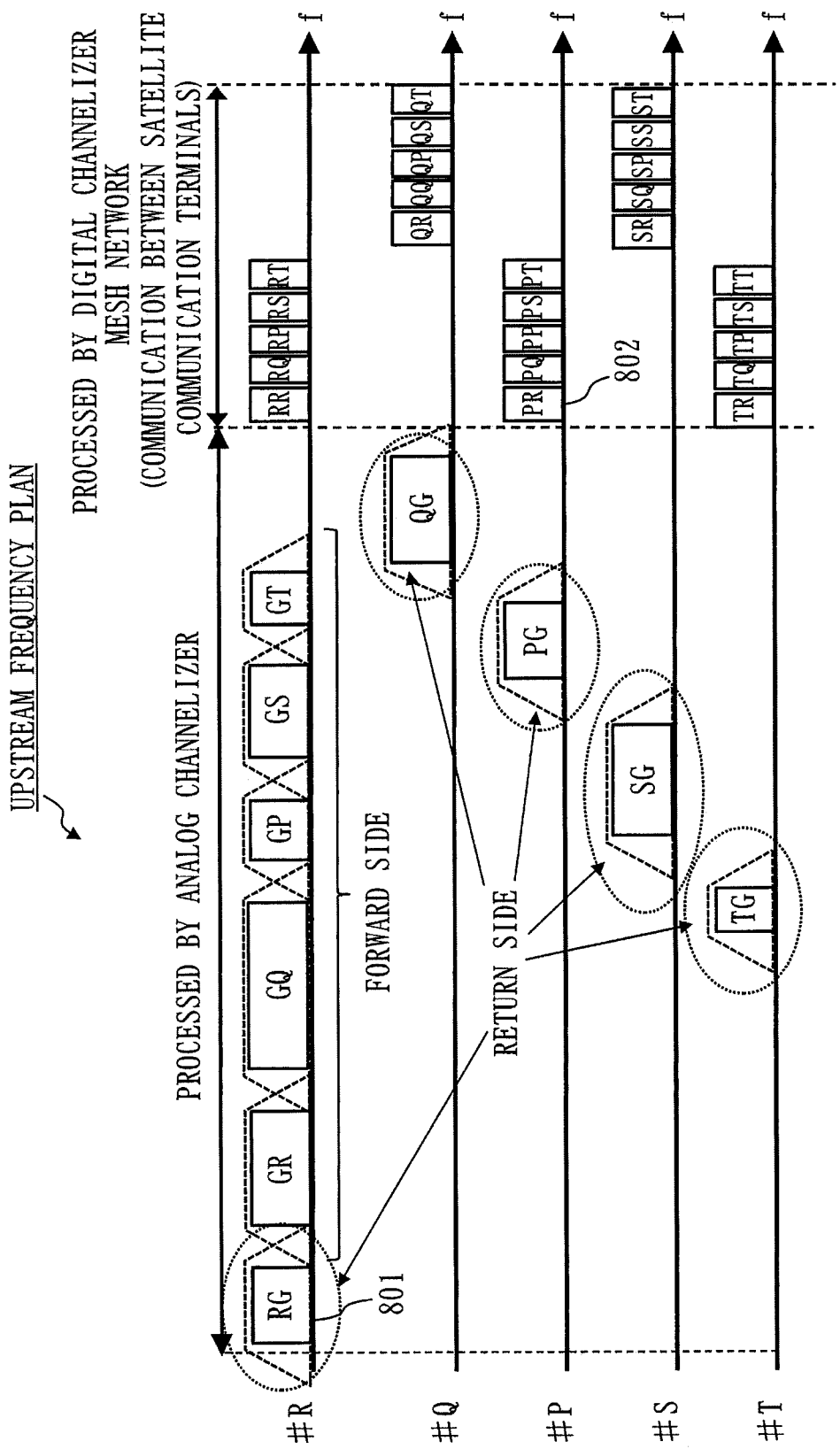
FIG. 22 is a diagram of the embodiment 6 and is a diagram illustrating an upstream frequency plan.
Figure 23:
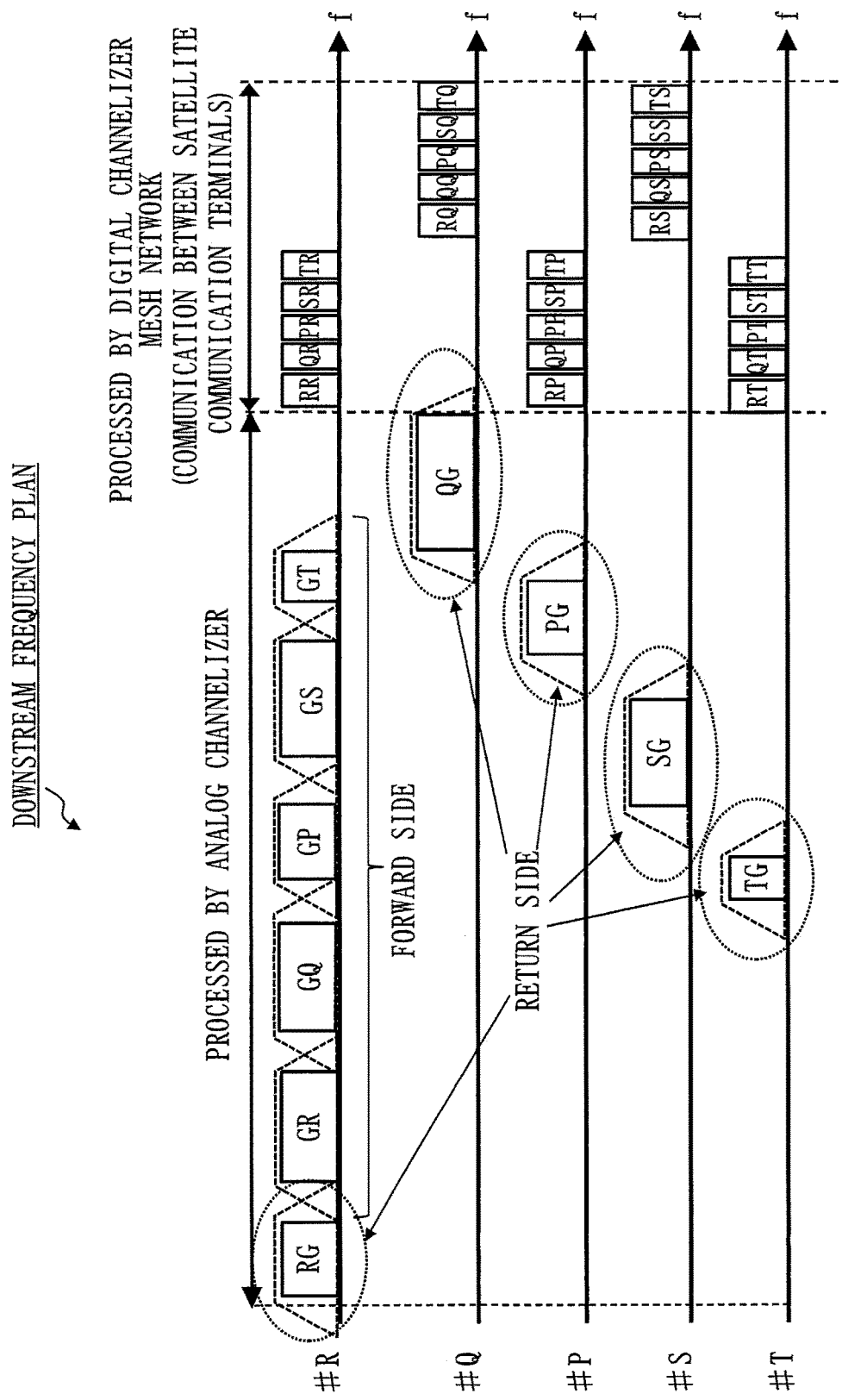
FIG. 23 is a diagram of the embodiment 6 and is a diagram illustrating a downstream frequency plan.

FIGS. 22 and 23 illustrate examples of frequency plans of the embodiment 6. Setting and changing of the frequency plan to a relay apparatus 93-6 is carried out under control of the control station 09. Specifically, for example, as illustrated in FIG. 5, the analog relay unit control signal 941A and the digital relay unit control signal 941D for instructing to set or change the frequency plan are transmitted from the control station 09. The channelizer controller controls the analog channelizer and the digital channelizer in accordance with these signals, thereby setting and changing the frequency plan.

FIG. 22 illustrates the uplink frequency plan, and FIG. 23 illustrates the downlink frequency plan. Squares in the drawings indicate the allocated frequency bands for the connections, and two alphabets in each square indicate a connection source and a connection destination with one letter.

G indicates a gateway (GW) station,
R indicates the satellite communication terminal in the beam area #R,
Q indicates the satellite communication terminal in the beam area #Q,
P indicates the satellite communication terminal in the beam area #P,
S indicates the satellite communication terminal in the beam area #S, and
T indicates the satellite communication terminal in the beam area #T.

For example, reference numeral 801 (RG) of FIG. 22 indicates the frequency band allocated for the communication from the satellite communication terminals in the beam area #R to the gateway (GW) station. Reference numeral 802 (PR) of FIG. 22 indicates the frequency band allocated for the communication from the satellite communication terminals in the beam area #P to the satellite communication terminals in the beam area #R. As is apparent from FIGS. 22 and 23, in the frequency plan, the frequency band processed by the analog channelizer and the frequency band processed by the digital channelizer are divided into left and right.

The frequency bands on the left-hand side in the drawing processed by the analog channelizer are allocated for the communication between the GW station and the satellite communication terminals existing in the beam areas. As illustrated in the drawing, there are two types on the forward side and the return side. The forward side and the return side are the forward link and the return link described in FIG. 27.

As illustrated in FIGS. 22, 23, a total of frequency bands (squares) allocated for the communication from G (GW station) or the communication to G (GW station) is 10, and corresponds to 10 lines of the number of the solid lines shown in FIG. 21, that is, the number of connections to be relayed by the analog channelizer. Note that, in FIG. 21, a solid line 101 to a solid line 105 indicate the return links, and a solid line 106 to a solid line 110 indicate the forward links. A total of frequency bands (squares) allocated for the communication between the other satellite terminals is 25, and corresponds to the number of dotted lines indicating the number of connections in FIG. 21, that is, the number of connections relayed by the digital channelizer.

FIGS. 22, 23 exemplify the communication between the five beams. However, when N is 6 or more, the number of connections in the communication between N beams is 2 N in the star type network relayed by the analog channelizer, and is N×N in the mesh type network relayed by the digital channelizer.

Figure 24:
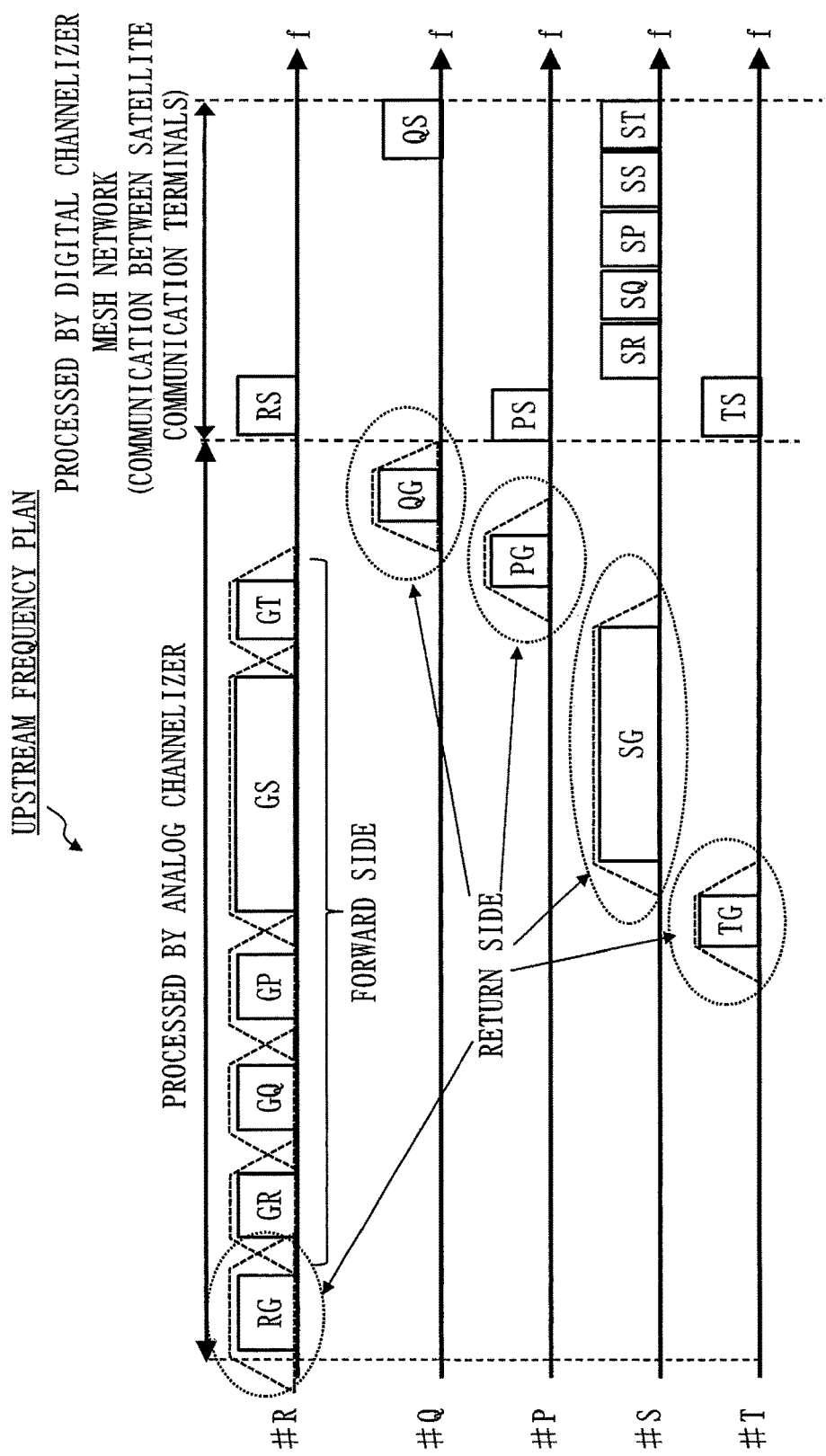
FIG. 24 is a diagram of the embodiment 6 and is a diagram illustrating an upstream frequency plan.
Figure 25:
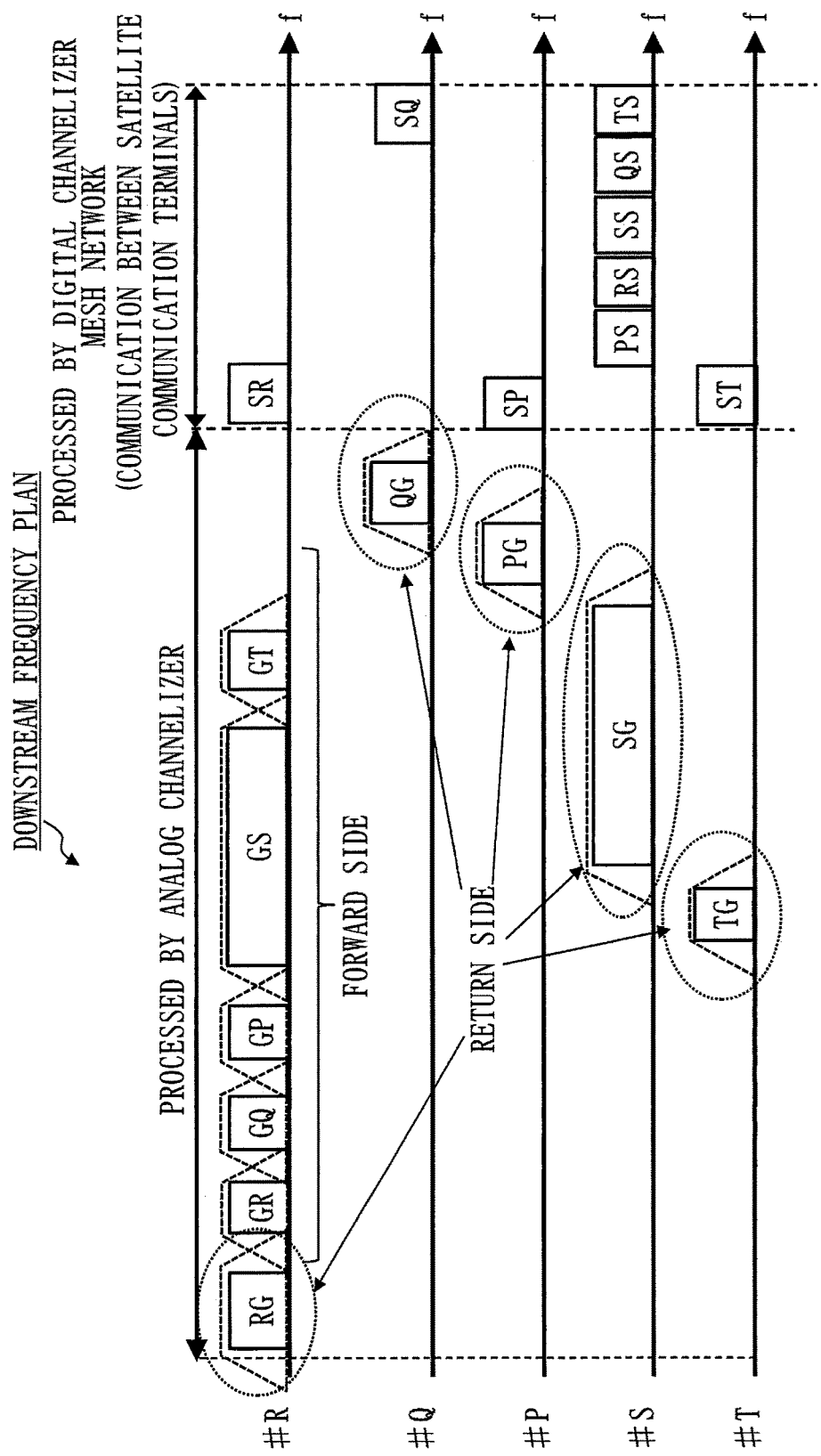
FIG. 25 is a diagram of the embodiment 6 and is a diagram illustrating a downstream frequency plan.

(1) Next, FIGS. 24, 25 illustrate the frequency plans when an increase in traffic demand of the beam area #S due to a disaster or the like is dealt with.

FIG. 24 shows the uplink frequency plan, and FIG. 25 shows the downlink frequency plan. As shown in FIGS. 24, 25, the digital channelizer does not necessarily need to maintain the connections (25 connections) between all the beam areas, and may reduce the number of connections in order to increase the bandwidth for the beam areas with high priority or urgency. In FIGS. 24, 25, the digital channelizer gives priority to the connection with the beam area #S and excluding the connections with other areas, and thus it is possible to increase the communication traffic of the beam area #S.

(2) In addition, as shown in FIGS. 24, 25, when the increase in traffic demand of the beam area #S is dealt with, the analog channelizer controls to increase the bandwidth of the beam area #S and reduce the bandwidths of the other beam areas, and thus it is possible to increase the communication traffic between the beam area #S and the GW station.

(3) As described above, controls of (1) and (2) are performed based on the analog relay unit control signal 941A and the digital relay unit control signal 941D.

Figure 26:
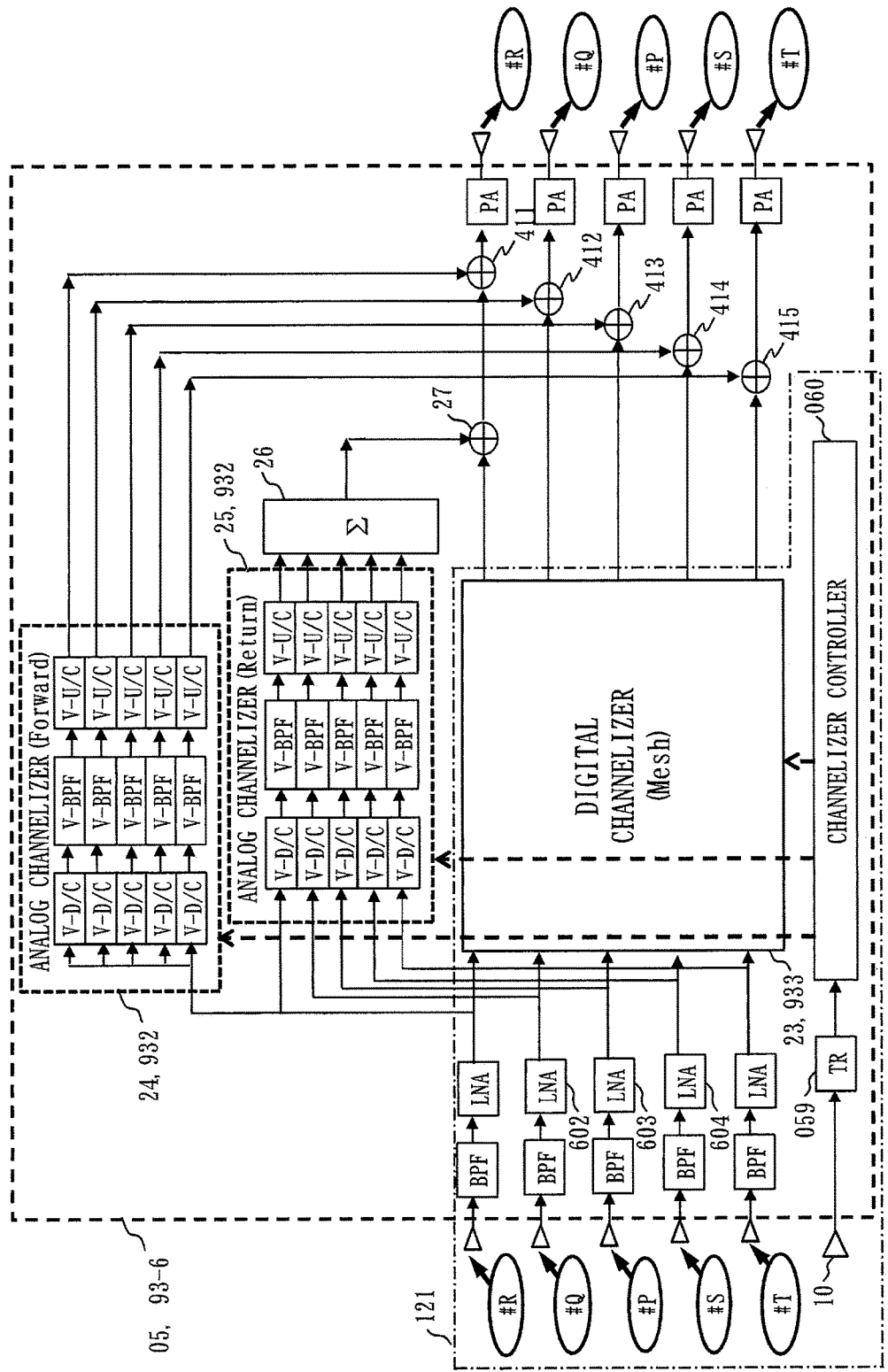
FIG. 26 is a diagram of the embodiment 6 and is a diagram illustrating a configuration of the relay apparatus.

FIG. 26 illustrates a configuration of the relay apparatus 93-6 in the embodiment 6, which corresponds to a system in which the star type network and the mesh type network are mixed. FIG. 26 illustrates a configuration of the digital channelizer and the analog channelizer that realize the operation of the embodiment 6. A range 121 surrounded by a one-dot chain line has the same configuration as the relay apparatus of the embodiment 4 of FIG. 20.

The relay apparatus 93-6 mainly includes three of the digital channelizer 23, an analog channelizer 24 on the forward side, and an analog channelizer 25 on the return side. Since the internal configuration and operation principle of the channelizers are basically the same as that of the embodiment 4, their description will be omitted.

As shown in FIG. 28, the digital relay unit 933 directly relays the communication between a first communication device 111 existing in any one of the beam areas and a second communication device 112 existing in any one of the beam areas. FIG. 28 illustrates a case where the first communication device 111 exists in the beam area #A and the second communication device 112 exists in the beam area #B. As shown in FIG. 27, the analog relay unit 932 which is the analog channelizer relays the communication between the GW station 02 which is a ground station and the third communication device 113 existing in any one of the beam areas. FIG. 27 illustrates a case where the third communication device 113 exists in the beam area #A and the GW station 02 exists in the beam area #B.

Next, the operation of the channelizers will be described. The digital channelizer 23 is controlled by the channelizer controller 060. As described above, the digital channelizer 23 and the channelizer controller 060 are the same as those in FIG. 20. The digital channelizer 23 digitally demultiplexes, switches and multiplexes the signal bands allocated to the mesh type network out of the uplink signals from the five beam areas {R, Q, P, S, T}, and relays the signal bands respectively to the downlink signal bands to the five beam areas {R, Q, P, S, T} by switch control based on the command of the channelizer controller 060.

The analog channelizer 24 on the forward side is controlled by the channelizer controller 060. The analog channelizer 24 extracts, analog demultiplexes, and outputs the signal band to the beam areas allocated to a forward line of the star type network out of the uplink signals from the beam area #R. The analog demultiplexed signals are respectively added to the signals output from the digital channelizer 23 by adders {411, 412, 413, 414, 415}. The added signals are amplified by the high-power amplifier (PA) and transmitted.

The analog channelizer 25 on the return side is controlled by the channelizer controller 060. The analog channelizer 25 extracts the signal bands to the beam areas allocated to the return line side of the star type network out of the uplink signals from the beam areas # {R, Q, P, S, T}, and then outputs them at a specified center frequency. An adder 26 in the subsequent stage adds and outputs the signals output from the analog channelizer 25. Analog multiplexed return signal to the GW station is added to the signal from the beam area #R output from the digital channelizer by an adder 27 and transmitted to the beam area #R.

FIG. 26 illustrates a configuration in which the five high-power amplifiers (PAs), to which the outputs of the adders {411, 412, 413, 414, 415} are input, amplify addition results of the signals. However, the signals may be amplified and then added and output. In this case, although the number of PAs increases, it is possible to realize high output of the relay apparatus.

Furthermore, in the embodiment 6, although the communication between the GW station and the plurality of beams has been described as the star type network, it may not necessarily be the GW station. That is, any communication system can be used as long as it is a one-to-N star type network and its total traffic is larger than that of the mesh type network.

In a satellite communication system having not only one GW station but two or more GW stations, the GW stations (A station, B station) and the satellite communication terminals existing in the beams communicate to each other. Therefore, two systems of one-to-N star type networks are required. When there is a plurality of GW stations, the relay apparatus 93-6 of the embodiment 6 can be configured to have an increased number of analog channelizers. For example, when there are two stations (A station, B station) of the GW station, the analog channelizer 24 on the forward side and the analog channelizer 25 on the return side are used for the communication between the A station and the satellite communication terminals, and a system of the analog channelizer 24 on the forward side and a system of the analog channelizer 25 on the return side can be added to the configuration illustrated in FIG. 26 for the communication between the station B and the satellite communication terminals. In this case, although the circuit scale of the analog channelizer is doubled, it is possible to realize the relay apparatus compatible with the two GW stations.

The star type of the embodiment 6 relates to the satellite communication network between the GW station 02 and the user terminal devices existing in the plurality of beam areas. Here, the GW station 02 is substantially a gateway apparatus 020 (hereinafter, GW apparatus 020) provided in the GW station 02. A configuration of the GW apparatus 020 will be described below.

Figure 29:
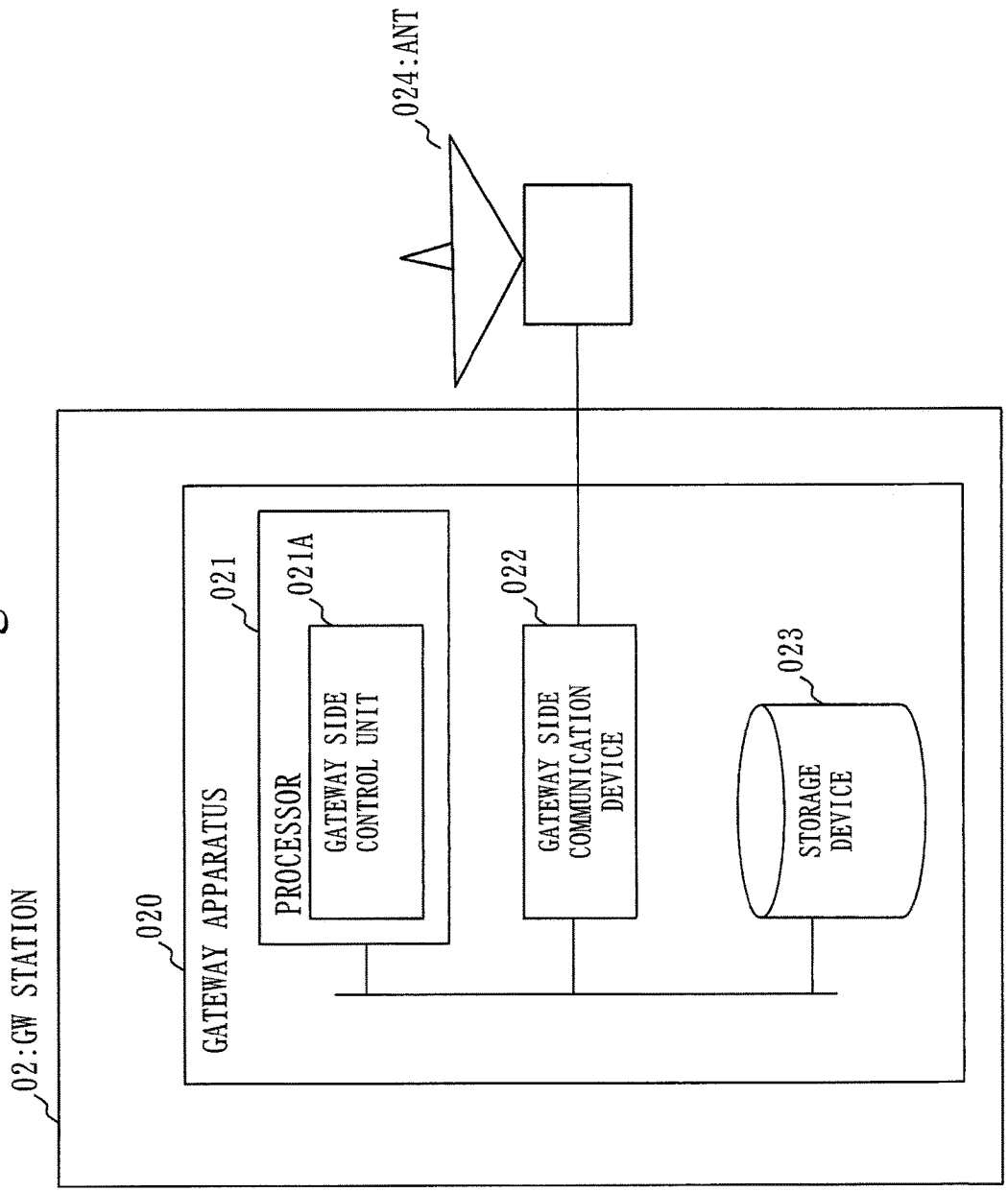
FIG. 29 is a diagram of the embodiment 6 and is a diagram illustrating a gateway apparatus.

FIG. 29 illustrates a functional block diagram of the gateway apparatus 020 of the GW station 02. FIG. 29 is similar to the configuration of the control apparatus 94 in FIG. 3. The gateway apparatus 020 includes, as hardware, a processor 021, a gateway side communication device 022, and a storage device 023. The processor 021 realizes a function of a gateway side control unit 021A by executing the program. The gateway side control unit 021A realizes a function of the GW apparatus 020 by controlling the gateway side communication device 022. The processor 021 realizes the gateway side control unit 021A by reading and executing the program stored in the storage device 023. It should be noted that the gateway side communication device 022 is connected to an antenna 024.

Effects of Embodiment 6

(1) The multi-beam satellite communication system according to the embodiment 6 is particularly effective when the communication traffic between the GW station and the satellite communication terminals communicated in the star type network is larger than the communication traffic between the satellite communication terminals communicated in the mesh type network, that is, when the allocated frequency bandwidth in the star type network is wider than that in mesh type network.

In the multi-beam satellite communication system according to the embodiment 6, since the analog channelizer controls to relay broadband communication between the GW station and the satellite communication terminals, it is possible to realize low power consumption, which is an advantage of the analog channelizer, while avoiding a problem of requiring a wide guard band, which is a disadvantage of the analog channelizer.

(2) Further, in the multi-beam satellite communication system according to the embodiment 6, the digital channelizer controls to relay the communication of narrowband signals between the satellite communication terminals. By this control, it is possible to improve the frequency utilization efficiency by a narrow guard band, which is an advantage of the digital channelizer, and to realize connections between the multiple beams described above, while avoiding a problem of increase in power consumption accompanying the broadband communication, which is a disadvantage of the digital channelizer. Particularly, this control is effective when it is necessary to mix the 100 beam class mesh connection with the star type network.

(3) As described above in (1) and (2), with the relay apparatus of the embodiment 6, it is possible to realize high frequency utilization efficiency and low power consumption in a large scale satellite communication system where the mesh connection of several tens to 100 beam class and the star connection with the GW station are mixed, by appropriately using the analog channelizer and the digital channelizer so that the advantages of both can be utilized.

Although the embodiments of the present invention have been described above, two or more of the embodiments may be combined and implemented. Or, one of the embodiments may be partially implemented. Or, two or more of the embodiments may be partially combined and implemented. It should be noted that the present invention is not limited to the embodiments, and various modifications are possible as necessary.

REFERENCE SIGNS LIST

01: ground network, 10: command/telemetry antenna, 02: GW station, 03: feeder link (upstream), 04: feeder link receiving antenna, 05: relay satellite, 020: GW apparatus, 021: processor, 022: gateway side communication unit, 023: storage device, 024: antenna, 024A: gateway side control unit, 5A, 24, 25: analog channelizer, 5D, 23: digital channelizer, 051: analog band-pass filter, 052: low noise amplifier, 053: frequency variable downconverter group, 054: analog band variable unit, 055: digital band variable unit, 056: frequency variable upconverter, 057: power amplifier, 058: adder, 059: command/telemetry transponder, 060: channelizer controller, 06: user link transmitting antenna, 07: user link (upstream), 08: beam area, 09: control station, 91: artificial satellite, 92: communication device, 93, 93-6: relay apparatus, 101, 102, 103, 104, 105, 106: solid line, 121: range, 931: relay side receiving unit, 932: analog relay unit, 932A: analog circuit, 933: digital relay unit, 933D: digital circuit, 934: relay side transmitting unit, 935: relay side control unit, 94: control apparatus, 941: control side control unit, 941A: analog relay unit control signal, 941D: digital relay unit control signal, 941C: change control signal, 942: control side communication unit, 95: multi-beam satellite communication system.

The invention claimed is:

1. A multi-beam satellite communication system comprising:
    a relay apparatus mounted on an artificial satellite and relaying communication of a communication device present in each of a plurality of beam areas; and
    a control apparatus to control the relay apparatus, wherein
    the relay apparatus comprises:
    an analog channelizer to relay a relay signal by using an analog circuit;
    a digital channelizer to relay a relay signal by using a digital circuit; and
    a channelizer controller to control a bandwidth of the relay signal relayed by the analog channelizer and a bandwidth of the relay signal relayed by the digital channelizer, based on a relay unit control signal transmitted from the control apparatus, and
    the control apparatus comprises:
    a communication device and processing circuitry,
    the processing circuitry determining a frequency band of the relay signal to be relayed by the analog channelizer and a frequency band of the relay signal to be relayed by the digital channelizer, by using at least one of communication traffic demand, received power information of the relay signal received at the relay apparatus, and communication traffic in each of the beam areas, and transmitting a determined result as the relay unit control signal to the channelizer controller via the communication device,
    wherein communication traffic in a first beam area in which the relay signal is transmitted from the analog channelizer is larger than communication traffic in a second beam area in which the relay signal is transmitted from the digital channelizer, and
    when communication traffic increase demand or bandwidth expansion demand occurs in the first beam area in which the relay signal is transmitted from the analog channelizer, the processing circuitry uses the digital channelizer to relay, as the relay signal, a signal corresponding to the communication traffic increase demand or the bandwidth expansion demand from the first beam area.

2. The multi-beam satellite communication system according to claim 1, wherein
    in a time period in which the communication traffic in the first beam area in which the relay signal is relayed by the analog channelizer is reduced, the processing circuitry executes control to cause the digital channelizer to relay a signal band of the relay signal to be relayed by the analog channelizer, and changes a pass-band of the analog channelizer.

3. The multi-beam satellite communication system according to claim 1, wherein
    when a received power density of a communication carrier received at the relay apparatus is lower than a received power density of another communication carrier, the processing circuitry uses the digital channelizer to relay the communication carrier with the low received power density, and
    the digital channelizer amplifies a power of the communication carrier with the low received power density.

4. The multi-beam satellite communication system according to claim 3, wherein
    when an interference wave is mixed in a signal bandwidth of the relay signal relayed at the relay apparatus, the processing circuitry uses the digital channelizer to relay the relay signal, and
    the digital channelizer performs control to attenuate a subband in which the interference wave is mixed.

5. The multi-beam satellite communication system according to claim 4, wherein
    the processing circuitry uses the digital channelizer to relay a broadcast communication.

6. The multi-beam satellite communication system according to claim 5, wherein
    the processing circuitry causes the digital channelizer to relay communication between communication devices present in each of the beam areas, and causes the analog channelizer to relay communication between a satellite communication terminal present in each of the beam areas and a gateway station.

* * * * *